US011635545B2

(12) United States Patent
Elkabetz et al.

(10) Patent No.: US 11,635,545 B2
(45) Date of Patent: *Apr. 25, 2023

(54) REAL-TIME WEATHER FORECASTING FOR TRANSPORTATION SYSTEMS

(71) Applicant: The Tomorrow Companies Inc., Boston, MA (US)

(72) Inventors: Shimon Elkabetz, Boston, MA (US); Jacob Ribnik, New York, NY (US); Itai Zlotnik, Cambridge, MA (US); Rei Goffer, Boston, MA (US); Nir Nossenson, Winchester, MA (US); Daniel Alexander Rothenberg, Salem, MA (US); Karl Ginter, Beltsville, MD (US)

(73) Assignee: The Tomorrow Companies Inc., Boston, MA (US)

( * ) Notice: Subject to any disclaimer, the term of this patent is extended or adjusted under 35 U.S.C. 154(b) by 186 days.

This patent is subject to a terminal disclaimer.

(21) Appl. No.: 17/176,886

(22) Filed: Feb. 16, 2021

(65) Prior Publication Data

US 2021/0165129 A1 Jun. 3, 2021

Related U.S. Application Data

(63) Continuation of application No. 16/181,137, filed on Nov. 5, 2018, now Pat. No. 10,962,680.

(Continued)

(51) Int. Cl.
*G01W 1/10* (2006.01)
*G01W 1/02* (2006.01)
(Continued)

(52) U.S. Cl.
CPC ............... *G01W 1/10* (2013.01); *G01W 1/02* (2013.01); *G08G 5/0065* (2013.01);
(Continued)

(58) Field of Classification Search
CPC .......... G01W 1/10; G01W 1/02; G01W 1/00; G01W 2201/003; G01W 2201/006;
(Continued)

(56) References Cited

U.S. PATENT DOCUMENTS 6,683,609 B1\* 1/2004 Baron, Sr. ............... G06T 17/05
345/419
9,395,201 B2\* 7/2016 Oostveen ........... G01C 21/3453
(Continued)

OTHER PUBLICATIONS

International Preliminary Report on Patenability for corresponding PCT/US2018/067203, dated Jun. 23, 2020.
(Continued)

*Primary Examiner* — Gertrude Arthur Jeanglaude
(74) *Attorney, Agent, or Firm* — Nixon & Vanderhye P.C.

(57) ABSTRACT

Improved mechanisms for collecting information from a diverse suite of sensors and systems, calculating the current precipitation, atmospheric water vapor, atmospheric liquid water content, or precipitable water and other atmospheric-based phenomena, for example presence and intensity of fog, based upon these sensor readings, predicting future precipitation and atmospheric-based phenomena, and estimating effects of the atmospheric-based phenomena on visibility, for example by calculating runway visible range (RVR) estimates and forecasts based on the atmospheric-based phenomena.

31 Claims, 18 Drawing Sheets

Related U.S. Application Data

(60) Provisional application No. 62/609,096, filed on Dec. 21, 2017, provisional application No. 62/581,531, filed on Nov. 3, 2017.

(51) Int. Cl.

| | |
|---|---|
| *G08G 5/00* | (2006.01) |
| *G08G 5/02* | (2006.01) |
| *G01W 1/00* | (2006.01) |
| *G06N 5/00* | (2023.01) |
| *G06N 20/00* | (2019.01) |
| *H04W 84/00* | (2009.01) |

(52) U.S. Cl.
CPC .......... *G08G 5/0091* (2013.01); *G08G 5/025* (2013.01); *G01W 1/00* (2013.01); *G01W 2001/003* (2013.01); *G01W 2001/006* (2013.01); *G01W 2201/00* (2013.01); *G01W 2203/00* (2013.01); *G06N 5/00* (2013.01); *G06N 20/00* (2019.01); *H04W 84/005* (2013.01); *Y02A 90/10* (2018.01)

(58) Field of Classification Search
CPC ......... G01W 2201/00; G01W 2203/00; G08G 5/0065; G08G 5/0091; G08G 5/025; Y02A 90/10; G06N 20/00; G06N 5/00; H04W 84/005

See application file for complete search history.

(56) References Cited

U.S. PATENT DOCUMENTS

| | | | |
|---|---|---|---|
| 10,962,680 B2* | 3/2021 | Elkabetz | .............. G08G 5/0065 |
| 2005/0197070 A1 | 9/2005 | Kaikuranta et al. | |
| 2009/0160700 A1 | 6/2009 | Messer-Yaron et al. | |
| 2011/0040483 A1 | 2/2011 | Marshall et al. | |
| 2013/0115972 A1 | 5/2013 | Ziskind et al. | |
| 2013/0234884 A1 | 9/2013 | Bunch et al. | |
| 2016/0178803 A1 | 6/2016 | Haas et al. | |
| 2017/0249056 A1 | 8/2017 | Rainey | |
| 2019/0293572 A1 | 9/2019 | David et al. | |

OTHER PUBLICATIONS

Extended European Search Report for corresponding EP17816311.9, dated Jan. 21, 2020.
Related U.S. Appl. No. 16/102,659, filed Aug. 13, 2018.
Related U.S. Appl. No. 16/181,148, filed Nov. 5, 2018.
Intenational Search Report and Written Opinion of the International Searching Authority dated May 1, 2019, issued in related International Application No. PCT/US18/67203, 13 pages.

* cited by examiner

Cadence Process Timing

Overview Map

Dashboard

REAL-TIME WEATHER FORECASTING FOR TRANSPORTATION SYSTEMS

1 CROSS REFERENCE TO RELATED U.S. PATENTS & PATENT APPLICATIONS

The present application is a CON of application no. 16/181,137 filed November 5. 2018, now U.S. Pat. No. 10,962,680; which claims benefit of U.S. Provisional Patent Application No. 62/581,531 filed Nov. 3, 2017, and claims benefit of U.S. Provisional Patent Application No. 62/609096 filed Dec. 21, 2017, both of which are incorporated herein by reference in their entirety and for all purposes.

The present application is related to U.S. Pat. No. 10,078, 155 issued Sep. 18, 2018, which is incorporated herein by reference in its entirety and for all purposes.

The present application is also related to IMPROVED REAL-TIME DATA PIPELINE TECHNIQUES FOR IMPROVING A FAST WEATHER FORECASTING SYSTEM, U.S. patent application Ser. No. 16/181,148 filed Nov. 5, 2018 and published as US-2019-0339416-A1, which is incorporated herein by reference in its entirety and for all purposes. This related application and patents issuing therefrom is/are referred to below as "the related application".

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2018, ClimaCell, Inc.

3 BACKGROUND

3.1 Field

The exemplary, illustrative, technology herein relates to systems, software, and methods for the determination of current weather phenomena and the fast and efficient generation of accurate weather and precipitation forecasts, including analysis and prediction of weather based on real-time, high frequency, and historical sensor reading and weather events, using automated means of collecting and processing information in accordance with the descriptions provided herein. The technology herein has applications in the areas of signal processing, transportation operations planning, and precipitation forecasting.

3.2 Related Art

Fog events can have notable negative impacts on industry and safety, for example by impairing visibility at airports, thereby making takeoffs and landings difficult or impossible and causing flight cancellations and delays. Fog events impair visibility on surface roadways, causing surface transportation delays and contributing to motor vehicle accidents. Fog also negatively impacts water-borne shipping and transport. Given the significant impact that fog can have, the known art has attempted to both detect and predict fog events and to quantify potential impacts of fog on visibility, for example fog impacts on runway visible range (RVR) at airport locations. Methods in the known art, typically detect fog events by direct observation, relying on dedicated fog detection or visibility measurement instruments or on reports from human observers. These known methods are capable of detecting fog where observers and dedicated instruments are located but fail to detect or predict fog beyond an effective instrument or observer range.

The known art has recognized that fog can affect radio frequency (RE) attenuation and models and algorithms have been developed for inferring the presence of fog and estimating liquid water content (LW C) of fog based on measured RE attenuation. However, levels of RF attenuation caused by fog could also be caused by atmospheric phenomena other than fog. Therefore, models and algorithms of the known art can fail to distinguish RF attenuation due to fog from attenuation due to rain, a high local atmospheric water density in the absence of fog, or a combination of fog and another atmospheric hydrometer such as a light rain. Known fog detection systems are limited in their ability to accurately detect fog, and to determine fog-dependent changes in visibility, at locations outside the range of direct observation.

Previous weather forecasting systems based upon RF attenuation are known, but do not support the processing of RF attenuation from satellite-based microwave links. In particular, the use of satellite microwave links for both geostationary and low earth orbit satellites is not well understood. The current computational load for calculating the orbital mechanics, the earth station—satellite microwave link paths, and the calculations required to reduce this information into usable weather data are not feasible for short term forecasting needs.

Models and algorithms have been developed for inferring and forecasting fog and for estimating liquid water content (LW C) of fog based on microwave link attenuation measurements. These models and algorithms previously have been incapable of determining whether particular attenuation measurements are caused by fog or by some other type of hydrometer or atmospheric interference. Fog predictive models using machine learning and other predictive modeling techniques have been used to predict fog by ingesting weather parameter measurements or estimates into fog predictive models that have been trained with historic weather data. Fog predictive models have not previously been combined with or incorporated into dynamic, real time, fog inference and LWC estimation based on microwave link attenuation measurements.

Known weather information systems are also limited in their ability to process and integrate high sampling frequency data, such as information collected from onboard sensors of millions of vehicles at collection intervals measured in seconds or minutes. Typically, the temporal accuracy of existing weather system supporting the transportation industry is approximately 20 minutes, causing low fidelity forecasts that do not take into account more accurate data collected from vehicles and other high frequency data sources. Also, current forecasting systems are unable to keep up with the large data rates that can be collected from these high frequency data sources, causing the forecasting systems to slow down either during data collection as large number of input data points are collected and processes, or during the forecast calculation when millions of real time data points are being applied to the forecast models.

Rapidly changing weather phenomena, including fog and squall lines, disproportionally affect transportation systems due to the transportation systems' reliance upon known weather in operational planning. The situation is particularly acute in aviation, where aircraft are moving at hundreds of miles per hour for a destination that may or may not be accessible due to weather conditions at the destination. Weather forecasts that lag real time or are not rapidly updated when the weather rapidly changes further this disruption. Taken together, these challenges mean that existing systems fail from an information handling perspective in their ability to support real-time prediction of precipitation amounts.

Additionally, prior art approaches collectively demonstrate notable deficiencies when applied to input data that require complex processing in order to transform the data into usable weather data or to input data comprising high frequency sensor readings. First, they are hindcast model development techniques, which provide, by definition, a forecast after the event has happened. They are also limited with respect to the data sources used, as these data sources have built in inaccuracies due to limits in the underlying models, and are based upon unchanging data sources. Accordingly, they are non-generalizable and are insufficient to support real-time analysis and prediction of weather-related phenomena. New methods of collecting and processing information are needed in order to produce the desired real-time analysis and prediction capabilities.

4 SUMMARY

The technology herein provides such advances and improvements. In some embodiments, the rate of cadence processing is reduced so that cadence intervals are very short, e.g. less than 5 minutes, less than a minute down, or less than 15 seconds, depending upon granularity and frequency of collected data.

5 BRIEF DESCRIPTION OF THE DRAWINGS

The features of the present technology will best be understood from a detailed description of the technology and example embodiments thereof selected for the purposes of illustration and shown in the accompanying drawings in which.

Figure 15:
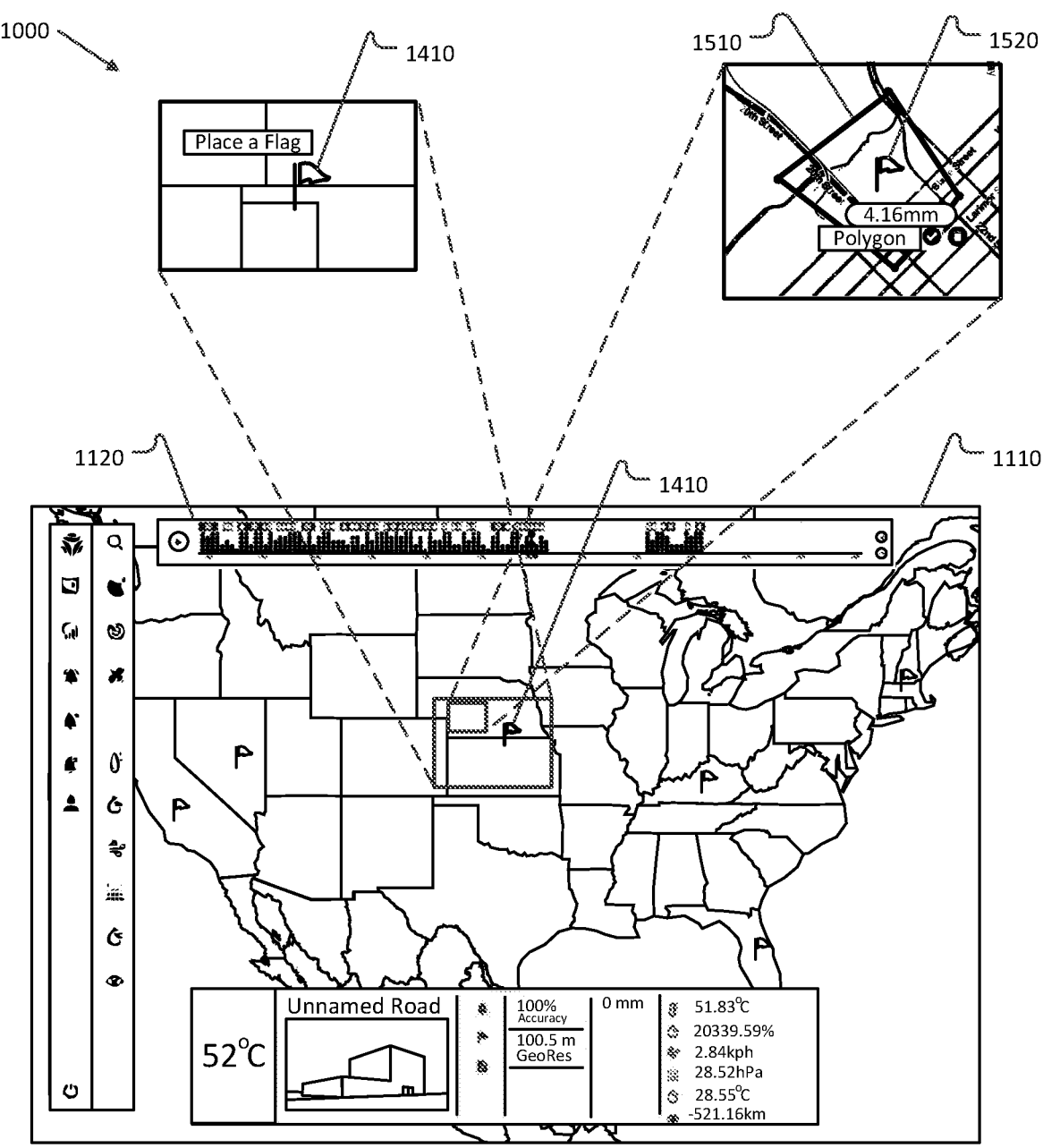

FIG. 15 provides an exemplary overview map display indicating user specified locations of interest and detailed display bar for one of the locations of interest, according to an illustrative embodiment.

Figure 16A:
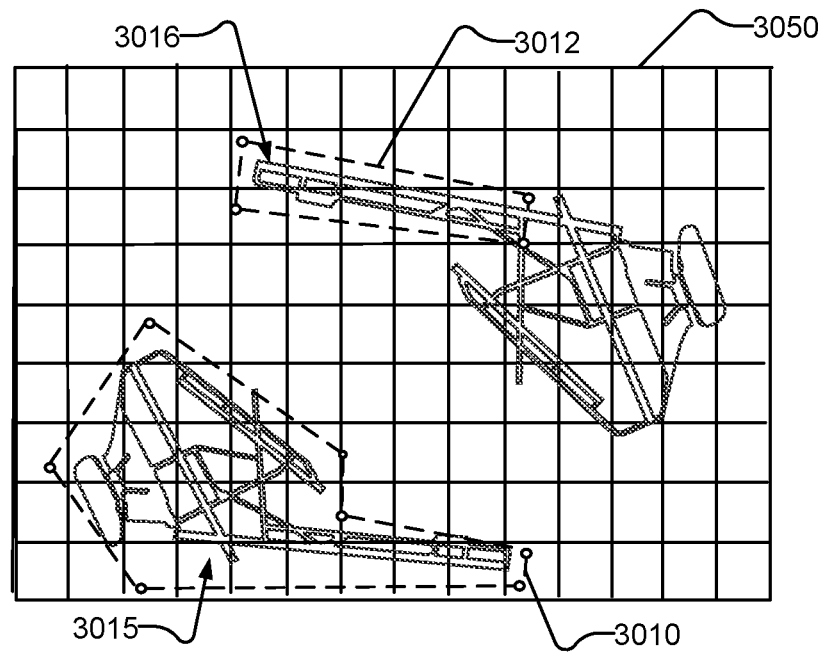
Figure 16B:
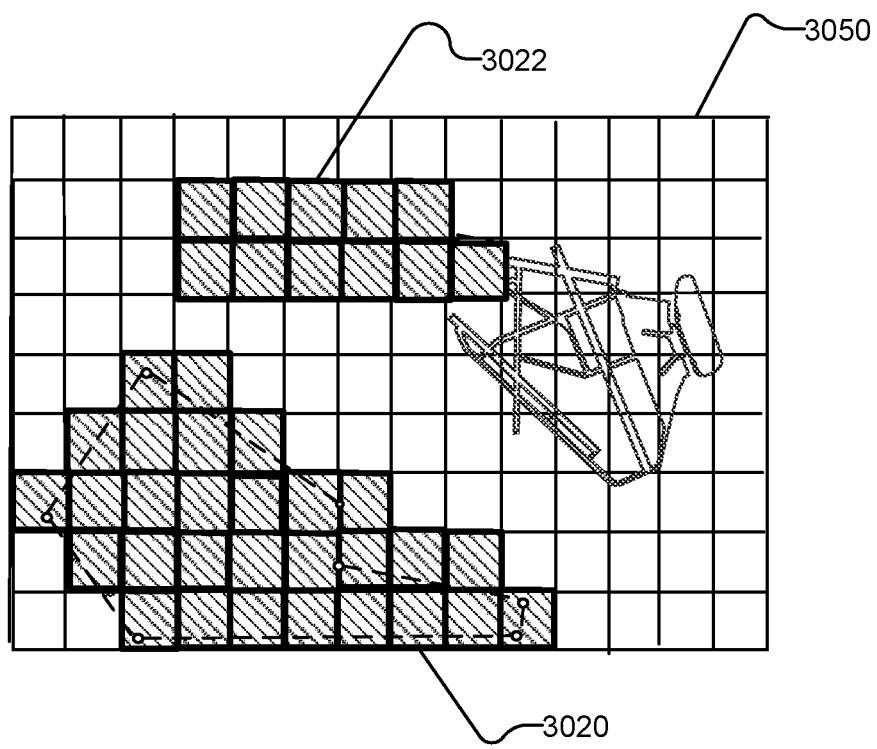
Figure 16C:
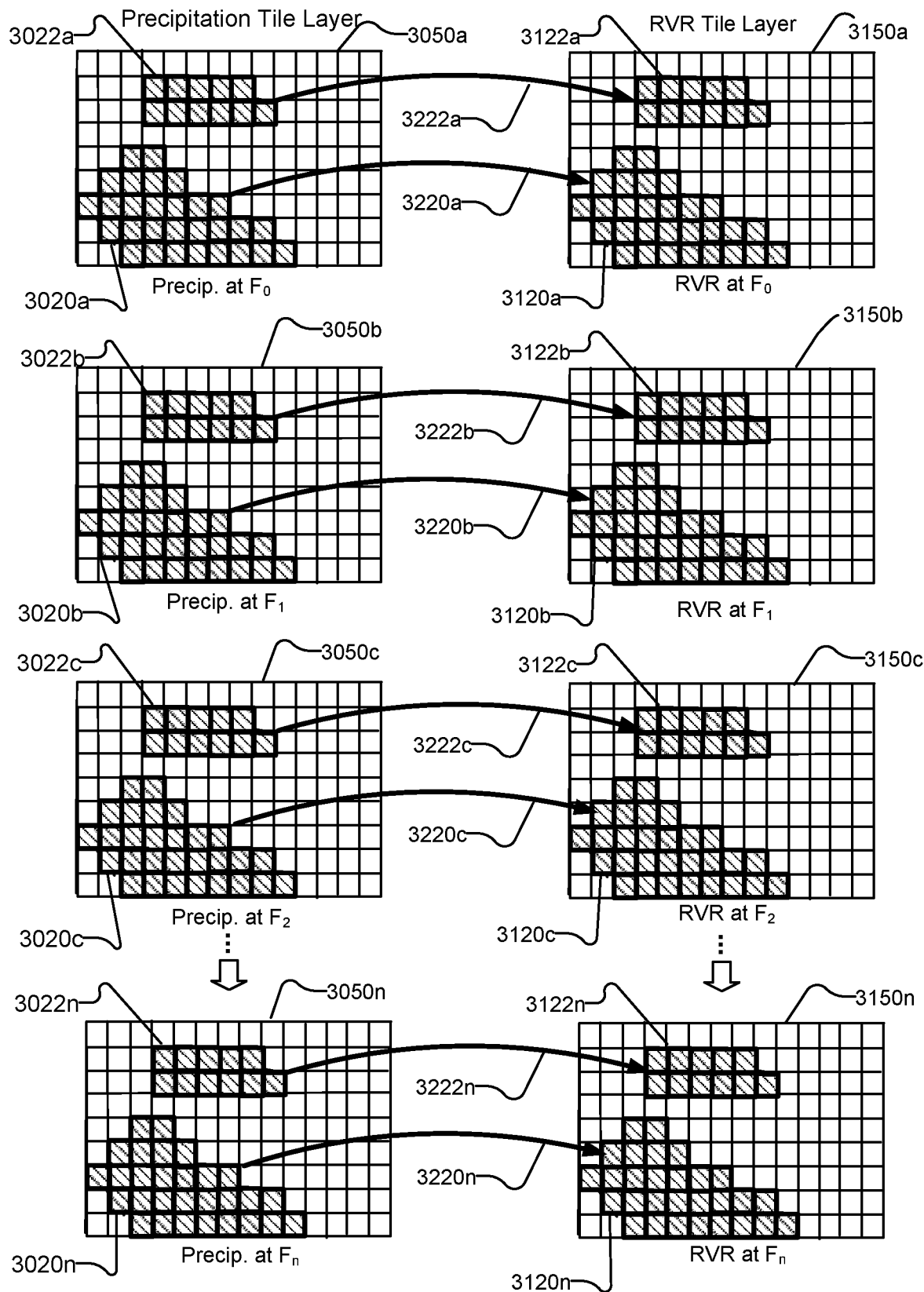

FIGS. 16A-C depict illustrative mapping of runways/airports to tiles, according to an illustrative embodiment.

Figure 17:
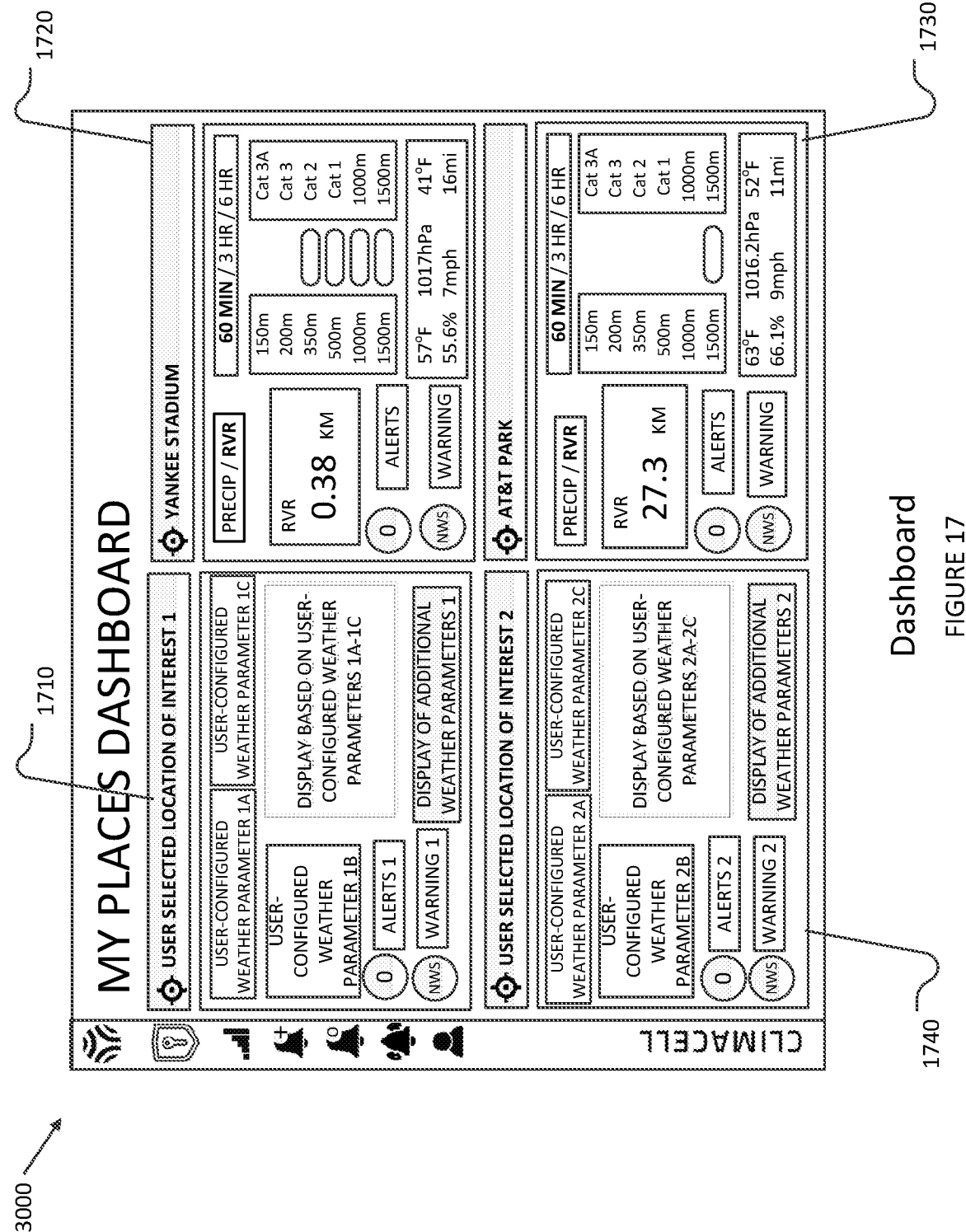

FIG. 17 provides an illustrative depiction of a dashboard function of the RVR forecasting program, according to an illustrative embodiment of the invention.

6 DESCRIPTION OF SOME EMBODIMENTS

6.1 Overview

The systems and methods described herein provide an improved mechanism for collecting information from a diverse suite of sensors and systems, calculating the current precipitation, atmospheric water vapor, atmospheric liquid water content, or precipitable water and other rapidly changing atmospheric-based phenomena, for example presence and intensity of fog, based upon these sensor readings, predicting future precipitation and atmospheric-based phenomena, and estimating effects of the atmospheric-based phenomena on visibility, for example by calculating runway visible range (RVR) estimates and forecasts based on the atmospheric-based phenomena. The described system and methods provide for faster updates and use of rapidly updated collected data sets, significant accuracy improvements and improved forecasting accuracy, and real-time projections.

"Real time" meteorology equipment, such as weather radar, provides precipitation maps showing precipitation intensities and locations on a short time interval, e.g., less than a fifteen minute interval, or optionally less than a five minute interval, or optionally a one minute interval or thereabouts. Diverse meteorological phenomena have diverse temporal evolution (e.g., humidity changes much more slowly than does precipitation intensity). Accordingly the definition of "real time" or "most current data" may depend on the meteorological phenomena being measured and reported.

The system implements a parallel processing pipeline that provides for asynchronous pre-processing of input data in ways that support an order of magnitude reduction in the system compute requirements, which in turn supports forecast cycles as short as 1 minute. The pre-processing steps include converting collected weather data and non-weather data (e.g. vehicle environmental reporting, microwave link attenuation measurements) into high-confidence precipitation, atmospheric water vapor, atmospheric liquid water content, and fog estimates. The system further includes processing steps for ongoing accuracy improvement analysis that permit the system to make effective blending selections that integrate one or more measurements of precipitation intensity (and other weather data) in order to improve the accuracy of resulting forecast generated data by between 30 and 70%, and to improve forecast speed by up to 50%. This type of processing, when combined with the processing architectures described herein, enables the near real-time calculation of weather data and forecast weather data using high frequency data.

The pre-processing steps also integrate a plurality of types of microwave attenuation-based precipitation estimates, improving on known systems which support only terrestrial microwave links. In particular, the computationally complex problems of calculating microwave-based attenuation-based forecast using a plurality of types of microwave links, and for microwave links where the endpoints are constantly changing, supports a more robust interference field. These calculations are described in the related applications. The result of these calculations is a substantially larger set of precipitation data points, which are used for forecasting. This larger set of data points, in part, has many of the attributes of high frequency sensor data as described above, and causes many of the same challenges to forecasting systems.

The system also supports the ongoing asynchronous collection of input data, so the forecast modeling cadence is separated from the collection cycles. This permits the asynchronous updates of forecasts with different types and sources of data independent of the forecast cycle. This has the effect of breaking the collection/forecast cycle timing bottleneck, which is particularly acute for high frequency and large collected data sets. The system further implements a massively parallel forecasting component in order to produce a precipitation (and related weather phenomena) forecast model in near real time for the system users, and to update the forecasting models in real time or near real time with the most recent observation data, thereby improving the ongoing forecasts.

The system as described collects and utilizes processed data generated by weather sensors and information about the weather sensors that generated the processed data in order to rapidly correct and update weather forecasts using real-time weather data collected at high rates of frequency, and use this collected high frequency weather data to update the weather forecasts generated by the system within one or more cadence instances so as to improve the forecasts generated by the system. High collection frequency data poses several challenges. First, computational complexity increases as the number of data points increase. Second, it is observed that many types of high frequency collected data tends to cluster geographically, which limits its effects of forecasts. Optimizations to the forecasting mechanism described herein take account of these attributes and support the partial recalculation of forecasts based upon the area of effect of the collected data.

High frequency updates are most important when forecasts are used in rapidly changing uses, such as aviation, where airplanes are often flying in excess of 500 mph and minute to minute forecast weather condition changes often directly influence operational decisions. In an example aviation forecast usage, the use of the system in forecasting the rapidly changing runway visual range (RVR) is described. The described system determines current and forecast ground level precipitation, atmospheric water vapor, atmospheric liquid water content (LWC), and fog estimates on a granular level on a location-by-location basis, including per airport, per runway, and at RVR sensor locations, and forecasts precipitation, atmospheric water vapor, and fog estimates. The described system uses one or more of these forecast weather parameters (e.g. precipitation, atmospheric water vapor, atmospheric LWC, and fog estimates) to calculate a forecast visibility at a specific location of interest, for example, RVR estimates for a particular airport. The RVR information is updated in real time as additional high-data rate sensors provide up to the minute collected data to the forecasting system. These forecast visibility estimates can be used by customers, including airports, pilots, passenger airline operators, and air freight operators to make planning and scheduling decisions.

The system as described provides significant improvements in the algorithms and processing throughput, as well as providing improvements in accuracy and timeliness of the forecasts and information provided.

These and other aspects and advantages will become apparent when the Description below is read in conjunction with the accompanying Drawings.

6.2 Definitions

The following definitions are used throughout, unless specifically indicated otherwise:

| TERM | DEFINITION |
| --- | --- |
| Microwave Link | A microwave link is a wireless signal connection between two separate antennas, typically either satellite earth station to satellite, point-to-point, static, or dynamic, operating in the microwave or millimeter frequency range. |
| Microwave | Radio signals in the 1.8 GHz to 60 GHz frequency range. |
| RVR | Runway Visual Range |
| Location of interest | One or more geo-located points or polygons for which a user desires forecast generated data. |
| High frequency | Relating to a system in which input data is collected and processed rapidly, typically at intervals of 1, 5, 10, 30, or 60 seconds. For some types of input data, the collection interval is less than 1, 3, or 5 minutes. |
| Real-time | Relating to a system in which input data is processed and made available as it is received, typically within seconds, so that it is available virtually immediately for further use or computation. |
| Data source | Sources of collected data including various satellite (340a) and terrestrial (340b) microwave network data sources, Numerical Weather Prediction (NWP) model data sources (341), RVR ancillary data sources (343), weather radar data |

-continued

| TERM | DEFINITION |
|---|---|
| | sources (344), weather sensor data sources (346) including sources of data from stationary and vehicle-mounted weather sensors, Map data sources (348), and other info data sources (347) (i.e., any sources of data that do not fall into any of the other data categories) |
| Vehicle weather sensor data | Collected data from weather sensor data sources that provide data collected from weather sensors on manned or unmanned vehicles, including ground vehicles, ocean or fresh water vehicles (boats), and air vehicles (airplanes, UAV, balloons) Includes data collected by mobile weather data sensors (their location can change each time a reading is taken). The weather sensor data that is collected can include weather parameter data such as measured values of outside temperature, moisture, and humidity, or may include data from which generated collected data is derived such as attenuation of vehicle-mounted radar devices. |
| Collected data | Includes weather parameter data and information related to the weather parameter data collected from one or more data sources. Collected weather parameter data includes, for example, weather parameter data values reported by a weather sensor data source and information about the weather sensors that generated the weather parameter data values. Collected data includes, for example, terrestrial and satellite microwave link attenuation measurement values and information about microwave links and endpoints associated with the microwave link attenuation values. Collected data may be filtered and transformed in order to produce processed collected data, or used to calculate or derive generated collected data. |
| Processed collected data | Collected data that is pre-processed using one or more preprocessing programs that may use predefined filters and data transforms in order to make the data ready for use by the forecasting systems. Processed collected data includes collected data transformed and tagged for use in cadence based processing. Processed collected data is stored, organized by data type, cadence cycle, and tile layer in the system database.<br>Processed collected data includes, for example, weather sensor processed data (622), e.g., humidity, air temperature, and atmospheric pressure from ground and mobile weather sensors; NWP processed data (619), for example HRRR data; microwave link processed data (625a, b); map processed data (628); and other info processed data (622) |
| Generated data | Data generated by the system, either as new data, forecast data, or derived from one or more other data such as collected data and processed collected data. |
| Generated collected data | New data derived, calculated, or interpolated from the collected data or processed collected data (such as calculating rainfall from attenuation data) and stored in a system database.<br>Generated collected data includes: microwave link precipitation, atmospheric water vapor, and fog LWC estimates (e.g., 626a, b) |
| Weather parameter data | Data representing values of weather parameters including precipitation intensity, air temperature, atmospheric pressure, humidity, wind velocity, and wind direction. Weather parameter data includes processed collected and generated collected data that includes values of weather parameters, for example processed collected temperature and humidity data and generated collected precipitation estimates. |
| Forecast generated data | Data generated during the forecast cycles of the cadence instance, stored in a system database, and typically represented as a set of one or more tile layers (typically one tile layer for each forecast data type, each tile, and each tile layer associated with a timestamp) for each forecast cycle. The timestamp corresponds to increments in the forecast time (e.g. tied to the time of each forecast cycle). Thus, forecast generated data set (and timestamp) $F_0$ is the current time at which collection completes for the cadence instance (e.g. the time that the cadence index is incremented), $F_1$ is current time + forecast interval, $F_2$ is current time + 2 * forecast interval, etc.), repeating out to the forecast limit. Forecast limits are tunable for the system; typical values are between 2-6 hours for short term, high resolution (NowCast) forecasts, and 1-10 days for long term, lower resolution forecasts.<br>Forecast generated data includes: forecast precipitation data (902), fog forecast data (991), and forecast RVR data (922). |

| TERM | DEFINITION |
| --- | --- |
| Processed data | Comprises processed collected data that has been previously associated with a cadence instance and has been further processed by one or more data processing programs of the system, with results of that processing stored in a system database. Processed data can include microwave link data and attenuation data, current radar reflectivity and precipitation data, wind characteristics, temperature, humidity, dew point, vehicle sensors, and other conventional weather related information that has been collected, formatted, and stored in the various databases.<br>Processed data may include additional refinements to collected data, generated collected data, additional information derived from processed collected data, processed generated data, or forecast generated data, or data that is calculated by other systems and associated with one or more cadence instances. A further example of processed data includes forecast generated data blended with processed data, for example NowCast data blended with NWP forecast data. |
| Post-processed data | A data instance further comprises post-processed data which is data derived from processed data.<br>An example of post-processed data is runway visual range (RVR) or more generally visibility, which is derived from processed data including precipitation, atmospheric water vapor, and fog or liquid water content of the atmosphere. |
| Cadence index | Typically an increasing number that is used to reference a current (or specific) cadence instance. Alternatively, the cadence index may be any unique ID. |
| Tagging | Collected data is associated with a one or more cadence instance(s) and forecast cycle using a cadence index value (the (i) of $M_i$) and optionally a forecast cycle ID (the (j) for $M_iF_j$). Making this association is referred to as "tagging", and the any tile data may be tagged with one or more tags (e,g., cadence instance IDs, forecast cycle IDs, tile layer names), and additional tags may be added or removed during subsequent processing. |

6.3 Exemplary System Architecture

An illustrative, non-limiting, computing system that implements aspects of the technology(ies) is structured with four general processing components (i.e., servers), based in part upon the nature of the information being processed, and the manner in which the information is processed in order to enable near real-time determination of the nature of weather conditions of a geographic region and to forecast weather conditions over the geographic region.

This functional organization of components is provided for illustrative purposes; it is contemplated that other functional organizations may be implemented using the techniques described herein.

The system architecture has four servers (e.g., including data processing components), based in part upon its function and the nature of the information being processed: A first server (including a data processing component) is an information collection and normalization component; a second server (including a data processing component) is an offline/background processing component; a third server (including a data processing component) is a modeling and prediction component; and a fourth server (including a data processing component), is an information distribution and alerting component.

Figure 1:
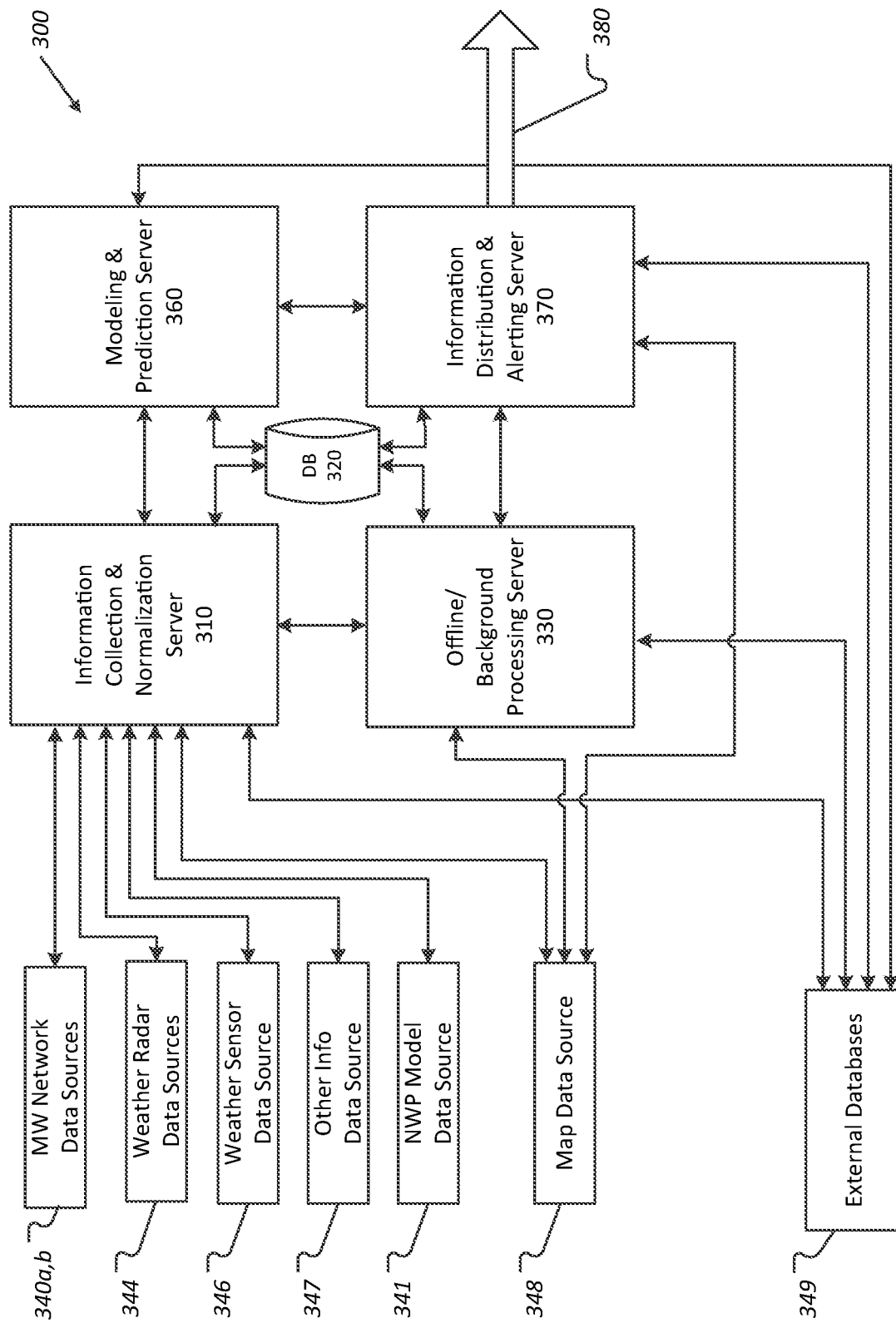
FIG. 1 depicts an exemplary systems diagram of a computing apparatus supporting aspects of the described system, according to an illustrative embodiment.

FIG. 1 illustrates, by example, a precipitation modeling and forecasting system (300) comprising four computing servers (310, 330, 360, and 370) performing the data processing tasks appropriate to the server architecture, with each server operating as a different one of the logical processing components. The servers share information directly, or through a system database (320), or external databases (349). The functions of the servers may be combined into fewer servers, or expanded so that there is a plurality of physical servers without deviating from the described system.

Each of the servers has access to external data sources (340-348) and internal or system data sources from the system database (320) or from databases operating on one or more of the four servers as is required to perform the necessary data collecting, data clean up and pre-processing, precipitation modeling, forecast modeling, or the like. Input and output data is processed and modeled in real time, in a time delayed mode, and in batch mode, respectively, either simultaneously or asynchronously, and shared between system components on various servers using network communications, notifications, messages, common storage, or other means in common use for such purposes. The described architecture segregates programs and processes that have different attributes, including the programs and processes that are periodically performed on a scheduled routine or basis, batch collection and loading of data, computation intensive and parallel processing modeling, and user interface, onto separate servers for purposes of clarity of presentation. Alternatively, or in addition, other processing arrangements may be used to implement the system of the present invention.

According to the described technology, each exemplary server may be implemented as an individual computer system, a collection of computer systems, a collection of processors, or the like, either tightly or loosely clustered, a set of interacting computer systems that are not clustered, or other arrangement as deemed appropriate by those with skill in the art. Computer systems can be implemented using virtual or physical deployments, or by using a combination of these means. In some implementations, the servers may be physically located together, or they may be distributed in remote locations, such as in shared hosting facilities or in virtualized facilities (e.g. "the cloud").

Figure 2:
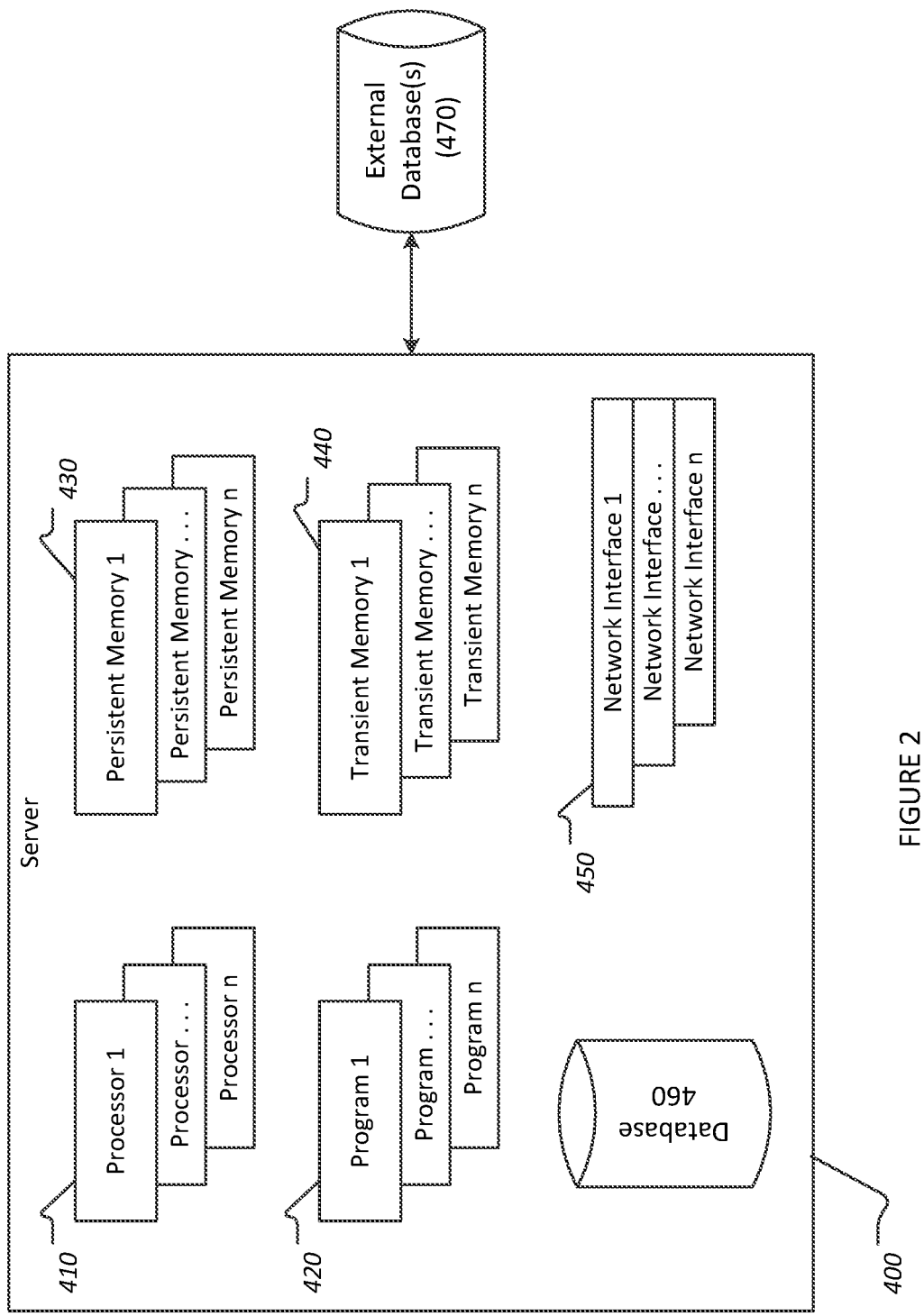
FIG. 2 depicts an illustrative exemplary computer server that supports the described system, according to an illustrative embodiment.

An exemplary computer server (400) is illustrated in FIG. 2. Each exemplary server comprises one or more processors or data processing components (410), operably connected to memories of both persistent (430) and/or transient (440) nature that are used to store information being processed by the system and to additionally store various program instructions (collectively referred to herein as "programs") (420) that are loaded and executed by the processors in order to perform the process operations described herein. Each of the processors is further operably connected to networking and communications interfaces (450) appropriate to the deployed configuration. Stored within persistent memories of the system may be one or more databases used for the storage of information collected and/or calculated by the servers and read, processed, and written by the processors under control of the program(s). Database 460 is an internal instance of at least a portion of the system database (320). A server may also be operably connected to an external database (470) via one or more network or other interfaces. The external database may be an instance of the system database that is provided on another server, or may be a network connected database that is a commercial or other external source (349).

Information Collection and Normalization Server (310)

Referring again to FIG. 1, the first server (including a data processing component) is an information collection and normalization component (310) that interacts with external data sources (340-348) and collects relevant information from these data sources for use by the precipitation modeling and forecasting system (300). The Information Collection and Normalization Server provides the asynchronous data collection processes involving communicating with the data sources, pre-processing the collected data, and making the collected and processed data available for the forecasting and modeling components of the system. In some embodiments, additional processing to produce generated data from the collected and processed data is performed on the server. The asynchronous collected and pre-processing of the collected data permits the high-frequency collection and pre-processing of data without direct effects to the forecasting the forecasting cycles.

The information collection and normalization server (310) error-corrects, reduces redundancy, improves the accuracy of, and normalizes information collected from the various data sources. The information collection and normalization processes implement the first part of the processing pipeline using a series of data collection, data cleaning, and data normalization programs. One aspect of these programs this that they use pre-calculated filters, data transforms, and trained machine learning (ML) models in order to convert the raw collected data into processed data or weather data that is usable by the modeling and forecasting portions of the system. These pre-calculated filters and data transforms are structured to eliminate much of the compute requirement of traditional system architectures. Similarly, the information collection server applies pre-calculated filters to collected data to remove data that is extraneous, erroneous, distorted, or otherwise unreliable in order to improve accuracy of the processed results. A combination of filters, transforms, and trained. ML models may be used.

The information collection server stores the collected information into one or more databases in forms associated with one or more cadence cycles and cadence cycle tile layers in order to make it available to the other components of the system. The stored data is formatted in a manner that allows more efficient further processing of the stored data and provision of a more accurate precipitation, atmospheric water vapor, and fog model and forecast model. In a particular exemplary embodiment, the information collection and processing server processes collected microwave attenuation data (of various types) to calculate satellite microwave precipitation, atmospheric water vapor, and atmospheric LWC estimates, which is saved to one or more microwave precipitation databases.

Operation of the Information Collection and Normalization Server is more fully described in previously presented non-provisional U.S. patent application Ser. No. 15/632,025 and the related application.

6.3.1 Offline/Background Processing Server (330)

Continuing to refer to FIG. 1, a second server (including a data processing component) is an offline/background processing component that retrieves updates from the information collection and normalization server (310), from the system database (320), and from external databases (349). The server executes processes and programs to generate transforms, filters, time series rule ML models, and trained predictive models that other servers implement to calculate and forecast weather data. The offline/background processing server also executes a series of background and scheduled programs that recalculate and/or update information related to the precipitation, fog, and RVR machine learning models and the underlying reference tables that these models rely upon. Additionally, the server performs non-time critical processing of collected information and non-time critical updating of low-temporal resolution calculations and modeling, and it also performs non-time-sensitive data processing on collected information, and periodic processing to update longer term models and the fog inference rules (921).

The server also pre-calculates and updates pre-calculated data filters for translating collected information into formats usable by other servers and programs of the system, including filters that are used to exclude redundant or erroneous data points and to reduce data volumes that are saved to databases. The processes for generating pre-calculated filters and transforms are discussed in the related application.

The server also calculates, trains, and updates the machine learning models used by other servers to generate weather parameter data. For example, the server produces trained ML model(s) for inferring whether combinations of collected and generated data imply that atmospheric moisture will be present as water vapor, rain, snow, or fog.

As described in the related application, one or more data processing programs are executed on one of the server (e.g. server 310 during collection processes, server 330, or server 360 during post-collection processing of a cadence cycle). These programs perform many functions, some of which are to apply the pre-calculated filters to collected information to remove data that is extraneous, erroneous, distorted, or otherwise unreliable in order to improve accuracy of the processed results. Additionally, these programs may apply pre-calculated transforms in order to generate data in a new or converted form from previously collected and/or processed data, and may further apply the trained ML models to generate new and inferred data from the collected and processed data. Alternatively, the functions of these data processing programs may be incorporated in other collection or forecasting programs.

The data generated by each of these executing programs, on which ever server they are executed, are written back to the system database and are shared with the other servers in the system either directly or through the database.

Operation of the Offline/Background Processing Server is more fully described in the related application.

6.3.2 Modeling and Prediction Server (360)

Also referring to FIG. 1, a third server (including a data processing component) is a modeling and prediction component that performs parallel computations for preparing a precipitation forecast that at least indicates a precipitation type and a precipitation intensity at various locations and is preferably further based on other weather phenomena.

The modeling and prediction server implements the cadence manager, which controls the operation of the cadence-based forecasting programs, and the programs that implement each portion of the cadence cycle. The cadence and cadence manager is described in more detail below.

The server also implements one or more data management (e.g. applying transforms, tile layer compares, copy, and blending), weather inference, and weather forecast programs. These programs are used create aspects of the forecast data for the system. Generally, the modeling and prediction server programs retrieve data of the forecast program required type and time window from the system database (320) and from other sources of data provided by the system. The modeling and prediction server executes one or more programs to perform various complex and processor intensive modeling and prediction algorithms and data manipulations used to prepare a one or more weather and precipitation forecasts. Processing results (processed collected data, generated data, forecast data, and weather data) are stored as updates to, or as new information for, one or more logical databases. Alternatively, one or more of the stored data are sent directly to the information distribution and alerting server (370) for use in notifying a user or producing a forecast report.

Figure 3:
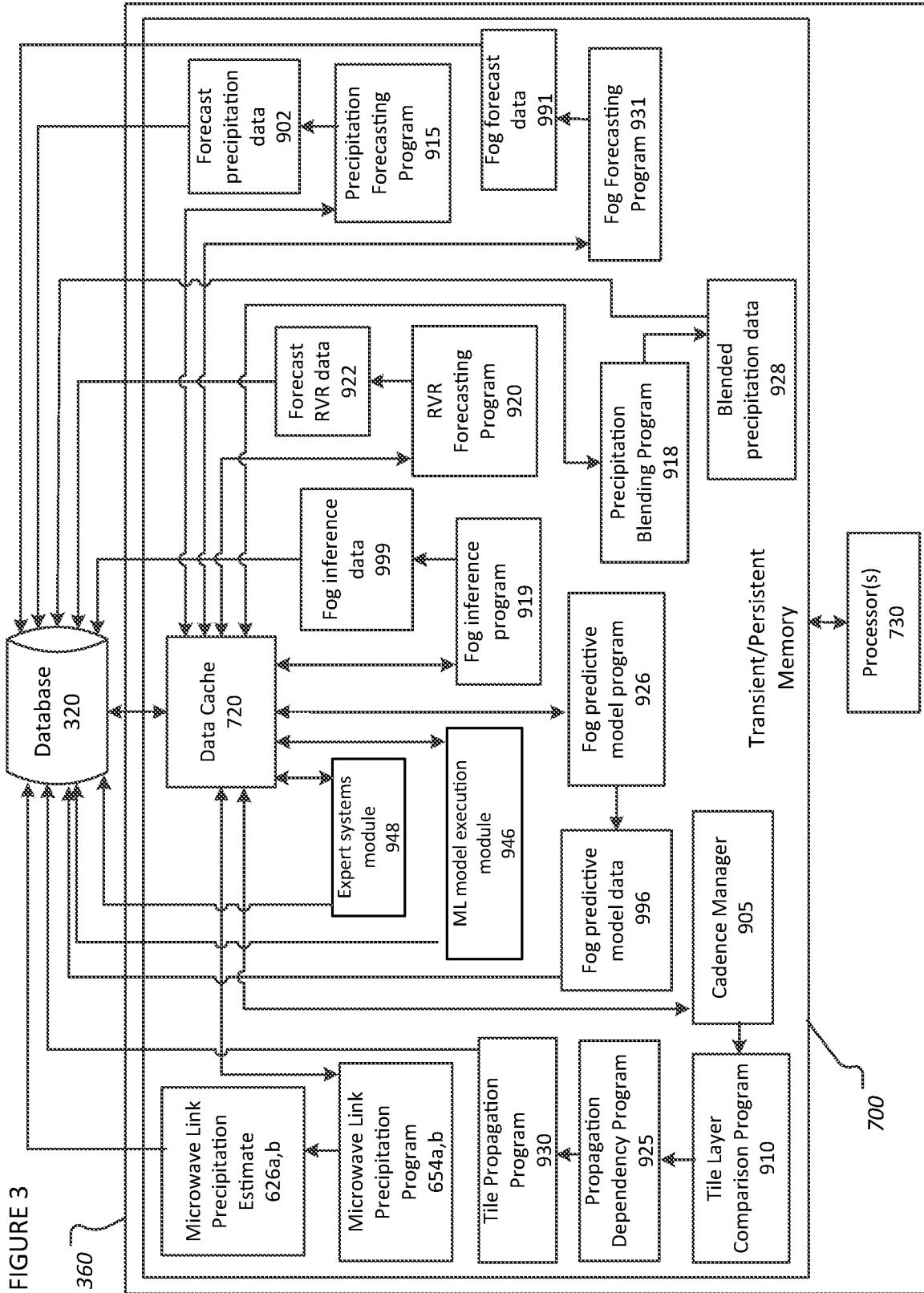
FIG. 3 depicts an illustrative modeling and prediction server of the described system, according to an illustrative embodiment.

The modeling and prediction server (360), as illustrated in FIG. 3, comprises one or more computer systems similar to the exemplary server illustrated in FIG. 2. This server comprises one or more processors (730), programs (854a,b, 905, 910, 915, 918-920, 925-926, 930-931) that are stored and executed from transient or persistent memory (700), and one or more databases such as system database (320). Details on the individual programs is provided below.

6.3.3 Information Distribution and Alerting Server (370)

Figure 4:
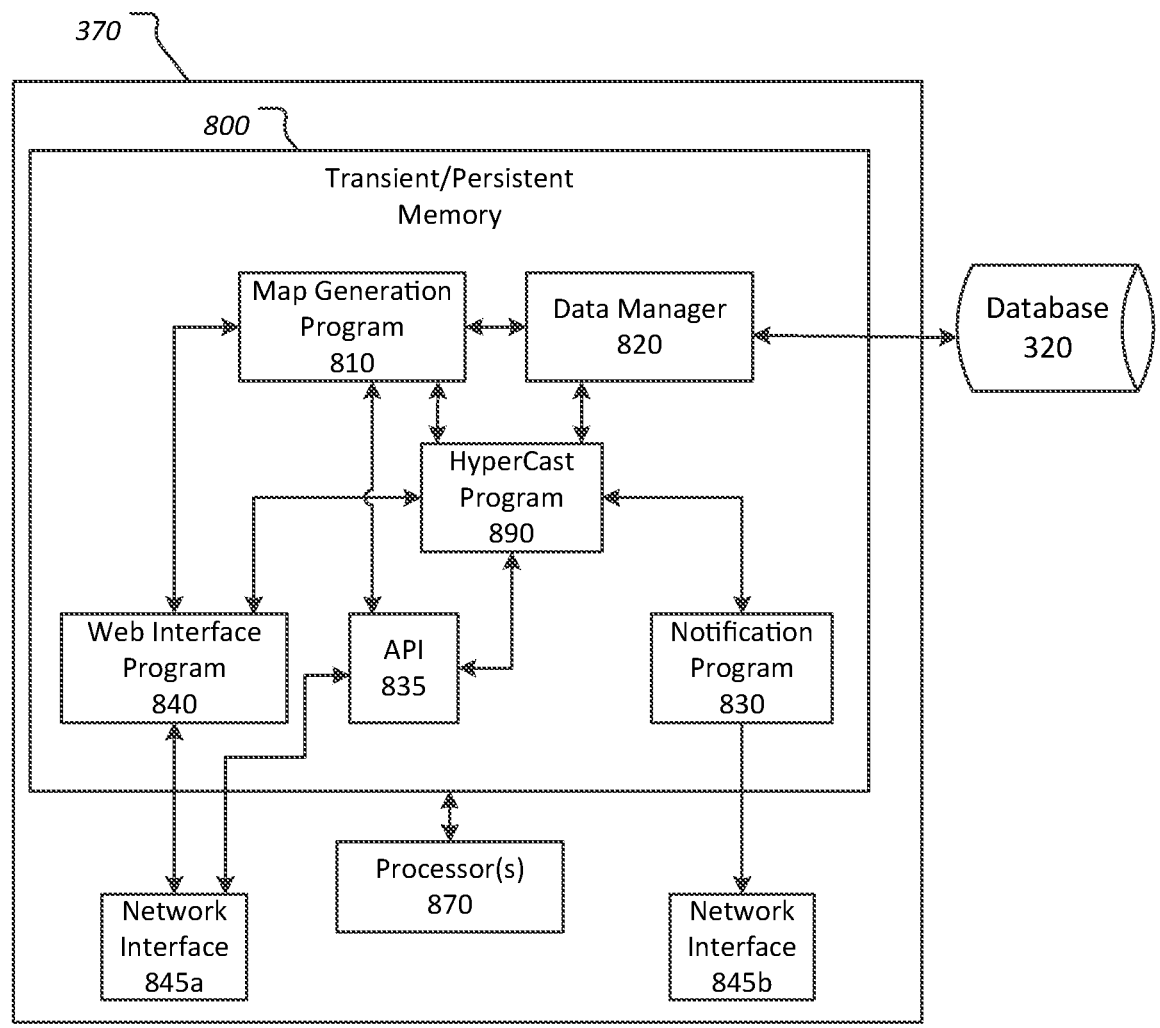
FIG. 4 depicts an illustrative information and alerting server of server of the described system, according to an illustrative embodiment.

Also referring to FIG. 1 and FIG. 4, a fourth server (including a data processing component), is an information distribution and alerting component (370) that retrieves information from the system database (320), or directly from the modeling and prediction server (360), and processes the data received therefrom. The processing is performed in order to merge forecast generated data with one or more customized mapping and or information templates (e.g., also retrieved from the system database or from public map sources and data sources such as map data sources (348) and external databases 349)), in order to produce data outputs (380) used for weather-based information products that are distributed to end users. The weather-based information products may be produced on demand or on a scheduled basis. Weather-based information products can include a map and/or report showing current precipitation intensity and other weather conditions over a geographic region; a forecast map showing expected precipitation intensities and other weather conditions over the geographic region, wherein each map may include expected total precipitation accumulation from a given weather event, or the like; as well as other products usable to alert users of potentially hazardous conditions, to track historic weather conditions, to predict further weather conditions, and to provide customized weather maps focused on user selectable parameters (e.g. for a particular building or property, or the like).

The information distribution and alerting server also provides a user interface component (e.g. web interface or API) that permits the user to specify forecast types (e.g. precipitation, RVR), forecast time requirements (e.g. for the next one hour), locations of interest (e.g. an airport (as a whole, such as WBWI) or a specific runway. Other types of specific forecasts also may be requested from the user interface component.

Operation of the information distribution and alerting server is more fully described in previously presented non-provisional U.S. patent application Ser. No.15/632,025.

6.3.4 System Database (320)

The system database (320), as depicted in FIG. 1, may include one or more individual databases (e.g. stored on each of the servers of the precipitation modeling and forecasting system (300)), and/or may include a centralized database server, including one or more logical databases, used to store data used to generate precipitation estimates and precipitation forecast models and or maps. The system database may also include an external database server or database service such as a cloud-based data storage service. Individual databases of the system identified throughout this document are part of the system database. These individual logical databases are listed in Table 1 below and are omitted from the drawings for clarity.

TABLE 1

Logical Databases (within System Database)

| Number | Name | Description |
| --- | --- | --- |
| 322 | Radar database | Contains radar processed data (621) including radar reflectivity data (545) and radar precipitation data (546) |
| 323 | Weather sensor database | Contains weather sensor data (522) and weather sensor processed data (622) |
| 324 | Other info database | Contains other info data (52.3) and other info processed data (62.3) |
| 325 | Precipitation forecast database | Contains forecast precipitation data (902) generated by precipitation forecasting program (915) |
| 329 | NWP model database | Contains NWP data (526) and NWP processed data (619) including, for example HRRR data |

TABLE 1-continued

Logical Databases (within System Database)

| Number | Name | Description |
|---|---|---|
| 350 | Storm objects database | Contains storm object data (548) generated from collected data, for example storm objects generated from radar reflectivity data (545) or radar precipitation data (546) by a radar data collection program (512) or by a radar data processing program (611). |
| 352a | Satellite microwave link attenuation database | Contains satellite link data including signal attenuation data (525a) and satellite microwave link processed attenuation data (625a) |
| 352b | Terrestrial microwave link attenuation database | Contains terrestrial microwave link data (525b) and terrestrial microwave link processed attenuation data (625b) |
| 355 | Forecast skill database | Contains calculated forecast skill metric data |
| 356a, b | Microwave link precipitation databases | Contains satellite and terrestrial microwave-attenuation-based weather data, including one or more of precipitation intensity estimates, atmospheric water vapor estimates, and LWC estimates (626a, b) generated by microwave link precipitation programs (654a, b). |
| 391 | Location of interest database | Contains locations of interest information, e.g, flag locations, polygon location and boundary definitions, and configuration information associated with locations of interest. |
| 392 | Accuracy Improvement database | Accuracy improvement details for precipitation sources by location. |
| 393 | Transform and filter database | Contains stored transforms and filters |
| 633 | Vehicle weather instrument characteristics database | Contains characteristics of vehicle weather instruments |
| 657 | Terrestrial microwave link topology database | Contains terrestrial network link endpoint locations, Tower ID's, transmitter and receiver characteristics, etc. Also includes satellite link endpoint locations (e.g. earth station locations). |
| 880 | Map database | Contains map data (528) and map processed data (62.8) |
| 923 | Forecast RVR database | Contains Forecast RVR data (922) |
| 929 | RVR location and ancillary data database | Contains data useful for RVR calculations, such as runway light intensity, corresponding to the locations of interest selected for RVR forecasts. |
| 997 | Fog predictive data model database | Contains fog predictive model data (996) generated by fog predictive model program (926) including predicted locations and intensity of fog based on atmospheric data |
| 998 | Fog inference data database | Contains fog forecast data (991) and fog inference data (999) including fog yes/no or probabilistic inference and, in some embodiments, fog LWC estimates. |

It should be noted that the physical processing and storage system have the data being read and written directly to one or more system databases, and organized within those databases so that the subsequent data access steps are efficient.

6.3.5 External Databases (349)

The system (300) as depicted in FIG. 1 may also access and use external databases (349), which are accessed by the information collection and normalization server (310) as appropriate. The information collected by the information collection and normalization server may be processed further by the server, and then written to one or more system databases (320), and the information is then shared with the other servers (330, 360, and 370) in the system, either directly or through the system database(s), for use in various weather related processing steps.

6.4 Cadence

Figure 5:
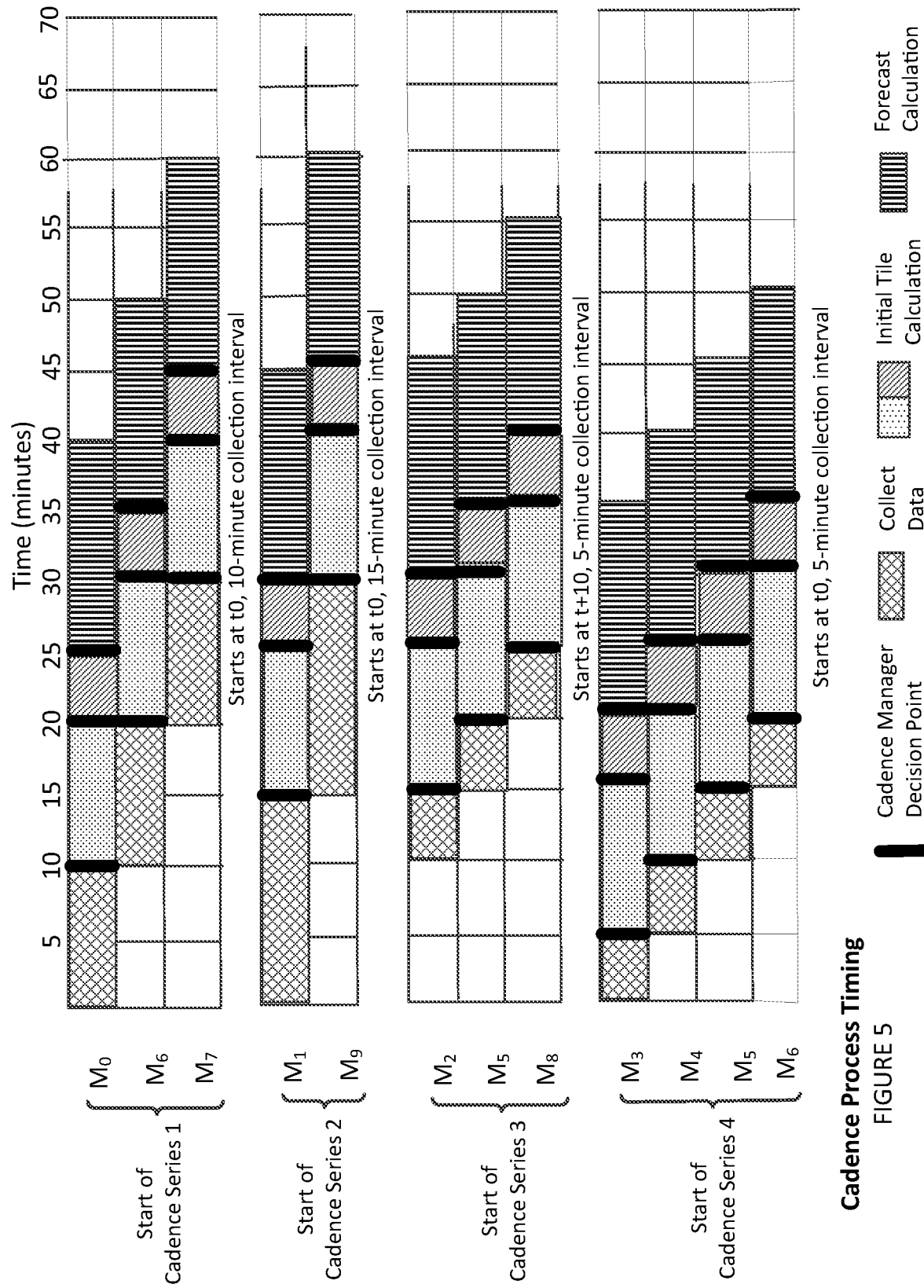
FIG. 5 illustrates cadence cycle processing timing, according to an illustrative embodiment.

6.4.1 Cadence Cycles and Cadence Instances as Logical Processing How and Data Models The system described herein operates in two modes: (1) the cadence cycle, a series of repeating processing steps that perform one or more of the following actions for each iteration: process collected data into weather data, generate forecast weather data, and post-forecast processing, and (2) a set of ad-hoc processing steps related to monitoring the data created as a result of these processes and for making the created information available in a variety of forms. A group of related cadence cycles is called a cadence series. The system can support more than one set of cadence series at a time, but only a single cadence series is illustrated in detail herein for clarity. The system manages sequences of cadence instances, one for each cadence cycle of a cadence series that is performed by the system. The cadence series is represented as a group with member cadence instances. A cadence instance may be a member of more than one cadence series. This is illustrated in FIG. 5.

The data collection and processing for each cadence cycle iteration are represented by a data construct called a cadence instance. In an embodiment, each cadence instance is represented by a cadence instance data structure stored in a system database that serves as a "master control record" for cadence cycle processing. Data collected or generated during the processing of the cadence cycle is associated with at least one cadence instance data structure, as described herein.

As the cadence cycle processing progresses and data is generated by one or more programs of the system and stored to the system databases indexed by at least one cadence instance and cadence cycle processing step, the information that is made available by referencing the cadence instance increases. The data that is generated and stored includes collected data, data derived or calculated from the collected data, forecast data generated during the forecast cycles of the cadence instance, and information that is further generated or derived from the forecast data. Collected data, generated data, and forecast generated data are organized by their tile representation in one or more cadence instance tile layer(s). Note that the data management portion of the system expressly supports the addition, modification, and removal of associations, for example, cadence instance and cadence cycle processing step information associations, with data elements stored in the system, as well as the management of one or more sets of these associations. New associations for data elements, or even replacement of previously made associations by new associations with new current, prior, or even future data elements may be made by changing only the associations between cadence instance, cadence cycle processing step, and/or tile layer and one or more data elements. This permits the identification of data elements, addition of new data elements, the deletion of obsolete data elements, the replacement of updated data elements, the movement of data elements from one tile layer to another, the sharing of data elements between two or more tile layers, and the substitution of data elements on an individual, tile layer, or cadence cycle/processing step basis. For example, if a real-time precipitation reading is collected from a weather sensor such as a ground weather station rain gauge in a subsequent cadence cycle, prior forecast calculations may be updated to use the now current weather reading and their NowCast predictions altered to reflect the updates in real time.

For ease of understanding, we refer to a cadence instance by the abbreviation $M_i$, where (i) is the cadence instance ID. The cadence instance ID can be a unique identifier, or simply a constantly increasing number such as a system clock count or even a monotonically increasing value. Each cadence instance structure also contains one or more timestamps which identifies (a) when the cadence instance was started, (b) when collection was completed, (c) when each processing step was performed, and (d) when each forecast cycle's processing was started/completed, and other information useful for tracking and managing the status of a cadence instance.

Figure 6:
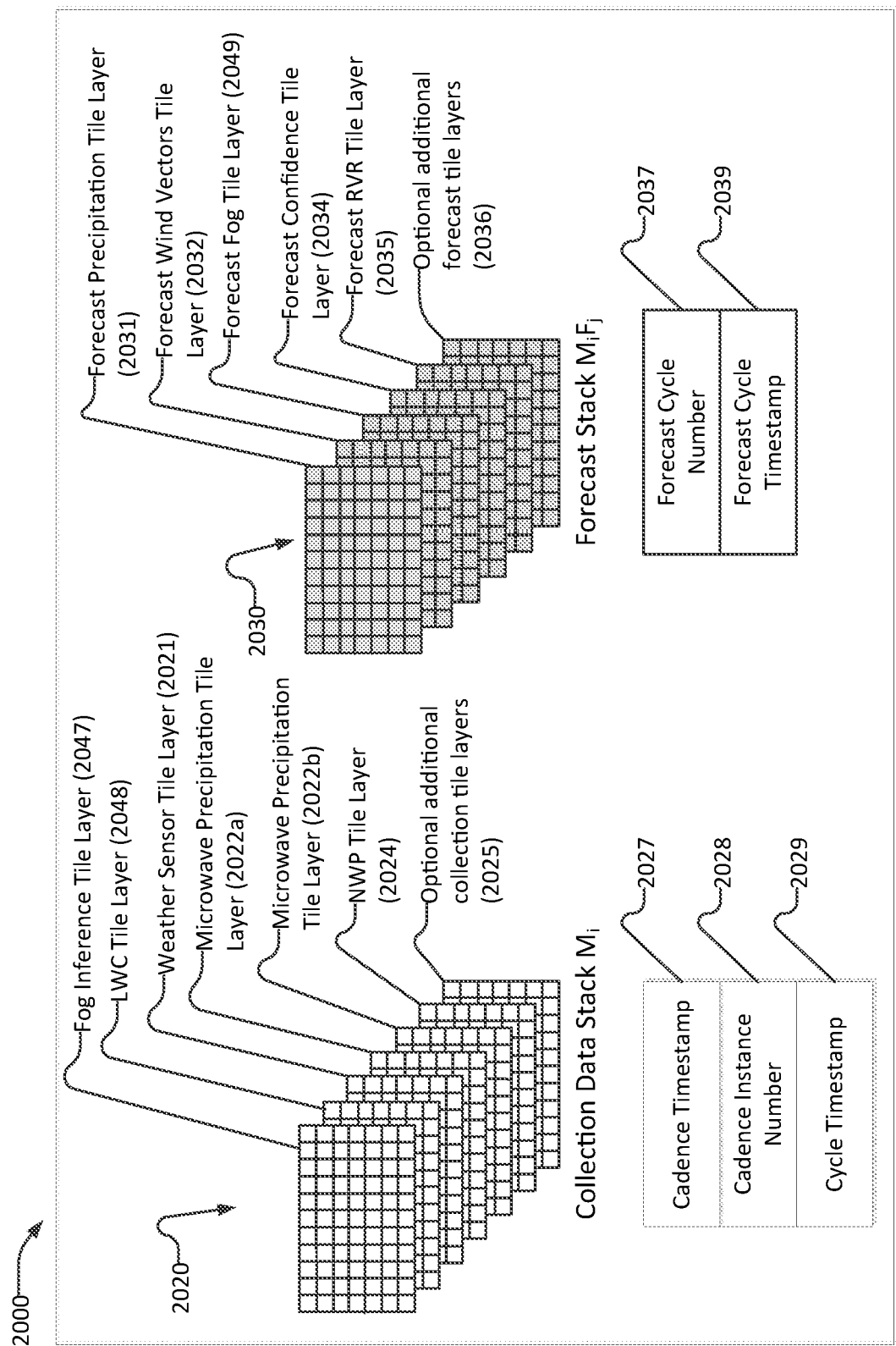
FIG. 6 illustrates an exemplary improved cadence instance structure, according to an illustrative embodiment.

A tile layer is a structure for organizing data associated with a cadence instance. Tile layers may be associated with one or more types of cadence instance data, and are often associated with the collection, forecasting, or post-forecast processing process that created the data, as illustrated in FIG. 6. Each tile layer has a set of defined characteristics, represented as a series of "tiles." Tile layers may be sparse structures, as not all tiles in a tile layer are populated with data. Tiles each roughly correspond to map sections, but are not bound to a particular map or scale. Typically, each tile layer has tiles of a consistent size. In some embodiments, however, a tile layer's tile sizes are identical. In other embodiments, the tile sizes of diverse tile layers may differ. The processes that access the data associated with a tile layer manage the translation of the tile layer to whatever geographic coordinates are needed.

A tile stack, sometimes more formally called a cadence instance tile stack, is a structure representing a set of one or more logically associated tile layer(s). A tile stack includes one or more tile layers) associated with a specific cadence instance, comprising the tile layers associated with the instance's collection, forecasting, and processing programs of the system.

The collection data stack is a tile stack associated with the collected data of a cadence instance. The collection data stack includes collected data tile layer(s), which are the organizational representation of collected data, in either raw form, pre-processed form, or post-processed form.

The forecast tile stack is a tile stack associated with the forecast information of a cadence instance. The forecast tile stack includes forecast tile layers, which are tile layers comprising data associated with a forecast program. The forecast tile layer is sometimes described by the name of the associated forecast program, e.g. a forecast tile layer associated with an RVR forecasting program is sometimes described as a forecast RVR tile layer and a forecast tile layer associated with a fog forecasting program is sometimes described as a forecast fog tile layer.

The post-forecast processing tile stack is a tile stack associated with post-forecast processing information of a cadence instance. The post-forecast processing tile stack includes post-forecast processing tile layers, which are tile layers comprising data associated with a post-forecast processing program. A post-forecast tile layer is sometimes described by the name of the associated post-forecast processing program.

An example cadence instance logical structure (2000) is depicted in FIG. 6. The cadence instance logical structure illustrates two tile stacks: collection data tile stack $M_i$ (2020) and forecast stack (2030). Other tile stacks, such as the post-forecast processing tile stack and weather product tile stack are not shown for clarity, but have similar structures and tile layers to the collection data and forecast tile stacks. Each tile stack (2020, 2030) includes a set of tile layers (collection tile layers (2021-2025) and forecast tile layers (2031-2036)). Tile layers are typically organized by the process that creates them, e.g. a forecast precipitation tile layer (2031) is associated with precipitation forecasting program (915). Alternatively, tile layers may be organized by the presence or absence of one or more specific attributes, by the value or value range of one or more specific attributes, information source or processing steps performed on the data. These alternative organizations are useful for some data representations, for example, to bin multi-dimensional data such as collected weather sensor data binned by geographic location or geographic feature and to associate satellite microwave precipitation and LWC estimates with tile layers organized by altitude.

Each tile layer stack (2020, 2030) includes identifying labels and/or timestamps, as well as an indication of the processing program that created it. The cadence timestamp represents the time at which the cadence index was incremented and is used in the cadence cycle process to adjust for collection delays. The forecast timestamp represents the time at which a forecast cycle was started or stopped. Each collected data stack $M_i$ (2020) includes cadence timestamp (2027), cadence instance number (2028) (i.e. the (i) of $M_i$) and cycle timestamp (2029). Each forecast stack includes forecast cycle timestamp (2039) and is identified by cadence instance ($M_i$) and forecast cycle number (2037) (i.e. the j of $M_iF_j$).

This structure permits the extension of the system by adding additional processing programs and adding one or more additional tile layer(s) associated with each added additional processing program without changing the data organization of cadence instances. The non-limiting exemplary tile layers (2021-2025, 2031-2036, 2048-2049) illustrated in FIG. 6 are not meant to represent all possible tile layer types usable by the technology disclosed herein. For example collected data stack $M_i$ (2020) can include additional tile layers such as a cloud water content tile layer and a radar reflectivity data tile layer, and forecast stack $M_iF_j$ (2030) can include additional tile layers such as a LWC forecast tile layer or cloud water content forecast tile layer. Additionally, one or more tile layers illustrated in FIG. 6 can be replaced by alternative tile layers. In some cases, a tile layer may be constructed, in whole or in part, from previously collected data instead of current collected data. This may occur when a data source has a very low frequency of collection relative to the cadence frequency, or when the data is of a type that only varies over long time cycles, such as humidity. In these cases, the system may collect new data periodically and each cadence instance created between collections will reference the most recently collected data previously stored. This may be done by associating the previously collected data with an additional cadence ID of the current collection cycle so that the collected data is shared between two or more cadence instances.

Similarly, if it is subsequently determined that aspects of two or more cadence structures (o parts of cadence structures) are functionally identical (or are identical within a defined threshold), the system may "prune" some or all of a duplicate structure by replacing the data from the pruned structure with references to the duplicated data. This reduces the amount of data that must be stored in the system and supports the elimination of additional processing if two or more cadences are producing similar calculated and forecast generated data. Aspects of cadence structures may be compared using tile comparison program (910), as described below.

Each cadence instance comprises one or more of collected data, processed collected data, generated collected data, and forecast generated data.

Cadence instances may use references to previously defined (either forecast or collected) tile layers (or subset of tile layers) to substitute for slow-update collection processes and to speed processing by referencing previously processed data that has not significantly changed. If collected data is not available for a parameter at a location when $M_i$ is populated with data, collected data from older models is used, i.e. from the set bounded by $M_0$ through $M_{(i-1)}$, corresponding to the location. Historical information can include collection tile stack information retrieved from cadence instances that are older than model $M_i$, or may include information from historical models that correspond to the requested location and time. This form of updating of the forecast to include the most current collected, processed, or post-processed data improves the forecast accuracy by 30-70%.

Cadence instances may include information generated by internal processes, such as machine learning models that are generated by the modeling and prediction server, and are then used to process collected data and produce new tile layers of data based, at least in part, upon the predictions. For example, trained machine learning model, for example a neural network, may be used to calculate a probability of a forecast event being rain, mist, or fog based upon past historical weather data combined with current collected and forecast generated data. In an exemplary embodiment, the probability of rain, mist, or fog may be used to confirm or refute an interred presence or absence of fog which is used by future processing steps, such as NowCasting and/or RVR calculations to determine the contribution of rain and/or fog to the precipitation and visibility forecasts.

One aspect of the cadence structure is that forecast processing may reference future collected data and future processed or post-processed data that is part of a future cadence instance. This is useful in two ways; it permits the integration of uncollected or unprocessed data into existing models, and it permits portions of the system to be updated with more recent collected or forecast generated data as it is generated. For example, if a forecast model predicts rain will arrive at a location at 13:00, but a rain gauge records the rain actually arrived at the location at 13:30, the forecast model is clearly inaccurate and may require reprocessing. One way the system handles this is to run a new cadence cycle and generate a new forecast. Alternatively, the updated data may be selectively updated within one or more tile layers, and the forecast models rerun for only the updated data (and any subsequently affected data).

Each cadence instance of a cadence cycle progresses through a series of processing stages, which are partially controlled by timing parameters. Cadence cycle timing (e.g., instance to instance within a cycle, forecast cycle to forecast cycle within an instance, and inter-cadence cycle delay) may vary, based upon the length of time required to complete each stage of processing and the frequency of system data collection activities. The system may also enforce an interstitial delay between cadence cycles if desired. Cadence cycle timing may vary based upon weather or upon the results of one or more previous cadence cycle processing steps. For example, cadence cycle length and collection interval length may be increased during clear weather and decreased during stormy weather.

Several parameters control the processing of the cadence cycle for a cadence series, as described in the table below:

TABLE 2

Cadence Series Processing Control Parameters

| Timing control parameter | Description |
| --- | --- |
| Cadence instance start interval | Interval between cadence instance processing start times. |
| Data collection time interval | Defines the amount of time a cadence cycle will collect data for prior to advancing to the collection post processing stage. |
| Collection post-processing start delay time | Defines the amount of time the cadence instance collection post-processing stage delays starting the collection post collection processing programs. |
| Forecast cycle time increment | The amount of forecast time between forecast cycle iterations. |
| Cadence instance forecast post-processing delay | The amount of time that the forecast cycle post processing stage delays starting the forecast cycle post processing programs. |
| Cadence instance interstitial delay | The amount of time that the cadence cycles delay between cadence instances. |

In some embodiments, the cadence cycles execute asynchronously and the cadence instances are separated by the interstitial delay. In other instances, the cadence instances are performed synchronously, with each cadence instance started at a particular clock interval from a previous cadence instance.

Aspects of a first cadence instance, such as an entire tile layer of the first cadence instance, may be compared to other equivalent aspects of a second cadence instance, and if the aspects are sufficiently similar, the duplicate aspects of the first or second cadence instance may be replaced with a reference to the other aspect. Thus, for example, if a temperature the layer of a first cadence instance is equivalent to the temperature tile layer of a second cadence instance, the temperature tile layer data references of the second cadence instance may be replaced with references to the temperature tile layer of the first cadence instance (and the second cadence instance data deleted). All or part of a tile layer may be replaced in this manner. Similarly, portions of a first tile layer may be compared to equivalent portions of a second tile layer to determine if they match. If they match, either the first or second portion of the tile layer may be replaced with references to the alternative tile layer. In this way, changes to a tile layer (for example, as would occur by updating with current sensor data, or by reprocessing one or more portions of a forecast) may be immediately identified for further processing without requiring the reprocessing of the entire tile layer.

One method of comparing cadence instance tile layers is to encode all or some of the respective tile layer(s) into graphical formats and then use image comparison techniques to compare the respective graphical images. The encoding function may encode only those parts of the cadence instance structure, for example, encoding only specific data elements from a tile layer, a region (part) of a tile layer, a complete tile layer, a set of tile layers, or a combination of these.

FIG. 5 illustrates an exemplary cadence cycle processing for several cadence instances operating synchronously with a cadence instance start interval of 10 minutes and a forecast cycle time increment of 15 minutes. Each cadence instance includes data collection, initial tile calculation that includes processing of collected data, followed by post-processing to calculate generated collected data, such as RVR, from processed data, and forecasting calculation. Cadence cycles may be classified as short or long. Short cadence cycles capture near term weather information and support real time and near real time weather forecasting. Similarly, short cadence cycle start intervals of 1, 2, 5, or 15 minutes, with data collection times of 1, 2, 5, 10, or even 20 minutes, and have interstitial delays of 0, 2, 5, 10, or 15 minutes. Long cadence cycles capture longer term weather information and provide for forecasts and models that typically are several days in duration. Typical long cadence cycles have interstitial delays of 6 hours, 12 hours, 24 hours, or two days for longer cycle cadences. In some cases, the cadence cycles are operated from a clock-based system such a crow on a Unix-based computer, which causes a cadence cycle to start at a specific time of day (e.g. 12 noon, 6 pm, 7 pm, 7:10 pm). In an exemplary embodiment, the cadence cycle length may be updated in accordance with other aspects of the forecast which are refined over time.

In some embodiments, the cadence cycle definitions may be altered by a post-processing program based upon the observed and forecast weather phenomena. For example, a rapid cadence cycle is desirable when tracking and forecasting a thunderstorm moving across an geographic area at 30 mph. Alternatively, a longer cadence cycle may be used if the weather phenomena in a geographic area are for clear weather or stratiform cloud layers, as these later conditions cause infrequent changes to the resulting forecast.

Figure 7:
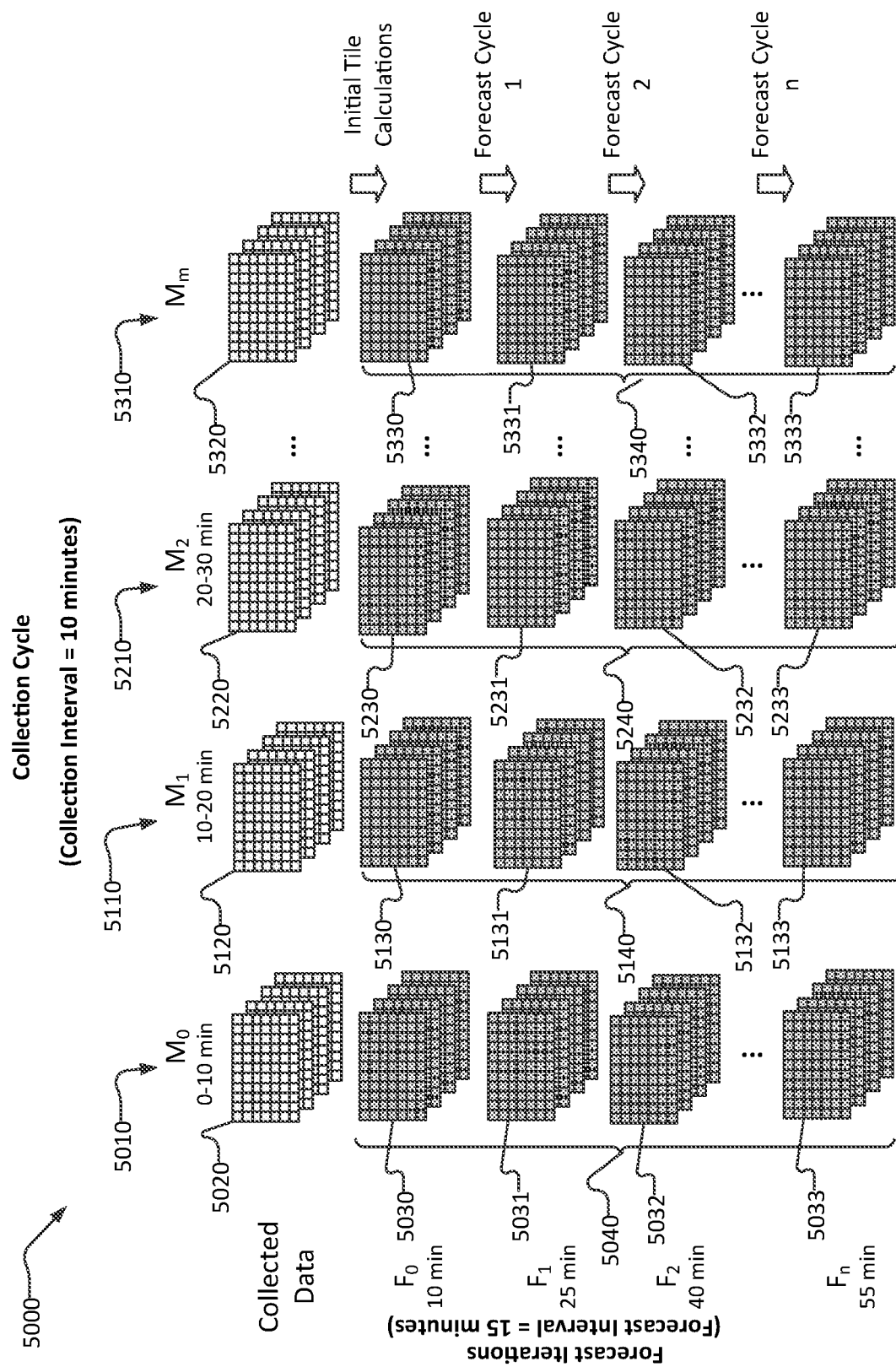
FIG. 7 illustrates data organization of cadence instances after several cadence cycles are processed, according to an illustrative embodiment.

After several cadence cycles are completed, the cadence instance may be represented as a grid of collected and forecast tile stacks as illustrated in FIG. 7. Since the collected and forecast generated data may be represented as a grid, individual and sets of logically related data elements can be identified as shown in the table below:

TABLE 3

General Processing

| Reference notation | Description |
| --- | --- |
| $M_i$ | Cadence instance |
| $M_i$ collected data | The collected data associated with the $M_i$ cadence instance. |
| $M_i$ collected data (tile layer name) | A named tile layer corresponding to a specific input source collected as part of the $M_i$ cadence instance. |
| $M_i$ collected data (tile layer name) tile [x, y] | A specific tile in a collected data named tile layer, identified by its location in the tile layer. Note that indexing may be [x, y, z] for 3D tile layers. |
| $M_i F_j$ | A specific forecast cycle (j) of the $M_i$ cadence instance |
| $M_i F_j$ tile layer name | A named tile layer corresponding to the output of a post-processing or forecast cycle forecast execution. |
| $M_i F_j$ tile layer name tile [x,y] | A specific tile in forecast cycle (j)'s named tile layer, identified by its location in the tile layer. Note that indexing may be [x, y, z] for 3-D tile layers. |

FIG. 7 illustrates cadence collection cycle (5000) as a grid of collected and forecast tile stacks. Each column of the grid includes collected and forecast tile stacks of a cadence instance (5010-5310). Each cadence instance (5010-5310) includes a collected data stack (5020-5320), each of which is substantially similar to Collections Data stack (2020) of FIG. 6. For example, cadence instance M0 (5010) includes collected data stack M0 (5020) which includes data collection tile layers (e.g. 2021-2025).

Each cadence instance (5010-5310) includes a forecast stack set (5040-5340). Each forecast stack set includes one or more forecast stacks $M_i F_j$, each of which is substantially similar to forecast stack (2030) and each of which includes one or more forecast tile layers (e.g. 2031-2036). For example, forecast stack set (5040) of $M_0$ cadence instance (5010) includes a forecast stacks (5030-5033).

Each forecast stack set (5040-5340) includes forecast stacks $M_i F_0$ (5030-5330) which each include forecast tile layers containing data produced by initial tile calculations.

Forecast stacks $M_iF_0$ (5030-5330) include data for the time at which the corresponding cadence instance collection interval was completed, t=10 min. For example forecast stacks (5030-5330) can each include a forecast precipitation tile layer (2031) that includes initial precipitation data produced by, for example, a microwave link precipitation program (654$a,b$) or precipitation blending program (918).

Each forecast stack set (5040-5340) includes a forecast stacks $M_iF_1$ (5031-5331) containing forecast generated data calculated by one or more forecasting processes for a first forecast time point (t=25 minutes) of each forecast stack set. For example, forecast stack set (5040) includes forecast stack $M_1F_1$ (5031) which includes one or more forecast tile layers, for example forecast precipitation tile layer (2031) containing forecast generated data for t=25 minutes calculated by precipitation forecasting program (915). Each forecast stack set (5040-5340) includes forecast stacks for each forecast time point of the corresponding cadence instance including forecast stacks $M_iF_2$ (5032-5332) containing forecast generated data calculated for t=40 minutes through forecast stacks $M_iF_n$ (5033-5333) for the final forecast time period of the corresponding forecast stack set (t=55 minutes).

The forecast generated data set (and timestamp) $F_0$ is the current time at which collection completes for the cadence instance (e.g. the time that the cadence index is incremented), $F_1$ is current time+forecast interval, $F_2$ is current time+2*forecast interval, etc.), repeating out to the forecast limit. Forecast limits are tunable for the system; typical values are between 2-6 hours for short term, high resolution (NowCast) forecasts, and 1-10 days for long term, lower resolution forecasts.

Figure 8:
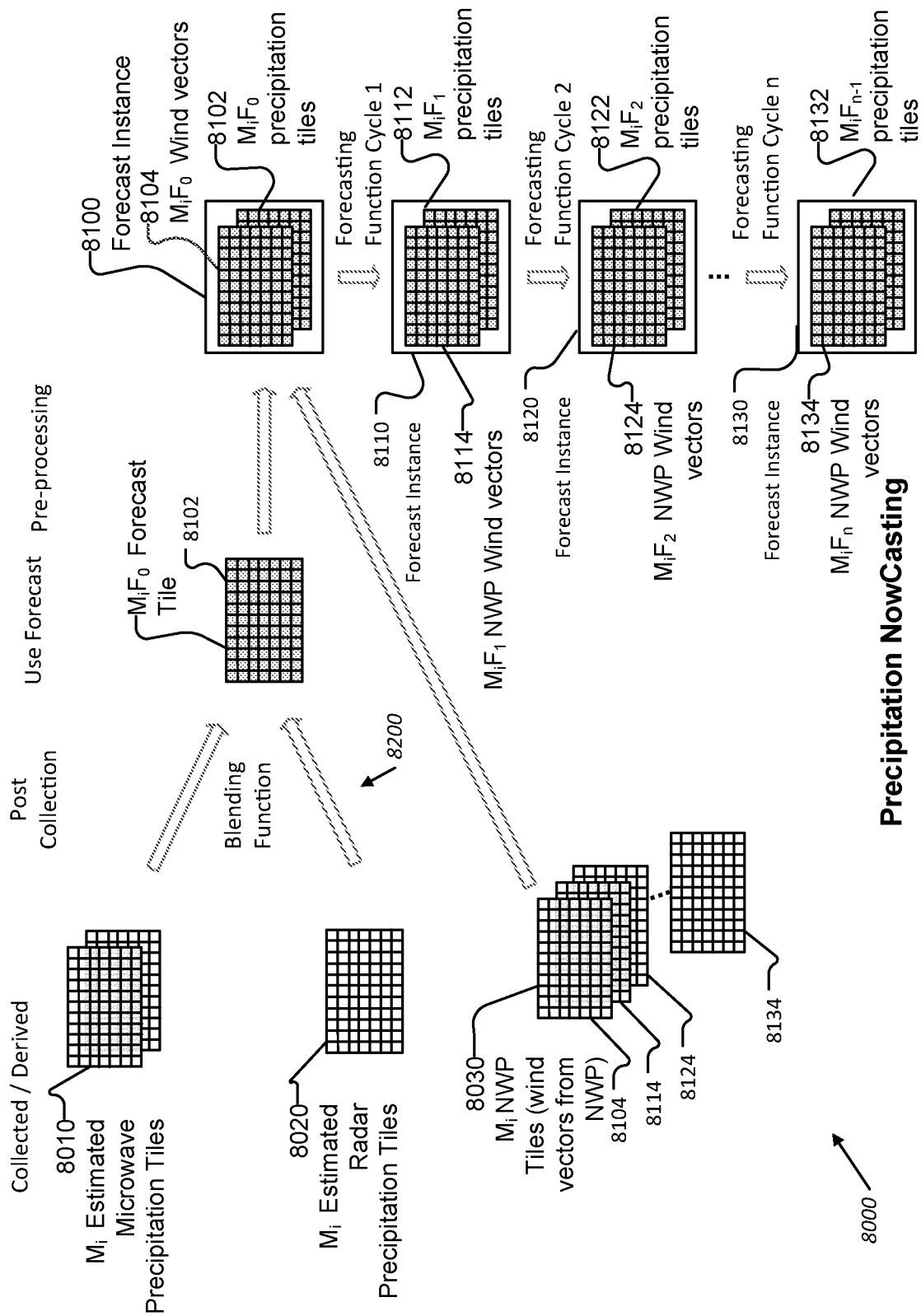
FIG. 8 illustrates exemplary information flows during nowcast forecasting, according to an illustrative embodiment of the invention.

Referring to FIG. 8, forecast precipitation includes blended precipitation intensity tile layer (8102) which can include precipitation estimates, combined using a blending function (8200), from one or more microwave precipitation estimate data sources and can further include precipitation estimates from one or more radar or NWP data sources In an embodiment retrieved precipitation intensity tile layers include one or more precipitation tile layers (8010, 8020) of a $M_i$ Collection Data Stack. The retrieved precipitation intensity tile layers can include precipitation intensity expressed as rainfall rates measured in inches/hour. Estimated precipitation intensity can be calculated by the modeling and prediction server (360) using microwave link attenuation measurements, by the offline/background processing server (330) from reflectivity data, or can be supplied by radar data source such as, for example, a weather radar data source (344) or by a NWP data source (341) such as the Rapid Refresh (RAP) numerical weather model, maintained by NOAA.

The modeling and prediction server (360) can optionally create a blended precipitation intensity tile layer (e.g. blended weather data) by applying a blending function (8200) to two or more precipitation intensity tile layers (8010, 8020) retrieved from $M_i$ Collection Data Stack. The blended precipitation intensity tile layer can include precipitation intensity (or other weather data) from two or more data sources. In an embodiment, a blended precipitation intensity tile layer (8102) can include precipitation intensity calculated using microwave link attenuation measurements (8010) blended with precipitation intensity retrieved from a weather radar data source (344, 8020). In an embodiment, a blended precipitation intensity tile layer can include precipitation intensity retrieved from an additional or alternative data source such as NWP data source (341). Blending of precipitation tile layers is performed in the modeling and prediction server during a forecasting process in order to generate $M_i$ forecast cycle specific blended precipitation tile layer. Alternatively, a precomputed blended precipitation intensity tile layer (8102) can be computed as part of a post collection processing activity such as a blending function (8200) and the results (e.g. processed blended weather data) associated as part of the $M_iF_0$ forecast cycle to the start of forecasting process. These blending steps may be performed by the modeling and prediction server (360) or may be performed by other servers, for example, the information collection and normalization server (310) or the offline/background processing server (330). Alternative embodiments include further or alternative blending functions such as, for example, a blending function that propagates ground level precipitation intensity calculated from microwave link attenuation measurements to higher elevation layers of tropospheric NWP data. The blended weather data in stored in a data type appropriate database associated with the current cadence instance One or more wind vector tile layers (8030) are retrieved from NWP atmospheric database (329), radar database (322), ground weather station database (323), or Other Data database (324) by the modeling and prediction server (360). Wind vector data tile layers include forecast data from the NOAA Rapid Refresh (RAP) numerical weather model, which is obtained using the weather data collection processes described herein. Wind vector tile layers from multiple wind vector data sources can be blended with a blending function (8200) using techniques similar to those used for precipitation estimate blending. Blending wind vectors includes generating a blended wind data tile layer data using wind data from two or more input wind vector tile layers, each from a different wind vector data source. In an embodiment, a wind vector tile layer can be smoothed. In an embodiment, wind vector tile layers include a series of forecast tile layers (8104, 8114, 8124, 8134) bounded by the range $M_iF_{(j-k)}$ where (j) is a start time of a forecast and (k) is an end time of a forecast. Wind vector tile layers thus include a series of tile layers, each tile layer corresponding to a current or forecasted time point and each tile layer including wind vectors (8104, 8114, 8124, 8134) assigned to individual tiles. In an embodiment, a time zero wind vector tile layer, i.e. $M_i$ Collection Data Stack wind vector tile layer (8030), is retrieved and $M_iF_{(j-k)}$ wind vector tiles (8104, 8114, 8124, 8134) are determined by the modeling and prediction server (360).

One or more convective available potential energy (CAPE) tile layers are retrieved from a data source such a NWP data source. In an embodiment, CAPE tile layers include a series of forecast tile layers bounded by the range $M_iF_{(j-k)}$ where (j) is a start time of a forecast and (k) is an end time of a forecast. In an embodiment, a time zero CAPE tile layer, i.e. $M_i$ Collection Data Stack C tile layer, is retrieved and $M_iF_{(j-k)}$ CAPE tiles are determined by the modeling and prediction server (360).

Each tile of precipitation intensity tile layer (8010, 8020) or blended precipitation intensity tile layer (8102, 8112, 8122, 8132) from $M_i$ Collection Data Stack and in each $M_iF_{(j-k)}$ forecast data stack is classified as including a storm condition including one of clear, mature, rising, or decaying and, if not clear, is further classified as convective storm or stratiform storm. The tile can be classified as rising, mature, or decaying by observing a time series of precipitation intensity values (and/or estimated precipitation intensity values). If the current precipitation intensity value is greater than a previous precipitation intensity value, the tile is classified as rising, if the precipitation intensity value has not changed the tile is classified as stable and if the current precipitation intensity value is less than a previous precipitation intensity value, the tile is classified as decaying. In an embodiment, classification can include shifting precipitation intensities between tiles of the precipitation intensity tile layer $M_iF_j$ (8112) using wind vector tiles of the wind vector tile layer $M_iF_j$ (8114) to predict future precipitation intensities for tiles of the precipitation intensity tile layer, as will be discussed in further detail below. The forecasting process can be repeated over time.

6.4.2 Collection Post-Processing Programs

Once a cadence instance has all of its collected data fully processed and written to the databases, one or more collection post-processing programs are executed by one or more processors of the system. These post-collection processing programs are sequenced by the system configuration so that data dependencies are honored and parallel processing pipelines are correctly configured. Specifically, the system does not start the execution of collection post-processing programs until the data that they need becomes available from other processes (collection processes or other post-processing processes). As each piece of data is made available, the system starts any programs that can be run against that data. This has particular importance for parallel processing programs that break up a processing task into many tasks that are executed independently on a plurality of computer processors. The collection post-processing programs operate on the collected data of the current cadence instance and upon the collected and forecast generated data of previous cadence instances. Collection post-processing operates by executing programs that read the data associated with one or more cadence instance tile layers, performing calculations on this data, and storing the data in a data type specific database so as to create one or more tile layers in the $F_0$ data stack of the current cadence instance. A notification may be sent when a collection post-processing program (or parallel portion) completes or when the entire post-processing stage is completed. These notifications permit the system to start the next process in a processing pipeline, or to transition to a new processing stage (e.g. collection post-processing to forecast).

6.4.3 Forecast Processing Programs

Once the collection post-processing stage is complete, the system then starts to process the forecasting stage, starting with the forecast pre-processing stage. The forecast pre-processing stage executes the configured forecast pre-processing programs in a configuration dependent order. These programs may be sequenced by system configuration so that dependencies are honored and parallel processing pipelines are correctly configured. The pre-processing stage reads information stored in the current cadence instance's $F_0$ tile stack and, optionally, collected information for the current cadence instances or collection or forecast generated data of prior cadence instances, performs calculations that produce new data as a result of those calculations, and writes the resulting data to a data type specific database in order to create a new data type tile layer of the $F_0$ tile stack. A notification may be sent when a post-processing program completes or when the entire post-processing stage is completed. These notifications permit the system to start the next process in a processing pipeline, or to transition to a new processing stage (forecast pre-processing to forecast cycle processing).

Once all of the forecast pre-processing is complete, the system begins an iterative process of calculating the forecasts for multiple points in future time. The first cycle, $F_0$, is associated with the cadence timestamp, as described above. The initial forecast index is set to zero (0).

The forecast cycle operates by selecting a forecasting program such as precipitation forecasting program (915) of the modeling and prediction server (360) and executing the program. The forecasting program operates upon one or more of the current cadence instance's forecast current cycle tile data (e.g. $M_iF_{j_{forecast}}$ index forecast tile data (and optionally upon the current cadence instance collected data and/or past cadence instances collection and forecast generated data)), reading that data into the processor memory, performing calculations upon that data, creating new forecast generated data, and writing the resulting data to a data type specific database in order to create a new forecast generated data type tile layer associated with $M_iF_{j_{forecast}}$ index.

After each forecast cycle completes, and forecast end count has not been reached, the system iterates to perform the next forecast cycle. Each iterative forecast cycle increments the forecast index by 1 and generates a new forecast cycle timestamp. Processing then proceeds as above, with the iterative generation of $M_iF_{j_{forecast}}$ index data type specific tile layers.

By appropriate sequencing of forecast program executions, the system can be configured, for example, to first process the current forecast precipitation, and then to execute additional extension programs such as post-forecast processing programs and weather product creation programs (both not described further) calculate additional forecast or computed results, such as a forecast post-processing extension program that provides hydrology forecasting based upon, for example, forecast post-processing calculations to generate forecast precipitation accumulation calculated from forecast precipitation rates and to generate forecast RVR calculated from one or more of forecast precipitation rates and forecast fog estimates.

The system can determine accumulation amounts by retrieving parameter values from collection tile stacks of multiple cadence instances $M_i$ and from multiple forecast layers of multiple cadence instances $M_iF_j$ having time stamps covering a desired accumulation time span. The retrieved parameter values are summed to generate an accumulated amount. Thus, accumulated precipitation from a first time x to a second time y is the sum across model and forecast layers spanning time x to time y. To determine an accumulated parameter for an area for time x to time y, the server retrieves parameter values for the area from for the selected layers, calculates an average for the area for each layer, and sums the averages for all selected layer. The average for an area is the arithmetic sum of the data elements within the selected tiles, divided by the number of tiles.

6.5 Processes Operating on the Modeling and Prediction Server

6.5.1 Cadence Management Programs of the Forecasting and Modeling Server

6.5.1.1 Cadence Manager (905)

The cadence manager (905) is a program that is part of a forecasting system (300) and that manages operations related to cadence processing, including any necessary propagation and processing programs. The cadence manager controls the cadence time base, including when to change from one cadence instance to the next and when to change from one processing stage to the next. The cadence manager also controls and manages the simultaneous program execution(s) that are part of one or more cadence cycles, and the resulting cadence instances that are produced as a result of these program executions. It also sets and manages the cadence cycle and cadence instance variables in the cadence instance data structures as well as globally for the system. The cadence manager determines which programs are to be processed next as part of a cadence instance, when they are to be processed, and in some embodiments, determines which resources are used by those programs (e.g. which processor a specific program is executed by).

The cadence manager is responsible for optimizing runtime resource utilization during the processing of cadence instances. One important optimization by the cadence manager is the determination on whether a specific cadence instance can reuse some or all of prior collected data and forecasts or whether it is more efficient to fully process and calculate each data processing and forecast step defined for the cadence instance. Accordingly, the cadence manager implements one of two mechanisms for creating and updating cadence instances, depending upon the current status of cadence instance(s) that have been generated in the past and the current data collection state.

As shown in FIG. 5, the cadence manager makes this determination each time the processing of the cadence changes processing stages; e.g. at the end of collection activities, at the end of post-collection activities, at the start of each forecast cycle, and the end of forecast processing (for all forecast cycles), prior to post-forecasting processing, and prior to each weather product program execution.

At the end of collection activities, the cadence manager makes a determination whether the collected data and previous forecasts are in agreement by comparing corresponding collection and forecast data. This is done with the tile layer comparison program (910). If the collected data and a previous forecast are in agreement or are mostly in agreement, there is no need to rerun the whole forecast in order to create a new forecast. If the forecast is in complete agreement (often the case when cadence intervals are small or when the weather patterns are changing slowly), the previous forecast, and weather product data can be copied (propagated) and used in the new cadence instance, saving substantial resources. If small portions of the forecast have changed, the bulk of the forecast and weather product data can be copied and only those portions that have changed (or are dependent upon a changed portion) need be recalculated, again saving substantial resources. The same types of checks can be made at the beginning of each forecast cycle, and at the end of the forecast cycle in order to avoid unneeded forecast cycles and calculation of weather product data.

If differences are detected that require a partial or complete calculation of forecasts, the cadence manager determines which method of calculation and/or propagation is most appropriate to minimize the required resource usage to process the current cadence instance based upon a variety of input parameters, such as the amount of change in newly collected data and the volatility of the forecast mechanisms. In general, there are two primary approaches that the cadence manager uses; complete (re)calculation and incremental update calculations. The cadence manager uses one or more of the following inputs in order to make a determination as to which approach to use: a) new information collected in the current cadence instance's data collection tile layers, b) information from prior cadence instance data collection tile layers, c) information from prior cadence instance tile layers, and d) information provided by processing programs used when creating a cadence instance.

Once the cadence manager makes a determination as to the cadence instance processing approach, it then selects an option to either to perform a complete calculation for all cadence instance elements or to incrementally update the cadence instance by propagating tiles from previously generated tile layers into the current cadence instance. In some embodiments, the determination and processing approach determination is typically made once per cadence instance processing. In alternative embodiments, the determination may be made on a periodic basic. In other alternative embodiments, the determination is made once and all cadence instance processing (for a specific cadence cycle) implements the same determination.

The cadence manager (905) uses a complete calculation approach when a cadence instance does not have appropriate previous cadence instances to update with current data, when the rate of incoming collected data is very high, when the analysis performed by the cadence manager of the cadence instance processing approach indicates that the amount of processing to perform updates and propagation exceeds the amount of processing required to completely calculate the cadence instance from initial collected data, or when it is the first time that this particular tile layer is being generated.

Complete (re)calculation of a tile layer can be very expensive in terms of resources and time, so the cadence manager typically defaults to a partial calculation and update mode. Partial calculations and updates reduce the amount of recalculation required when sparse or high frequency updates are being made to underlying tile layers. When the number of recalculations exceeds a configurable threshold, the cadence manager makes a determination that it will be more efficient to recalculate the entire dependent tile layer.

Once a determination is made by the cadence manager (905) to perform a partial calculation and update within a cadence instance, several steps occur. First the portions of the tile layers to be copied to the cadence instance along with their corresponding prior tile layers selected from one or more of prior collected data tile layers, processed collected data tile layers, forecast tile layers, forecast post-processing tile layers, and weather product tile layers. The identified prior tile layers are propagated by copying to the current cadence instance.

Figure 9:
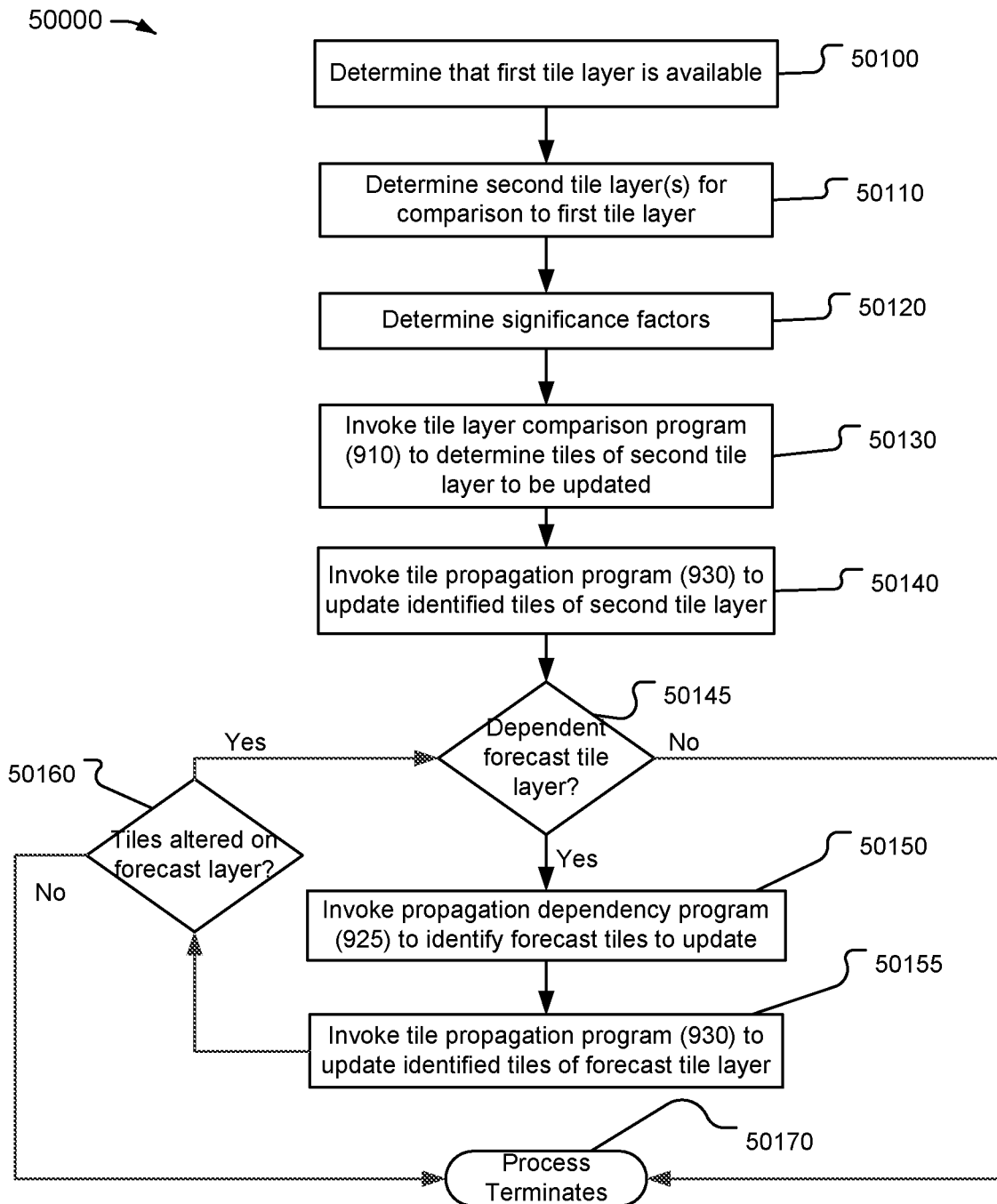
FIG. 9 illustrates an exemplary process flowchart for an exemplary cadence instance recalculation and propagation method for updating the forecast stacks to reflect newly collected data, according to an illustrative embodiment.

Referring to FIG. 9, an illustrative cadence instance partial recalculation and propagation method (50000) is shown for updating forecast stacks of a cadence instance to reflect newly collected data when there is going to be a partial calculation and update. It comprises steps for comparing at least one first source tile layer to a second source tile layer, propagating data from at least one of the source tile layers to a target tile layer, and then recursively updating subsequent dependent tile layers that depend upon the target tile layer.

At step (50100) and (50110), the cadence manager (905) determines an at least one of a first and a second source tile layer are available for comparison testing. A tile layer becomes available for comparison testing when there are no current processing steps acting upon it (e.g. collection activities, forecast programs running, other propagation activities).

Once the tile layers are available, the cadence manager, at step (50120), determines the significance factors to use when evaluating changes in the input data to determine if reprocessing of one or more tiles is necessary. Significance factors are dependent upon the processing program, including the inputs that the processing program uses, that program's known sensitivity to input variations and computational parameters of the forecasting method. For example, the cadence manager determines the applicable significance factors by querying a processing program that generated a particular forecast tile layer. Alternatively, significance factors are encoded as a data element associated with a tile layer and the cadence manager reads those significance factor values from that tile layer.

At step (50130), the cadence manager runs a tile layer comparison program (910) to perform comparison testing between the selected source tile layers in order to determine whether a source tile layer can be copied or whether significant differences are present between the selected tile layers that require tile level updating, and to identify the those tiles and tile layers that will be propagated by the tile propagation program (930). This step is sometimes called verification when performed on a forecast tile layer, and is performed in order to determine the portions of the forecast layer that were accurate and which were not.

In a first embodiment of this test, the cadence manager identifies as a source collected data tile layer (e.g. a rapidly updated ground weather data layer from vehicle sensors) and identifies the tiles within that tile layer that have changed in the current cadence instance. The cadence manager identifies a forecast tile layer as its second source tile layer. It then identifies at least one forecast tile layer as a target tile layer that needs to be updated as a result of the updated collected data. The cadence manager then runs a tile layer comparison program to compare the subsequent source collected data tile layer to the identified source forecast tile layer in order to verify the source forecast data. The source forecast data is verified by using one or more forecast comparison tests that compare the source forecast data to the selected collected data tile layer and to determine the significance of any differences between the compared tile layers.

If the source forecast data passes the comparison testing based one or more criteria, for example if source forecast tile layer differs from the collected data tile layer by less than a threshold amount, then the source forecast tile layer is verified and may be copied directly to the target forecast tile layer. Thresholds used in comparison tests are based on one or more factors including the desired or required accuracy of forecasting results and confidence in a data source. For example, a ground station precipitation measurement may have higher accuracy or fidelity than a radar-based precipitation estimate; therefore tiles of a ground station precipitation tile layer have a higher confidence score than tiles of a corresponding radar-based precipitation layer. If a forecast tile is verified or updated, a corresponding confidence score associated with the tile is increased to indicate an increased confidence in the verified forecast tile. Note that the comparison tests used may differ for each type of collected data, and for differing forecast models. Forecast data sets also can be verified against unitary collected data tile layers, for example against a ground station precipitation tile layer, or may be verified against blended generated collected data sets encoded as tile layers, for example against a tile layer that includes blended ground station, radar, and microwave link precipitation estimates.

The tile layer comparison program (910) may be used to perform comparison testing (verification) on a subset of tile layers. For example, when available collection data only includes ground station precipitation measurements, the tile layer comparison program is called to perform comparison testing on the tiles that are located within geographic regions that include the ground stations. The cadence manager may also prioritize verification of tile layers that comprise data that is more valuable to an end user or that has a greater impact on derived data than other, less interesting data. Computation may be further optimized by only doing verification until a result is obtained, and skipping additional verifications once a determination is made that a tile or tile layer needs to be updated. For example, the cadence manager may limit verification to precipitation above a threshold intensity relevant to the forecasting program or to data related to weather phenomena that are rapidly changing.

At step (50140), the cadence manager then propagates changes from the source tile layer(s) to the target tile layer. If portions of at least one of the source tile layers are determined to be significantly different from a prior source tile layer that the target tile layer was dependent upon, the cadence manager calls the tile propagation program to update the tiles of the target tile layer in order to reflect the changes from at least one of the source tile layers.

Note that propagation may take multiple forms. Some or all of the target tile layer's data is modified by the tile propagation program. If greater than a threshold amount of the target tile layer's data is going to be updated by the tile propagation program, the tile propagation program (or cadence manager) may create a new target tile layer instead of propagating changes over a target tile layer. Otherwise, only the portion of the source tile layer that failed the test is updated.

Other tile layers that depend on an updated tile layer are also updated using this process, for example, tile layers that support weather data products derived from updated forecast data, and specialty forecasts such as RVR forecasts and fog forecasts. In this manner, the system updates only the previously determined forecasts and derived data that are affected by the subset of forecast data that was determined to be inaccurate in light of newly collected data. In this manner, computations become significantly faster and more efficient, reducing computing resource requirements and computing time.

At step (50145), the cadence manager determines if there are any other tile layers that are dependent upon the target tile layer. When the target tile layer is a forecast tile layer, dependent tile layers may include subsequent forecast tile layers of the cadence instance, or tile layers produced by various processing programs.

If the cadence manager determines that there are no dependent tile layers, the process terminates (50170).

If the cadence manager determines that there is at least one dependent tile layer, at step (50150), the cadence manager invokes propagation dependency program (925), to identify tiles requiring update in the at least one dependent tile layer, as is discussed in further detail below. Then, at step (50155), the cadence manager invokes the tile propagation program to propagate updates to the identified tiles.

At step (50160), the cadence manager determines whether tiles of the dependent tile layer were altered by propagated updates to the dependent tile layer at step (50155). If no tiles were altered, (e.g. the changes did not result in any change of significance in the target tile layer) the cadence manager determines that updates to the dependent tile layer no longer need to be propagated through the tile stack and the propagation process terminates (50170).

If updates to the dependent tile layer resulted in significant alterations to one or more tiles, then the cadence manager returns to step (50145) and continues iterating the propagation of updates until either all dependent tile layers have been processed (i.e. until step (50160) results in a "no" answer and the propagation update process terminates.

6.5.1.1.1 Example 1: Propagate Data from Collected Data Tile Layer and Merge with Previous Forecast to Create New Forecast Tile Layers This example is based on the following cadence scenario.

TABLE 4

Cadence Scenario

| Absolute Timestamp | M3 cadence (t = 0) | M3 relative Timestamp | M6 cadence (t = 15) | M6 relative timestamp | Forecast iteration generation method |
|---|---|---|---|---|---|
| 5 | $M_3F_0$ | 5 | N/A | N/A | N/A |
| 20 | $M_3F_1$ | 20 | $M_6F_0$ | 5 | $M_3F_1 + M_6$ collected |
| 35 | $M_3F_2$ | 35 | $M_6F_1$ | 20 | Propagated from $M_6F_0$ |
| 50 | $M_9F_3$ | 50 | $M_6F_2$ | 35 | Propagated from $M_6F_1$ |
| 65 | N/A | N/A | $M_6F_3$ | 50 | Calculated |

The following describes a process for updating a previously computed set of forecast tile layers using current collected data. Tile layers for $M_6F_0$, $M_6F_1$, $M_6F_2$ and $M_6F_3$ will be propagated from the $M_6F_0$ collected and processed tile stacks, the $M_3F_1$, $M_3F_2$, and $M_3F_3$ forecast tile layers.

In this example, a source tile stack includes $M_6F_0$ collected and processed tile stacks and the $F_3F_1$ precipitation forecast tile layer, and the verification process verifies the forecast of $M_3F_1$ using the collected and processed tile stacks of $M_6$ and selectively propagates significant changes from $M_6F_0$ into a copies of $M_3F_2$ and $M_3F_3$ in order to create $M_6F_1$ and $M_6F_2$ respectively. $M_6F_3$ will be run independently after the $M_6F_2$ tile layers are created.

Each of the selected forecast stacks comprise at least one precipitation tile layer. In this example, $M_3F_1$ comprises a forecast precipitation tile layer; $M_6F_0$ has a collected precipitation tile layer.

The cadence manager (905) determines whether collected data from the $M_6F_0$ forecast stack is suitable for use to verify a previously calculated forecast stack of another cadence interval based upon absolute times of the cadence cycles. The cadence manager compares a time stamp of the $M_6F_0$ forecast stack to time stamps of one or more forecast stacks, including $M_3$ forecast stack, and determines, based on matching time stamps, that data included in $M_6F_0$ collected precipitation tile layers are suitable for use to verify at least one forecast tile layer of $M_3F_1$ forecast stack. In this example, the compared forecast stacks both have the same absolute time stamp (t=20 min.), but the cadence manager can match tile stacks with similar but not exactly matching time stamps. In this case, the cadence manager determines that $M_3F_1$ forecast precipitation tile layer is verifiable using the $M_6F_0$ collected precipitation tile layer because both tile layers comprise precipitation amounts (forecast and actual respectively).

The cadence manager then invokes a tile layer comparison program (910) which compares $M_3F_1$ precipitation forecast tile layer to $M_6F_0$ collected precipitation tile layer and determines whether at least one significant difference exists between data contained in the collected and forecast precipitation tile layers and the tiles that have those differences (i.e. that one or more tiles of $M_3F_1$ precipitation forecast tile layer have inaccurate forecast data and should be updated because there was a significant change in the forecast outcome based upon current collected data).

The cadence manager then invokes the tile propagation program (930) to propagate the $M_3F_1$ forecast precipitation tile layer to the $M_6F_0$ forecast precipitation tile layer, where the $M_6F_0$ tile layer is created by copying the $M_3F_1$ forecast precipitation tile layer to $M_6F_0$ forecast layer, and then running a forecast program only for those tiles for which there were significant differences between the $M_3F_1$ forecast precipitation tile layer and the $M_6F_0$ collected precipitation tile layer. This produces a current $M_6F_0$ forecast utilizing a fraction of the computing resources required to fully compute the $M_6F_0$ tile stack from collected data. In an alternative embodiment, the copy operation could be performed by changing database tags in specific tiles of $M_3F_1$ forecast precipitation tile layer to include a reference to corresponding tiles of $M_6F_0$ collected precipitation tile layer.

The cadence manager then determines that the $M_6F_1$ forecast stack is dependent on $M_6F_0$ forecast stack and upon the $M_3F_2$ forecast stack using the propagation dependency program (925), and then uses the tile layer comparison program to identify the tiles of the $M_3F_2$ forecast precipitation tile layer that can be copied from $M_3F_2$ and those tiles that should be forecast from $M_6F_0$ because of significant differences and/or propagation effects. Those tiles that can be copied are copied to $M_6F_1$, and those that must be forecast are created using a forecast program.

This process iterates for additional forecast cycles until there are no more forecast cycles to process (e.g. $M_3F_2$/ $M_6F_1$ to produce $M_6F_2$). In the event that a forecast converges in any of the cycles (e.g. there are no significant differences between the previous and current forecast, the cadence manager simply copies the remaining previous forecasts to the new cadence instance The cadence manager then runs any missing forecast cycles (e.g. $M_6F_3$) to complete the forecasting process.

A similar process is used to update post-forecast processing data that is stored in weather product tile layers.

If the cadence manager selects the option to copy and update a prior forecast tile layer, the cadence manager often still has to run one or more processing programs in order to complete some of the tile layers of the new cadence instance. For example, if a forecast is copied from once cadence cycle to another, the copied forecast will need is last forecast cycle run to complete the new forecast.

Process and Programs Run by the Cadence Manager

The cadence manager has a number of cadence specific programs that may be performed at specific times in the cadence cycle to create and manage the cadence data structures. These programs include collection, post-collection, pre-forecast processing programs as described herein and in the related application. In addition, specialized programs that manipulate the cadence data structures may also be run as circumstances dictate. Illustrative examples of these programs are shown below in Table 5.

TABLE 5

Data Processing Programs of the Cadence

| Number | Name |
|---|---|
| | Cadence manager programs |
| 910 | Tile comparison program |
| 918 | Precipitation Tile layer blending program |
| 925 | Propagation dependency program |
| 930 | Tile propagation program |
| 612 | Weather sensor data processing program |
| 613 | Other information data processing program |

TABLE 5-continued

Data Processing Programs of the Cadence

| Number | Name |
|---|---|
| 615a | Satellite Microwave Link Data processing program |
| 615b | Terrestrial Microwave Link Data processing program |
| 616 | NWP Data processing program |
| 618 | Map data processing program |
| 611 | Radar Data processing program |
| | Forecast programs |
| | NowCast forecasting (More fully defined in previously presented U.S. Pat. No. 10,078,155) |
| 919 | Fog forecasting program |
| 926 | Fog predictive model program |
| 931 | Fog forecast program |
| | Post-forecast program |
| 920 | RVR forecasting program |

6.5.1.2 Tile Layer Comparison Program (910)

The tile layer comparison program (910) to compare one or more tiles and/or tile layers in order to determine whether changes are present that are significant enough to change the results of subsequent processing and affect the propagation strategy for the tiles. The tile layer comparison program is called by the cadence manager to perform comparison testing aspects of cadence instance recalculation and propagation method (50000). The tile layer comparison program may perform simple data comparisons of discrete values, but generally performs comparisons that are more flexible in order to determine if differences are significant in the context of the comparison. For example, if two rainfall tile layers were being compared to determine if a flood forecast must be updated, a difference between 0.1 and 0.2 mm of rainfall, while technically different, is not significant to the flooding forecast program and can be ignored when determining whether to require the flooding forecast program be rerun on the basis of changed data. The tile layer comparison program takes as inputs, as specified by the cadence manager, two or more tile layers and/or tiles, and a specification describing the amount of change required to constitute a significant difference and returns either an indication that changes are significant or that changes are not significant, and alternatively identifies the individual tiles or tile layers that have significant differences.

In addition to strict arithmetic comparisons, an alternative method of comparing tile layers is to encode all or some of the a set of tile layer(s) into a graphical format, use image analysis techniques to determine or expose features of the images, and then use image comparison techniques to compare the respective graphical images and determine whether the respective features of the images match. The encoding and image feature comparison aspects of this technique may encode and compare only those tile layers and parts of tile layers that are specified for comparison by the cadence manager as contextually relevant. For example, by encoding only specific tiles from a tile layer, a region (part) of a tile layer, a complete tile layer, a set of tile layers, or a combination of specific regions of a specified set of tile layers, specific features of weather data may be exposed such as shapes of rain fields at specified precipitation rates, weather features such as convective storm cells, frontal boundaries, wind fields, and the like. Image feature analysis may be used to identify these weather features, which can then be stored in a weather objects database (350) and. tracked across a plurality of these generated images. Image data can be reverse mapped to tiles in specific tile layers in order to utilize the information extracted by the image comparison techniques for use in further calculations. Exemplary methods for comparing forecast data to measurements include image analysis and pattern recognition techniques such as Method Object-based Diagnostic Evaluation (MODE), contiguous rain area (CRA) object based methods, analysis methods based on morphing forecast to match observation, cluster analysis, and a Structure Amplitude Location (SAL) method.

An exemplary comparison test that implements an image-analysis based technique processes gridded forecast data (e.g, forecast data mapped to a forecast tile layer) as image data, extracts weather features from the forecast data, and verifies aspects of the extracted objects such as location, size, shape, intensity, and other attributes of objects. Exemplary objects that are extracted may include weather information such as rain fields of specified intensities. For example, the tile layer comparison program extracts, from each of the tile layers that are being compared, information related to rain intensity, and then uses an image analysis program to identify, as objects on each tile layer, rain fields with peak intensity of less than 1 mm/hr, rain fields with peak intensity of less than 1-2 mm/hr, and rain fields with peak intensity of less than >2 mm/hr. The identified rain fields may be compared between the tile layers, and the tiles that correspond to matching and non-matching portions of the rain fields identified based on matching and non-matching portions of the objects corresponding to the rain fields. Using the same techniques, the tile layer comparison program can extract and identify other interesting weather-related aspects of the tile layer(s), including isothermal temperature fields, humidity fields, and fog and cloud structures.

As an example usage, the tile layer comparison program (910) may be used to verify that one or more forecast precipitation area attributes are sufficiently similar to newly collected data including, for example: location, size, and shape of precipitation areas; and precipitation intensity within areas (average, total, peak, distribution within precipitation area) and identify those tiles which have changed as the location, shape, or size of the weather feature has changed. To verify an attribute, the tile layer comparison program determines that the forecast attribute is sufficiently similar to the collected attribute according to one or more criteria specified by the cadence manager. Sufficiently similar is defined as meaning that a forecast attribute differs from the collected data by less than an amount that would produce a change in any derivative forecast results or derived data calculated using the newly collected data (as opposed to calculating using the original data) or is within a specifically defined tolerance (difference). Exemplary criteria for determining sufficient similarity include that centroids of forecast and collected precipitations areas are within a threshold distance from each other, precipitation intensity differs from a newly collected precipitation intensity by a threshold amount, etc. The tile layer comparison program can also perform comparison testing on a more granular level. For example, the tile layer comparison program may be used to verify precipitation intensity of each tile within a region of a forecast precipitation tile layer in order to determine individual tiles within the forecast precipitation tile layer that should be updated with the newly collected data (e.g. a significant ground truth data update of a forecast tile layer) .The cadence manager may call the tile layer comparison program multiple times with differing input parameters during the course of processing a cadence instance.

6.5.1.3 Propagation Dependency Program (925)

The propagation dependency program (925) to determine the tiles within a tile layer, or which tile layers themselves, that are dependent upon other tiles or tile layers that have significant enough changes to warrant propagation and/or reprocessing. The propagation dependency program is called by the cadence manager to identify tiles requiring update during processing of cadence instance recalculation and propagation method (50000).

In a first mode of operation, the propagation dependency program analyzes the cadence structure and determines the dependencies between tile layers in the cadence structures. The output of this determination is used by other programs of the cadence manager in order to determine which tiles and tile layers are influenced by changes in other tile layers.

In a second mode of operation, the propagation dependency program uses the output of the tile layer comparison program (910) to modify the dependency list to eliminate tiles and tile layers from the list of dependencies when those tiles and tile layers that have not changed sufficiently to warrant reprocessing.

The propagation dependency program outputs a list of tiles and tile layers that are dependent upon other tiles or tile layers for use by the cadence manager.

6.5.1.4 Tile Propagation Program (930)

The tile propagation program (930) is invoiced by the cadence manager (905) to propagate data changes from one or more source tile layers to a destination target tile layer. The propagation dependency program is called by the cadence manager to perform requiring tile propagation aspects of cadence instance recalculation and propagation method (50000). This is performed either by moving or copying the data from the source tile layer and storing a copy of the data associated with the target tile layer, retagging the source data to make the source data available to the target tile layer, or by recalculating and/or reforecasting the targeted tiles in the target tile layer.

The tile propagation program takes as inputs one or more source and target tile layers and/or tiles and determines the type of processing required to propagate the tile datum from the source tile layers to the target tile layer. If the source and target tiles have the same data type, the tile propagation program utilizes either a move/copy or retagging operation, which are database updates. If the target tiles are of a differing type than the source tiles, the tile propagation program runs a program to make the conversion and create new data items in the database comprising the converted data and creating new tiles for the target tile layer (replacing any old tiles with the new tiles). In cases where the tile comprises data that is the result of a processing program, the appropriate processing program is run to regenerate new tile(s) with updated data.

The cadence manager may call the tile layer comparison program (910) multiple times with differing input parameters during the course of processing a cadence instance.

6.5.15 Precipitation Tile Layer Blending Program (918)

The precipitation blending program (918) which blends two or more input tile layers using a tile-by-tile blending method. In an exemplary embodiment, the precipitation blending program uses as inputs two or more weather parameter tile layers from the collection tile stack and blends them together to produce a blended weather parameter tile layer. The precipitation blending program carries out a tile blending method to blend tiles of two or more precipitation tile layers. In a particular exemplary embodiment, the precipitation blending program retrieves two or more microwave precipitation tile layers (e.g., (2022a,b), weather sensor data tile layer (2021), NWP tile layer (2024)) as input tile layers. The precipitation blending program selects tiles from one or more of the precipitation tile layers and copies data from the selected tiles to corresponding tiles of an output $M_tF_0$ forecast precipitation tile layer (2031). The output forecast precipitation tile layer is a blended precipitation tile layer that is saved to the precipitation forecast database (325). In some exemplary embodiments, a precipitation forecasting program uses a blended precipitation tile layer as an initial forecast precipitation tile layer (e.g. the $M_tF_0$-forecast precipitation tile layer).

Figure 10:
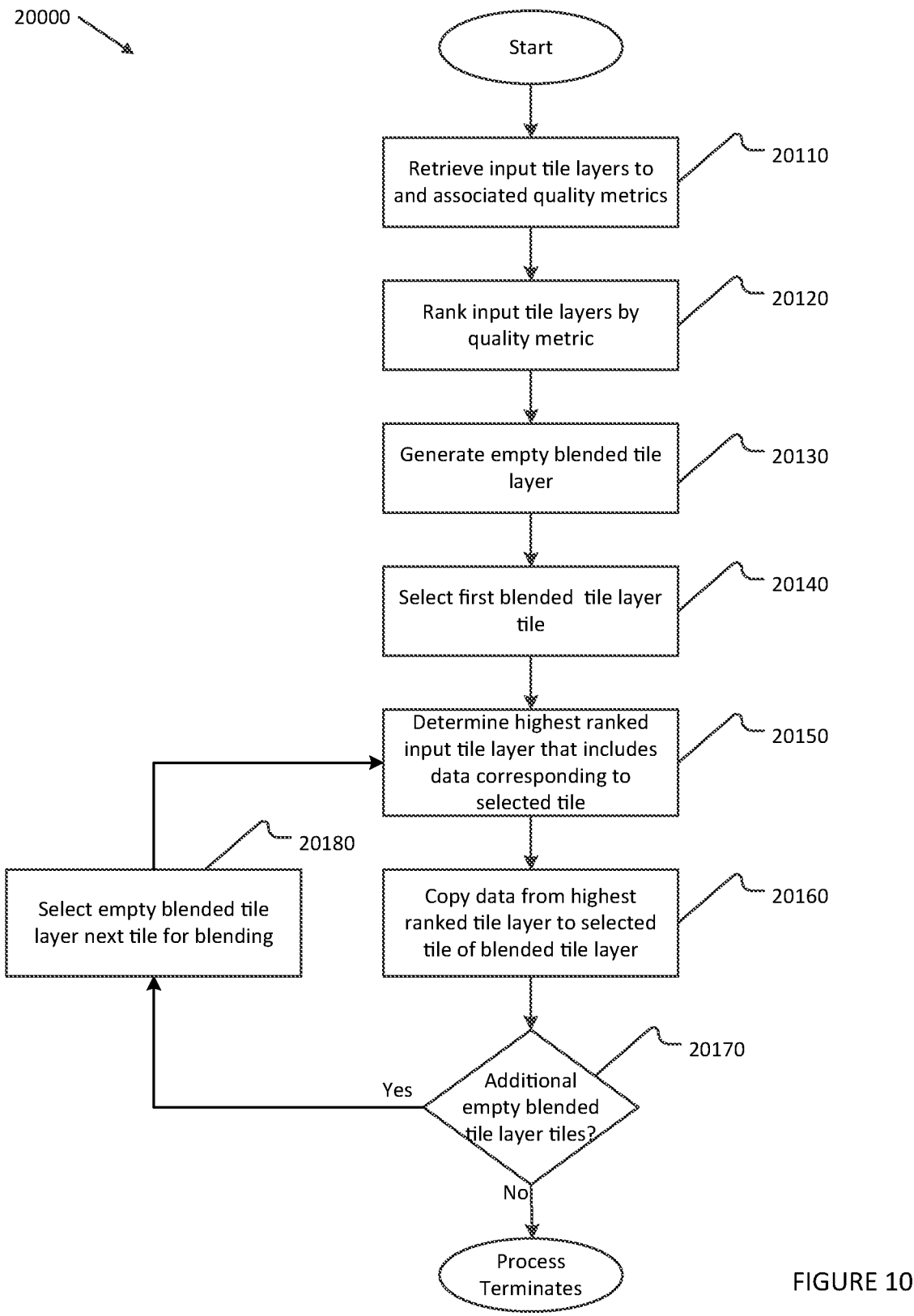
FIG. 10 depicts a process flowchart for an exemplary post-collection forecast blending function, according to an illustrative embodiment.

An exemplary precipitation tile layer blending program (918) operates to copy, from one or more source precipitation tile layers, precipitation data to a selected tile of a (blended) forecast precipitation tile layer, as detailed in the exemplary tile blending method. Referring now to FIG. 10, at step 20110 the precipitation blending program retrieves, from system databases, two or more input precipitation tile layers and associated quality metrics. Quality metrics, for example pre-computed accuracy improvement metrics, quantify a confidence in data contained in each of the input precipitation tile layers. At step 20120, the precipitation blending program ranks each input precipitation tile layer based on corresponding quality metric data. The precipitation blending program generates an empty blended precipitation tile layer at step 20140 and selects, at step 20140, a first empty blended precipitation tile to populate with data from one of the input precipitation tile layers. At step 20150 the precipitation blending program determines the highest ranked tile layer that includes data corresponding to the selected empty blended tile layer tile. For example, the precipitation blending program first determines whether a tile of the highest ranked input precipitation tile layer corresponding to the selected blended precipitation tile layer includes precipitation data and, if it does not then determines whether a corresponding tile of the second highest ranked input precipitation tile layer includes precipitation data. The precipitation blending program, at step 20160, copies data from the highest ranked input tile layer determined in step 20150 into the selected empty tile of the blended tile layer, determines whether the blended precipitation tile layer includes additional empty tiles at step 20170 and, if so, selects one of the empty tiles at step 20170 and returns to step 20150 to populate the selected empty blended precipitation tile with data from one of the input precipitation tile layers. In this manner, the precipitation blending program copies precipitation data from input precipitation tiles layers by implementing the tile blending method for each tile of the blended precipitation tile layer. The precipitation tile layer blending program repeats steps of the tile blending method until all tiles of the forecast precipitation tile for which at least one input tile layer are available have been populated with precipitation data after which the tile precipitation blending program can fill in missing data in the forecast precipitation tile layer, for example by copying data from another cadence instance or by interpolating data from tiles adjacent to a tile for which data is missing.

In further exemplary embodiments, the precipitation blending program blends precipitation tiles of precipitation tile layers including estimated microwave precipitation tiles of two or more of microwave precipitation tile layer (2022a, b), radar precipitation tiles of a radar precipitation tile layer (not shown), and ground weather sensor tile layer (2021). In a particular exemplary implementation of blending method (20000), the precipitation blending program (918) blends precipitation estimates calculated from microwave attenuation generated collected data (e.g. microwave precipitation tile layer (2022a or 2022b) with precipitation estimates calculated from radar reflectivity processed collected data (e.g. estimated radar precipitation tiles).

In additional exemplary embodiment(s) one or more additional weather parameter blending program(s) (not shown) are configured to blend non-precipitation weather parameter data using a blending method similar to the method illustrated in FIG. 10. For example, in an exemplary embodiment a wind blending program (not shown) blends wind data from two or more sources, for example wind data from NWP ground weather database (353) and wind data from weather station database (323).

In an alternative embodiment, the precipitation blending program blends two of more input tile layers using an alternative an image processing-based blending process that blends two or more input tile layers by first representing the input tile layers as images, for example by converting precipitation tile layer values to grayscale pixels wherein the darkness of a pixel corresponds to a magnitude of the value of a precipitation estimate for the tile. The precipitation blending program then extracts objects from the images using one or more image processing techniques, morphs and blends the extracted objects from two or more input tile layers to generate a blended image, and translates pixels of the blended image to precipitation estimate values on a blended precipitation tile layer. In an exemplary image processing-based blending process, the blending program weights the input forecasts based on accuracy improvement data and uses a weighted morphing blending algorithm to blend the input forecasts.

6.5.2 Machine Learning Programs

In some exemplary embodiments, the modeling and prediction server includes machine learning-based programs that operate as stand-alone programs or as parts of other programs. These programs are configured to use pre-calculated/pre-trained machine learning models and to implement trained algorithms in order to generate weather parameter estimates and forecasts. Machine learning model training takes place on the offline/background server and is discussed in further detail in the related application.

This section describes generic programs and process flows for executing trained machine learning models to generate prediction or inference data in real time and during post-processing. These programs and process flows may be modularly added to any of the processing programs described above in Table 5 in order to enable the execution of machine learning models/rules for data and cadence processing.

The ML model execution module (946) retrieves a trained ML model and a corresponding ML model quality metric from the system database (320)). As mentioned above, the ML model execution module is a generic program that can be a component of, or be called by, one or more programs in the cadence stack.

Based upon its configuration settings, the ML model execution module retrieves ML model input data, for example processed collected and generated collected weather parameter data and historical forecast data, from one or more systems database(s). The ML model execution module executes the trained ML model using the input data to generate ML model output data which is stored in the system database (320). The ML model output data can include weather parameter estimates, predictions, and forecasts, depending on the ML model that is executed, and is saved to a tile layer of a cadence instance tile stack. The ML model execution module can associate a quality or certainty metric, retrieved from the system database (320), with the ML model output.

In an exemplary embodiment, modeling and prediction server (360) includes multiple instances of ML model execution modules (i.e. 946a, 946b, etc. (not shown)) or multiple programs that each include an instance of a ML model execution module. Each ML model execution module instance is configured to retrieve and execute a trained ML model. In some exemplary embodiments, ML model execution modules are configured to generate predictions on repeating schedules, e.g., during processing of operations of each cadence cycle, and on demand based on requests from client computing systems.

Expert systems module (948) retrieves, from a system database, data processing rules, retrieves input data, for example weather parameter data, from one or more system databases, and uses the rules to process the input data. In an example embodiment, the expert systems module performs complex event processing (CEP) using the retrieved rules to recognize events and patterns in the input data. The expert system module can be configured to generate alerts and otherwise communicate results generated by the module to other system processes.

6.5.3 Fog Inference and Forecasting

6.5.3.1 Definitions of Fog-Related Terms

We define a preliminary fog inference, or to preliminarily infer fog as meaning to conclude that fog is present based on reasoning and on evidence including values of weather parameter estimates, for example weather parameter estimates calculated from microwave attenuation measurements other words, we define inferring a presence of fog as concluding that the magnitude of a weather parameter estimate, for example a fog liquid water content (LWC) estimate, is indicative of the presence of fog in a geographic location at which fog the weather parameter estimate is measured or calculated. In a particular exemplary embodiment where fog LWC estimates are calculated based on microwave link attenuation measurements, inferring a presence of fog includes inferring that a measured microwave link attenuation is due to one or more microwave links passing through a portion of the atmosphere that includes fog. In an exemplary embodiment, fog LWC is calculated based on a particular attenuation measurement for a particular microwave link or based on microwave link attenuation aggregated from one or more microwave links at a particular geographic location We define a confirmed fog inference of fog as concluding that, at a particular time point, fog is present or is likely to be present at a particular location based on conditions preceding the particular time point. Confirming a fog inference can be based on many factors, for example, a pattern of historical fog LWC estimates calculated prior to calculation of a particular current LWC estimate, previous fog determinations, and one or more collected or predicted weather data.

We define detecting or detection of fog as an observation of fog by a human observer or by an instrument capable of directly detecting fog or directly measuring atmospheric parameters such as liquid water content and droplet size distribution that can be used to confirm a presence of fog.

We define forecasting of fog as concluding that, at a particular location and at a future time point or at a series of future time points, the probability that fog will be present or will likely be present.

6.5.3.2 Overview

The presence or absence of fog greatly influences attributes such as visibility, which are essential for use in determining and reporting RVR and visibility related weather conditions. Visibility-related weather conditions are of particular interest to transportation operators. It can be difficult or impossible to determine, from collected data at an isolated time point, whether a particular set of collected data (e.g, precipitation derived from microwave attenuation) indicates a presence of fog, rain, a high local atmospheric water density in the absence of fog, or a combination of fog and another atmospheric hydrometer such as a light rain.

The disclosed methods improve fog inference, including at locations that are not within detection range of a known fog detection instrument or human observer, by determining whether, based on a magnitude of measured magnitude of a fog-related weather parameter value (for example a weather parameter estimate calculated from measured microwave link attenuation), the weather parameter is indicative of fog at one or more locations. In a particular embodiment, as described in the related application, after the system applies one or more transforms to a set of microwave link attenuation measurements to calculate fog liquid water content (LWC) estimates at a one or more locations and creates machine learning rules that infer that fog is present at locations where estimated fog LWC magnitude is greater than zero or greater than a configurable detection threshold ($T_{FogLow}$) and, in some embodiments, where estimated fog LWC magnitude is less than a threshold amount ($T_{FogHigh}$) that is indicative of precipitation or other non-fog atmospheric condition, for example less that a maximum likely LWC of fog at a particular location.

The system then uses time series analysis to determine whether or not fog, versus some other hydrometer, is likely at locations where a presence of fog has been inferred, for example based on a time series of fog LWC estimates. A prediction of likelihood of fog based on fog predictive models is used to influence a determination of or confidence in a LWC-based fog inference.

In an embodiment, time series rules ML models are developed using time series analysis of detected fog events, i.e. fog events detected by a dedicated instrument or human observer, and historic trends in fog LWC estimate magnitude and time rate of change in fog LWC estimate magnitude associated with confirmed fog events. In an embodiment, time series rule ML models are developed using time series analysis of detected fog events and historical precipitation, atmospheric water vapor, or fog/no fog inferences based on LWC estimates, for example based on estimates generated based on microwave link attenuation measurements. The time series rule ML models are used to confirm or refute a fog inference based on a time series of LWC estimates to reduce fog inference false alarm rates. In a particular exemplary embodiment, the time series rule ML models are used to confirm or refute a fog inference based on a weather parameter data value, e.g., based on a LWC estimate value generated from microwave link attenuation measurements to reduce false alarm rates of fog inference based on microwave link attenuation collected data.

The disclosed methods further include using fog predictive models trained with atmospheric data such as temperature, pressure, humidity, LWC, and other fog-related atmospheric parameters, along with, in some embodiments, microwave link attenuation to predict a presence of fog, an absence of fog, or a probability of fog at a current time point, e.g. at a cadence instance collection time stamp. The predictive model's fog prediction includes, for example, recognition of conditions that are conducive to fog formation, conditions that are likely to prevent or disrupt fog formation, and conditions under which a non-fog hydrometer capable of attenuating microwave link signal strength is likely to form. Fog prediction results generated by the fog predictive model are used to reduce false positive fog inferences by combining fog inference based on time series analysis of collected processed or collected generated weather parameter data and fog inference based on fog predictive model fog predictions.

In a particular exemplary embodiment, a fog predictive model is configured to produce a binary determination or a probabilistic measure of a likelihood of fog formation which is used to confirm or disprove a fog inference that is made based on weather parameter data values generated based on microwave link attenuation measurements.

In an alternative embodiment, the system processes current microwave link attenuation measurements for individual microwave links and infers a presence of fog along each link or along one or more segments of each link. The system saves historical microwave link attenuation measurements to a system database. The system generates and updates time series rule ML models based on individual microwave link attenuation. The system processes a time series of attenuation measurements, including historical attenuation measurements, for microwave links using the time series rule ML models to confirm or refute and initial fog inferences based on a current link attenuation measurements. The system then uses a fog or no fog prediction, or a probabilistic fog prediction, generated by the predictive model in the geographic regions that the links traverse to reduce false positive fog inferences by combining microwave link based fog inference and fog predictive model fog predictions.

In a further alternative embodiment, a fog predictive model is configured to determine or adjust weights applied to components of a fog/no fog or probabilistic fog calculation algorithm that includes microwave link attenuation as an algorithm input. In an exemplary embodiment, a fog predictive model is configured to generate weights corresponding to one or more parameters including: likelihood of fog formation; likelihood of fog dissipation; likelihood of rain; likelihood of cooling trend; likelihood of increasing atmospheric humidity, etc.

6.5.3.3 Fog Inference Program and Method

The fog inference program (919) which retrieves data processing rules including fog time series rule ML models and processes weather parameter data using the fog time series rule ML models to generate fog inference decisions. The fog inference program (919) implements fog inference method (4100). In some embodiments, the fog inference program also implements microwave precipitation, atmospheric water vapor, and LWC estimate calculation method (70910) to calculate microwave precipitation, atmospheric water vapor, and LWC estimates.

In an exemplary embodiment, these programs are used in the fog inference program (919) described below, which typically operates during the post processing portion of the cadence stack and includes the ML model execution component.

The fog inference program is in communication with and can retrieve data from and write data to system database (320) and data cache (720). In an exemplary embodiment the fog inference program inputs fog LWC estimates, for example, from an LWC tile layer (2048) from a precipitation database (356*a,b*) or from fog inference data database (998), time series analysis rules, and fog predictive model data. The fog inference program produces as output fog inference data (999) that is stored in the system database and a made available, for example, as fog inference tile layer (2047), that includes fog tog/no fog indications or indications of fog probability at one or more locations. The fog inference data is calculated by the fog inference program determining a presence or absence of fog at a subject time period based on calculated fog LWC estimate values at the subject time period, matching one or more time series rule ML models to a time series of fog LWC estimate magnitudes preceding and including the subject time period, and fog/no fog or fog probability prediction results included in data output by fog predictive model (926). Fog inference data, recorded on a fog inference tile layer, is stored in fog inference database (998).

In an exemplary embodiment, the fog inference program generates fog inferences using fog LWC estimates calculated by the fog inference program or one or more microwave link precipitation programs using pre-configured transforms. In another exemplary embodiment, the fog inference program generates fog inferences using LWC estimates provided by an external source, for example estimates provided by the National Oceanic and Atmospheric Administration (NOAA) or forecasted estimates provided by a NWP, e.g. HRRR forecast estimates. In some exemplary embodiments, the fog inference program generates fog inferences using blended LWC estimates generated by a blending program that blends LWC estimates from two or more sources.

In an exemplary embodiment, the fog inference program makes a preliminary fog=yes inference at each location where estimated fog LWC is within a range defined by $T_{FogLow}$ and $T_{FogHigh}$, as previously discussed. In an embodiment, the fog inference program assigns a confidence to the preliminary fog inference, for example a low confidence indication or a numerical value representing a low confidence.

In an exemplary embodiment, the fog inference program includes an expert systems module (948) that retrieves one or more fog time series rule ML models from a system database (320) and implements the one or more fog time series rule ML models to process input data, for a current ($M_t$) fog LWC tile layer (2048) and one or more previous cadence instance fog LWC tile layers from fog inference data database (998), to produce output data including time series based fog inference decisions. The fog inference program (919) uses the time series rule ML models to confirm a preliminary fog inference and determine a confirmed fog inference (or in the absence of a confirmation, refute the preliminary fog inference). In an embodiment, the fog inference program increases a confidence indication associated with each confirmed fog inference, for example a medium confidence indication or a numerical value representing a medium confidence.

Fog time series rule ML models and their creation are more fully described in the related application.

Fog Predictive Model Program (926)

The fog predictive model program (926) which includes an instance of ML model execution module (946) configured to retrieve and execute a trained fog predictive model machine learning model. Each ML model execution module can be configured, for example with a configuration setting, to retrieve and execute a particular trained ML model. The fog predictive model program is in communication with and can retrieve data from and write data to system database (320) and data cache (720).

The fog predictive model is a machine learning model, for example a neural network algorithm, that is trained using fog-related weather parameter data and detection data to predict fog/no fog for a particular set of weather parameter inputs. In a particular example, the fog predictive model is configured to predict whether or not fog is present given weather parameter values of a current cadence instance. In a particular exemplary embodiment, the fog predictive model is a predictive model that has been trained to recognize sets of conditions and trends that occurred when fog inferences are likely to be correct or incorrect, i.e. whether they are likely to be verified by direct instrument-based fog measurements or human observations. Sets of conditions can include conditions at a particular time point; for example, at the time point at which fog is inferred or a time point preceding a fog inference time point. Sets of conditions can include trends in conditions such as a decreasing or increasing trend in air temperature or and increasing or decreasing trend in prevailing wind speed. Sets of conditions can include conditions that are indicative of an incorrect fog inference such as a combination of prediction of fog, rather than light rain, and ground station measurements of rain accumulation indicative of light rain. Training and retraining of fog predictive models is discussed in further detail in the related application.

The fog predictive model program retrieves, from a system database, input weather data including, for example, collected processed or collected generated weather parameter data and forecast generated data. The fog predictive model program executes the trained fog prediction model with the retrieved input weather data to produce a binary fog/no fog prediction, a probabilistic fog prediction, and/or parameter weights. The fog predictive model program stores fog predictive model data (996), including fog predictions and/or parameter weights, in fog predictive model data database (997). In an embodiment, the fog predictive model program writes fog predictive model data to data cache (720) and thus communicates the fog predictive model data to the fog inference program without saving it to a system database.

Fog Inference Program (919)

The fog inference program (919) retrieves the fog predictive model data from the fog predictive model data database, data cache, or the fog predictive model program. The fog inference program applies fog prediction results or parameter weights comprising fog predictive model data to an attenuation-based fog inference to verify or refute the confirmed inference. In an embodiment, the fog predictive model program compares a fog predictive model probabilistic value to a configurable threshold value ($T_{verify}$) to determine whether to verify or refute the confirmed fog inference. In an exemplary embodiment, $T_{verify}$ includes a configurable range of thresholds based on geographic location, for example, on a scale or 0 to 1, 0.5 at a first location where, based on historical observations, fog events are common and 0.9 at a second location where fog events are rare. In an embodiment, the fog inference program increases a confidence indication associated with each verified fog inference, for example a high confidence indication or a numerical value representing a high confidence. In a particular exemplary embodiment, the fog inference program calculates a confidence indication value of a fog inference based on a fog probability metric generated by the fog predictive model. The fog inference programs writes for inference data (e.g., fog yes/no or fog probability) to a fog inference tile layer (2047) and stores the inference in fog inference database (998).

6.5.3.4 Fog Forecasting Program (931) and Method

The fog forecasting program is in communication with and can retrieve data from and write data to system database (320) and data cache (720). The fog inference program carries out a fog forecasting method, described herein.

In another embodiment, the fog forecasting program (931), which operates during forecast processing, includes ML model execution module. The program that uses the component defines the ML model or rules to be processed and the dataset to be used.

The fog forecasting program (931) includes an instance of ML model execution module (946) configured to retrieve and execute a trained fog predictive model machine learning model. Each ML model execution module can be configured, for example with a configuration setting, to retrieve and execute a particular trained ML model.

In an embodiment, recent fog-related weather parameter data collected by information normalization and collection server (310) from weather sensor data sources and generated collected weather parameter data, e.g., calculated or collected LWC estimates, and collected or internally generated numerical weather forecast model output, e.g. generated data produced by the fog predictive model program and/or collected processed data from NWP model data source (341), are used to make short-term forecasts (e.g. NowCasts) for fog and LWC at given locations and, in some embodiments, to forecast fog at further forecast time points based on forecasted fog-related weather parameter data.

In one exemplary embodiment, the fog forecasting program retrieves, from a precipitation database or from the fog inference data database, one or more LWC tile layers (2048) corresponding to $M_iF_0$ forecast time point and calculates forecast fog or LWC at further forecast time periods, i.e. at time periods corresponding to $M_iF_j$ fog forecast tile layers (2049). In an exemplary embodiment the fog forecasting program retrieves at least one of fog inference data (999), generated collected LWC data calculated from microwave link precipitation estimates (626a,b), and NWP processed data (619/629) including wind vector forecast data and in some embodiments other measured or forecast weather parameter data. In an example embodiment, the fog forecasting program calculates fog forecasts by advection, e.g., by applying two or three dimensional wind vectors retrieved from NWP databases (329, 353) to LWC estimates. The fog forecasting program writes fog forecast data to $M_iF_j$ fog forecast tile layers corresponding to fog forecast time points. The fog forecasting program saves forecast data as fog forecast data (991) in the fog forecast data database (990).

In another exemplary embodiment, the fog forecasting program retrieves and executes a trained fog predictive model in order to generate forecast fog predictions at forecast time points using forecasted and, in some embodiments, collected weather parameter data. In this exemplary embodiment, the fog forecasting program includes a machine learning model execution module (946). The fog forecasting program retrieves a trained fog forecasting model from a system database (320) and one or more forecast weather parameter tile layers, for example a stack of forecast humidity or LWC estimate tile layers and a stack of forecast temperature tile layers, and, in some embodiments additional fog predictive model input data including, for example, information regarding terrain and bodies of water. The fog forecasting program generates a fog forecast tile layer at each fog forecast time point by executing the trained fog predictive model at each fog forecast time point using the retrieved forecast weather parameter tile layer(s) corresponding to the fog forecast time point. In a first exemplary embodiment the fog forecasting program generates a fog forecast using weather parameter forecast tile layers from a single cadence instance forecast stack. In a second exemplary embodiment the fog forecasting program generates a fog forecast using collected and/or forecast weather parameter tile layers from one or more previous cadence instances. In a particular example, the fog forecast program generates a fog forecast using current cadence cycle weather parameter forecast tile layers at fog forecast time points for which current weather parameter forecast tile layers are available and using collected or forecast weather parameter tile layers from one or more other cadence cycles at fog forecast time points where current weather parameter forecast tile layers are not available. The fog forecasting program stores fog forecast data (991) in fog forecast data database (990).

As will be discussed in further detail below, fog inference and LWC is used to estimate visibility and runway visual range (RVR) at the given locations and NowCasting is used to forecast visibility and RVR at the given locations based on forecast fog and LWC of the forecast fog at future time points. In an embodiment, up to 3 hours of historical observations from surface stations are processed and forecasts for a period up to 3 hours in advance are generated.

In a further embodiment, fog forecasts for more than three hours, for example up to 6 hours, are generated. Forecasts up to 6 hours are useful for transportation applications, including aviation applications. For example, in the United States the Federal Aviation Administration (FAA) operates the Enhanced Traffic Management System (ELMS) which manages the US airspace. The ETMS projects flights up to 6 hours in advance from takeoff to arrival, partially based upon landing slots being available.

6.5.3.5 Exemplary Method for Creating Fog Inferences

Figure 11:
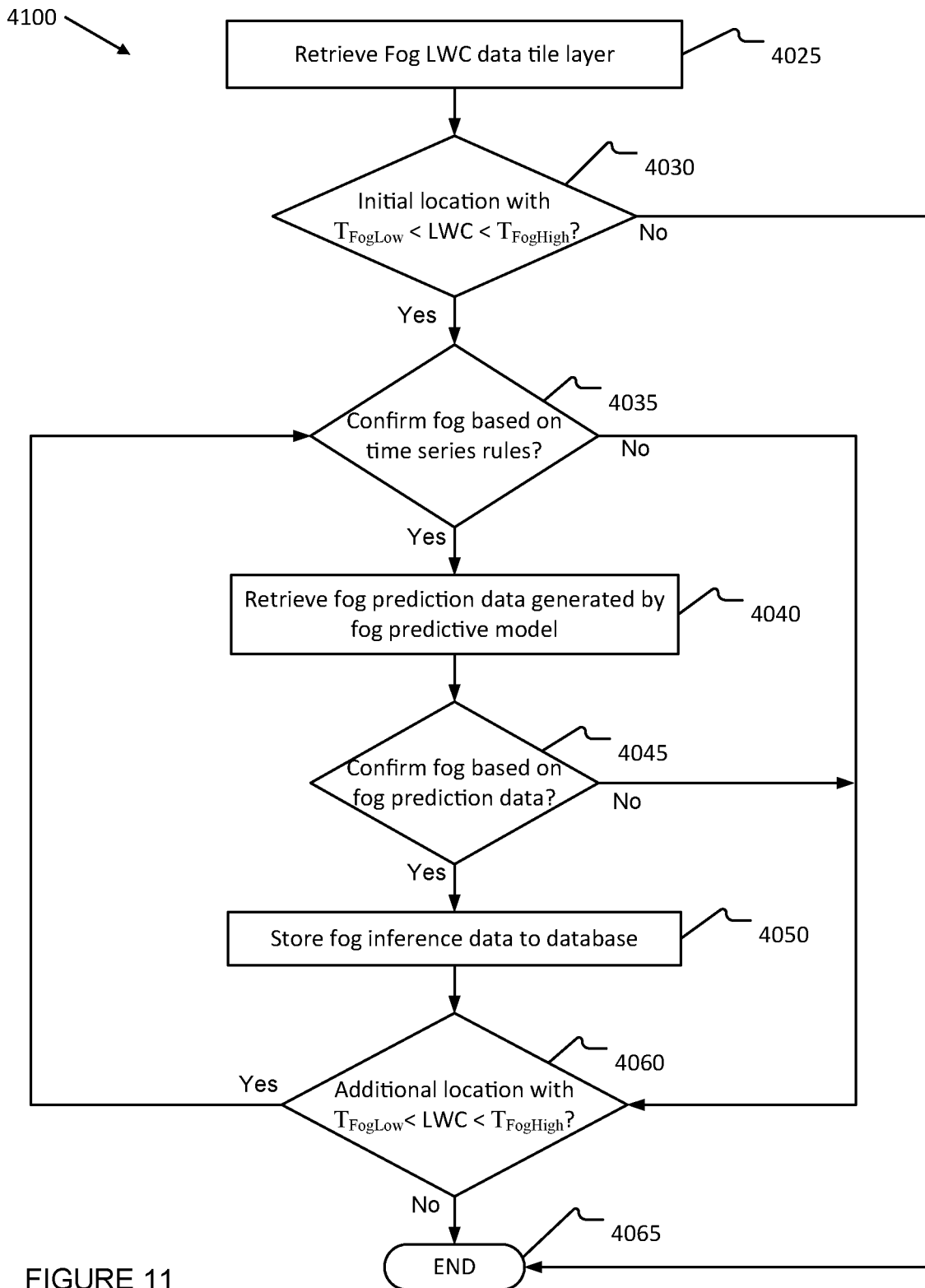
FIG. 11 depicts an exemplary fog inference method for making fog inference decisions, according to an illustrative embodiment.

Referring to FIG. 11, an illustrative method (4100) is shown for making fog inference decisions based on atmospheric LWC. The method includes steps to infer a presence or absence of fog based on current LWC estimates and time series rule ML models and to confirm or refute fog inference decisions, and using fog predictive data from a predictive model to verify a confirmed fog inference. In a particular exemplary embodiment the system infers a presence or absence of fog using data including LWC estimates calculated as generated collected data based on microwave link attenuation collected data.

A fog inference processing instance begins at step 4025. At step 4025 the fog inference program retrieves fog transforms and retrieves from a filter and transform database a retrieves a fog LWC tile layer (2048) from fog inference database (998) or from another system database, for example a microwave precipitation database.

At step 4030, the fog inference program determines if at least one tile of the fog LWC tile layer includes LWC within a threshold range of values that is indicative of fog, for example greater than $T_{FogLow}$ and less than $T_{FogHigh}$. If yes, the fog inference program selects a fog LWC tile with fog LWC within the threshold range of values and makes a preliminary fog=yes inference for the selected LWC tile and records the preliminary inference to a corresponding tile of a fog inference tile layer (2047) with, in some embodiments, a confidence score associated with the preliminary inference. If no, the process ends.

At step 4035 the fog inference program retrieves one or more fog time series rule ML models from a system database (320) and retrieves a time series of fog LWC tile layers, for example fog LWC tile layers generated or collected during one or more preceding cadence intervals, from the fog inference database or from a precipitation database. The fog inference program applies the fog time series rule ML model(s) to a time series of LWC estimates corresponding to the selected tile to make a confirmed fog/no fog or fog/precipitation inference based on the preliminary inference. The fog inference program generates the confirmed inference by using the fog time series rule ML models to determine whether one or more patterns of fog LWC estimates in the time series matches a pattern of fog LWC estimates that indicate that fog is or is not present or that precipitation is present. In an embodiment, the fog inference program applies fog time series rule ML models to a time series of fog LWC estimates that include a current, real time, fog LWC estimate and recorded fog LWC estimates from the preceding three hours. If a pattern of fog LWC estimates matches a pattern of LWC values that is indicative of fog, the fog inference program determines that fog could be present in the location covered by the selected tile during the current cadence instance. If so, the fog inference program confirms the preliminary fog inference. The fog inference program records the confirmed inference to the corresponding fog inference tile layer (2047) and, in some embodiments, increases the associated confidence score.

However, if, at step 4035, the fog time series rule ML models indicate that fog is not present or that fog is not likely then the fog inference program refutes the preliminary fog inference, records a no fog result, and in some exemplary embodiments an inferred precipitation result, for the selected tile, and proceeds to step 4060 to determine if there are additional locations, i.e. additional tiles with LWC values within a threshold range of values that is indicative of fog, to process.

At step 4040 the fog inference program retrieves fog predictive model data generated by the fog predictive model program (926). In an exemplary embodiment, the fog inference program causes the fog predictive model program (926) to generate fog predictive model data and then retrieves the generated predictive model data (926). To generate the predictive model data, the fog predictive model program loads a trained fog prediction model and retrieves weather parameter data including, for example, current cadence cycle microwave link attenuation, temperature, and humidity data. The fog predictive model program processes the retrieved weather parameter data using the trained fog prediction model to generate fog predictive model data.

At step 4045, fog inference program uses the fog predictive model data to verify or refute the fog inference that was confirmed at step 4035. If a confirmed fog inference was generated at step 4035 and the fog predictive model data includes an indication of a presence of fog, the fog inference program verifies the confirmed fog inference determination at step 4045. If a confirmed fog inference was generated at step 4035 and the fog predictive model data indicates that fog is not present, then the fog inference program refutes the fog inference at step 4045, records a no fog result for the location, and proceeds to step 4060 to determine if there are additional locations with MC greater than zero or with $T_{FogLow}<LWC<T_{FogHigh}$ to process. If a precipitation inference was made at step 4035, then the fog inference program verifies the precipitation inference without referring to fog predictive mode data at step 4045, records the verified inference result to the corresponding fog inference tile, and in some embodiments increases or recalculates the associated confidence score. In an exemplary embodiment, the fog inference model calculates and records a fog probability metric to the corresponding fog inference tile.

in a first example implementation of method 4100, at step 4035 the fog inference program confirms, based on LWC estimates and fog time series rule ML models, an inference that fog is present, i.e. that precipitation is not present. At step 4045, the fog inference program determines that fog predictive model data includes an indication that, based on atmospheric conditions and/or trends, that fog is present or that there is a high probability that fog is present. Based on the presence of fog indicated by fog predictive model data, the fog inference program verifies the fog inference.

In a second example implementation of method 4100, at step 4035 the fog inference program confirms an inference that fog is present. At step 4040 the fog inference program determines that fog predictive model data indicate that fog is not present or that there is a high probability that fog is not present. Based on the fog predictive model data, the fog inference program determines that fog is not present, i.e. that the fog inference determination that was confirmed by time series rule ML models at step 4035 may be incorrect, and therefore refutes the fog inference. An exemplary set of conditions under which this might occur include microwave link attenuation having a magnitude that, when processed using fog transforms to produce fog LWC estimates, is indicative of a presence of fog. However, fog predictive model data indicate that fog formation is unlikely due to one or more atmospheric characteristics or due to a combination of atmospheric characteristics such as wind speeds that are too high for fog formation, humidity that is too low, and other conditions that are not conducive to fog formation.

In a third example implementation of method 4100, the fog predictive model data include an indication of a high likelihood of rain capable of producing microwave link attenuation similar to that produced by fog, in which case the fog inference program determines that precipitation is a more likely cause of measured microwave attenuation and refutes a confirmed fog inference determination at step 4045.

In a fourth example implementation of method 4100, at step 4035, the fog inference program confirms a fog inference. At step 4040 the fog inference program retrieves fog predictive model data including a probabilistic fog prediction value. If the probabilistic fog prediction value is greater than a threshold magnitude, $T_{verify}$, for example greater than 90% certainty of fog, and the microwave link attenuation data indicates the presence of fog, then at step 4045, the fog inference program verifies the fog inference.

In a further embodiment, the fog inference program determines a verified fog inference based predictive model results generated by the fog predictive model program using inputs including fog LWC estimates, for example LWC estimates calculated by the system based on microwave attenuation measurements In this exemplary embodiment, at step 4045, the fog inference program generates a verified fog yes/no inference based upon outputs the fog inference determination.

At step 4050, the fog inference program stores fog inference data (999), including fog inference results, e.g. a fog inference tile including fog inference result and associated confidence score, to fog inference data database (998)).

At step 4060, the fog inference program determines if one or more additional locations with LWC within the threshold range of values indicative of fog are available for processing and, if so, returns to step 4035 to process and additional LWC tile. If no additional microwave link data is available, process 4000 ends at step 4065.

Figure 12:
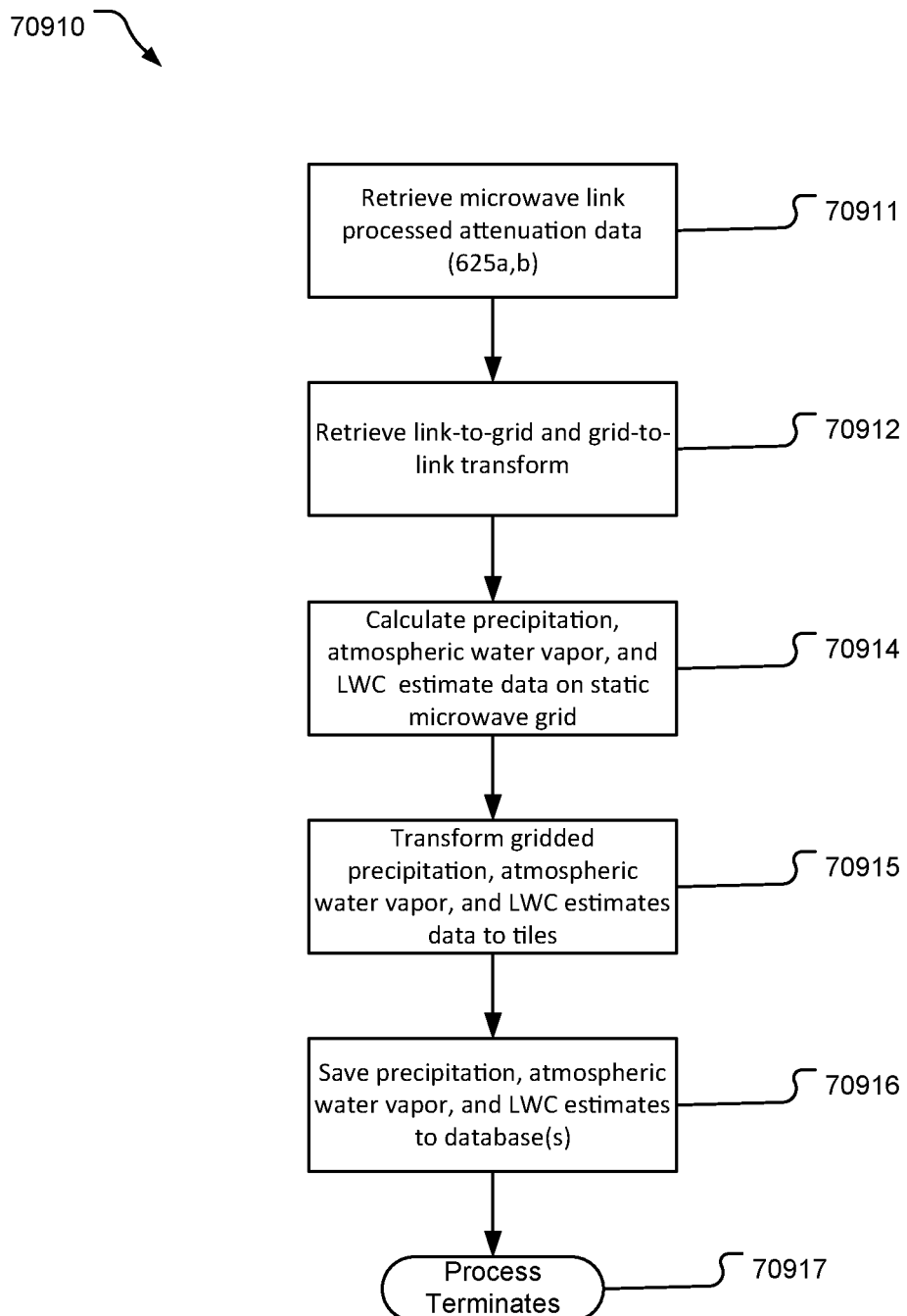
FIG. 12 depicts an illustrative flow chart of an exemplary method for calculating microwave precipitation, atmospheric water vapor, and LWC estimates from microwave signal collected data according to an illustrative embodiment.

6.5.4 Exemplary Method for Calculating Microwave Precipitation, Atmospheric Water Vapor, and LWC Estimates FIG. 12 includes a flowchart depicting an exemplary microwave precipitation, atmospheric water vapor, and LWC estimate calculation method (70910) for generating weather parameter data from processed microwave link attenuation data (625a,b) using pre-calculated transforms. Process (70910) is carried out by one or more microwave link precipitation programs (654a,b) or by fog inference program (919).

At step (70911) a microwave link precipitation program retrieves microwave link processed attenuation data (one or more of (625a), (625b) from one or more microwave link attenuation databases (352a,b).

At step (70912) the microwave link precipitation program retrieves pre-calculated link-to-grid and grid-to-tile transforms from transform and filter database (393).

At step (70914), the microwave link precipitation program processes the retrieved microwave link processed attenuation data (625a,b) using link-to-grid transforms to generate one or more of precipitation, atmospheric water vapor, and LWC at one or more grind points of a static microwave grid. When processing satellite microwave link processed attenuation data (625a), the microwave link precipitation program uses link-to-grid transforms to project satellite link segments to planes, apportion attenuation to the satellite microwave link segments, and to satellite microwave link points, and to generate, based on attenuation mapped to each link point, precipitation, atmospheric water vapor, and LWC at static microwave grid points of static microwave grids corresponding to planes onto which satellite link segments are projected. At step (70915), the microwave link precipitation program uses grid-to-tile transforms to map gridded precipitation, atmospheric water vapor, and LWC estimates to tiles of one or more precipitation, atmospheric water vapor, or LWC tile layers as atmospheric precipitation and water vapor estimates (626a) or precipitation estimates (626b). Application of grid-to-tile transforms can include using projection or clipping transforms to project the precipitation, atmospheric water vapor, or LWC estimates to one or more planes, each plane corresponding to a corresponding tile layer.

At step (70916), the microwave link precipitation program saves the precipitation, atmospheric water vapor, and LWC estimates (626a,b) to a microwave link precipitation database (356a,b) and process (70910) terminates (70917).

In a further exemplary embodiment, a microwave link precipitation program performs a method substantially similar to method (70910) to calculate ground level precipitation estimates using both satellite and terrestrial microwave link attenuation collected data. In this embodiment the microwave link attenuation program retrieves, at step (70911) both satellite microwave link processed attenuation data (625a) and terrestrial microwave link processed data (625b), from satellite and terrestrial microwave link databases, and retrieves combined terrestrial and satellite microwave link transforms from the filter and transform database at step (70912). The microwave link precipitation program processes the microwave link attenuation data to calculate weather parameter data values, for example one or more of microwave link precipitation, atmospheric water vapor, and LWC estimates on a ground level microwave precipitation tile layer (2022a,b) or LWC estimates on a ground level LWC tile layer (2048). The microwave link precipitation program further calculates confidence metrics for each weather parameter data value.

Methods substantially similar to those discussed in relation to FIG. 12 can be used by the satellite microwave link precipitation program to estimate, for example, atmospheric water vapor from GPS satellite signal delay measurements, atmospheric precipitation rates from satellite microwave attenuation or delay measurements, and cloud water content from satellite microwave attenuation measurements by substituting appropriate collected data and collected-to-generated-data calculation transform (e.g. precipitation estimate calculation transforms) for satellite microwave attenuation collected data and/or satellite microwave attenuation-to-atmospheric water transforms.

6.5.5 Runway Visual Range (RVR)

Figure 14:
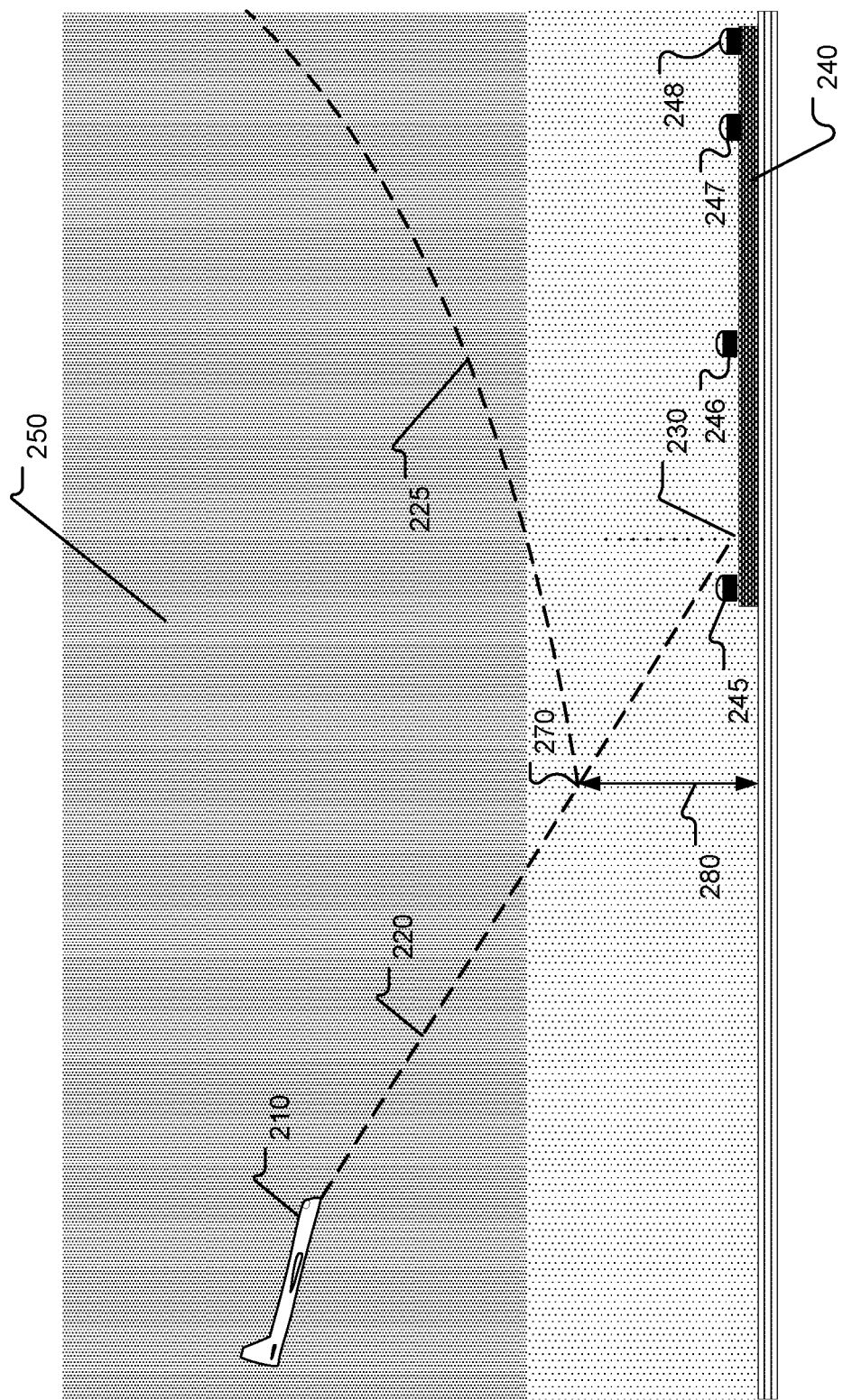
FIG. 14 depicts a graphical image of RVR (runway, light, airplane, RVR shown as distance), according to an illustrative embodiment.

FIG. 14 illustrates how weather-related runway visibility can affect airport operations. A metric called "Runway Visual Range" (RVR) is calculated for determining runway visibility. Runway visual range is a measure of the horizontal distance a pilot will be able to see down a runway while landing or taking off. As an aircraft (210) descends on a glide path (220) toward an intended touchdown point (230) on a runway (240), it experiences weather conditions in the atmosphere surrounding and above the airport (250).

In order to land or take off safely, pilots must have a minimum required visibility of the runway. On a landing approach, if a pilot does not have adequate visibility of the runway by the time a specific point above the ground is reached (known variously as "Minimum Descent Altitude" (MDA), "Decision Height" (DH), and "Decision Altitude" (DA)) (270), the landing may not proceed (225). The specific altitude or height of the MDA (280) and the distance from the airport where this point (270) is located varies based upon a number of factors.

RVR is used by pilots and air traffic controllers as a metric to determine whether or not it is safe to conduct flight operations and to schedule takeoff and landing intervals. RVR is affected by atmospheric conditions, background lighting, and the intensity of runway Instantaneous RVR is typically determined by sighting either high intensity runway lights or other objects, for example a black object sighted against brighter background lighting, and reported as the greater visual range of the two sightings. Visibility determined by sighting high intensity lights is typically referred to as $V_a$. Visibility determined by sighting a black object is typically referred to as $V_k$. $V_a$ and $V_k$ can be calculated by solving well-known formulas. An airport can select either $V_k$ or $V_a$ to report as RVR; the selection may vary depending upon condition or time of day.

Airports currently use data collected by one or more RVR sensors (245, 246, 247, 248) to determine a measure of the current $V_k$. Each runway may include multiple RVR sensors including one sensor located at each of the touchdown end (245), far end (248), mid-point (246), and rollout end (247) of a runway. $V_k$ and $V_a$ vary with atmospheric conditions such as rain, snow, hail, or sleet rate and the presence or absence of fog.

To calculate or estimate RVR, an atmospheric light extinction ($\beta$) is calculated and then used as a parameter that is included in an equation that is solved numerically to determine $V_a$. The atmospheric extinction coefficient for rain ($\beta r$) can be parameterized using equation 4:

$$\beta r = aR^b \tag{4}$$

where R is the instantaneous or forecast precipitation intensity and a and b are atmospheric extinction parameters that can be determined by experimentation and modeling.

Exemplary parametrization for extinction coefficients for snow ($\beta s$) and for fog ($\beta f$) are also known.

The estimated LWC of a fog field can be used to estimate visibility (V) using well-known equations as a function of measured attenuation, microwave link frequency, and temperature. Visibility estimates calculated based on fog LWC can be expressed in terms of RVR (i.e. Cat 1, Cat 2, etc., meters or feet, one bar equals 1500 m, 2 bars equals 1000, 3 bars 500 m or Cat 1, etc.).

Although the methods and systems disclosed herein are useful for estimating and forecasting a plurality of visibility measurement and/or reporting types, the following discussion of illustrative embodiments includes forecasting runway visual range (RVR). The system can be configured to estimate and forecast additional or alternative visibility measurement types can by substituting suitable equations and parameterizations, and associated data inputs, for those discussed in relation to RVR. Illustrative, non-limiting, visibility types that the system can be configured to estimate and forecast include runway visual value (RVV), meteorological optical range (MOR), surface visibility, tower level visibility, prevailing visibility, sector visibility, and observer visibility. In an additional, non-limiting, embodiment the system can be configured to estimate and forecast flight and vertical visibility at one or more selected altitudes, for example at one or more altitudes or altitude ranges corresponding to Visual Flight Rules (VFR) weather minimums and/or classes of air space. In a still further exemplary, non-limiting, embodiment the system can be configured to estimate and forecast, based on visibility estimates and forecasts, AOT. AOT is defined as the integrated vertical extinction coefficient over a vertical atmospheric column of unit cross-section.

6.5.5.1 Overview of RVR Forecasting

We define instantaneous RVR as the actual current RVR calculated for a runway or airport as read from the RVR sensors deployed at an airport. We further define the forecast RVR as a RVR estimate or a sequence of RVR estimates projected into the future, where the forecast RVR is calculated by the system as an additional forecast parameter based upon the forecast precipitation amount and type at the airport location or based on inferred forecast fog and. LWC. Referring to FIGS. 6 and 7, forecast RVR is included as a forecast RVR tile layer (2035) of a forecast stack $M_iF_j$ and forecast RVR includes a time zero, or real time, RVR at $M_iF_0$ and RVR at future forecast time periods bounded by the range $M_iF_{(1-n)}$.

In an exemplary embodiment, the forecasting system (300) generates RVR forecast tile layers that include RVR forecast over an entire region that is covered by a precipitation or fog forecast tile layer. That is, the system can forecast RVR at every region where precipitation intensity forecasts and fog forecasts are generated. In alternative embodiments, the system limits RVR forecasts to locations or areas that are specified as locations of interest by users and customers. The following discussion includes generating RVR forecasts at selected locations of interest but these are not intended to be limiting examples. The system can also generate RVR forecasts over larger, non-specific, regions, for example over an entire forecast tile layer.

A user can interact with information distribution and alerting server (370 of FIG. 1) to select a location of interest, for example by entering a request for the forecast RVR report via network interface (845*a*), and request that RVR forecasts should be generated for the selected location of interest, for example for a particular runway or airport. This selected location of interest is stored in the system in location of interest database (391). Although the following discussion is limited to requesting RVR reports or notifications at specific times and locations of interest, similar methods can be used to request reports and forecasts of fog, including fog LWC or intensity, or reports and forecasts of other weather phenomena at selected locations and time points.

Referring to FIG. 15, in an exemplary embodiment, a user requests a report or notification of RVR at one or more desired location of interest by interacting with an overview map (1110) to select a location of interest for RVR forecast by placing a flag (1410) or defining a polygon (1510) on the overview map. For example, a user can place a flag at the touchdown end of one or more selected runways at an airport to request an RVR report at each selected runway touchdown end.

A user can request an RVR report for a desired area of a map such as a runway or airport by drawing, on a display, a polygon that encloses the desired area. The information distribution and alerting server retrieves RVR forecast data from each tile that is enclosed by the polygon and reports the minimum RVR corresponding to the area enclosed by the polygon. A user can draw a polygon around a runway to request an RVR report for the entire runway, i.e. to request a report of the minimum RVR along the entire runway. A user can draw a polygon around an entire airport to request a report that includes the minimum RVR at the airport. For example, referring to FIG. 16A, a user defines polygon (3010) to enclose airport (3015) and polygon (3012) to enclose runway (3016). A user can specify multiple flags, multiple polygons, or a combination of flags and polygons. The information distribution and alerting server will report RVR for each flag and polygon.

In some exemplary embodiments, one or more alternative selection methods are used to request an RVR report corresponding to an airport or a runway. For example, a user can select an airport or runway from a list of airports and runways and can further specify an RVR location along a runway, for example a user can specify a touchdown RVR location on a particular runway.

The information distribution and alerting server saves selected RVR forecast locations to location of interest database (391) and updates the location of interest database when RVR forecast locations are added or removed.

A user can specify a particular time, which can include current time or a time point in the future, for which a report of RVR is desired. A user can specify a report of RVR over a span of time in which case the information distribution and alerting server will return RVR values for multiple time points within the specified span of time. Additionally or alternatively a user can schedule periodic RVR reports. Additionally or alternatively a user can select airports and runways and defer request of an RVR report or forecast until a later time. In an exemplary embodiment the system is configured to generate RVR forecasts whenever precipitation forecasts are generated. In a first configuration the precipitation forecasting program (915) alerts the RVR forecasting program (920) when a set of precipitation forecast tile layers (e.g., a set of forecast precipitation tile layers from $M_rF_{(0-n)}$) or a set of fog forecast tile layers (e.g., a set of forecast fog LWC tile layers from $M_rF_{(0-n)}$) is available and the RVR forecasting program generates an RVR forecast following the completion of calculations of a precipitation forecast. In a second configuration precipitation forecasting program (915) alerts the RVR forecasting program (920) when a forecast precipitation and/or fog tile layer available and the RVR forecasting program generates forecast RVR tile layers substantially in parallel to calculation of forecast precipitation. In a similar manner, in some exemplary configurations, the fog forecasting program alerts the RVR forecasting program when new fog forecast generated data is available.

The information distribution and alerting server communicates with other servers, including information collection and normalization server (310) and modeling and prediction server (360), to cause the other servers to pre-configure precipitation-to-RVR and fog-to-RVR programs, collect input data, retrieve forecast precipitation data and forecast fog data, determine forecast RVR, and then to make the forecast RVR data available to the information distribution and alerting server for use in generating a forecast RVR report, for example by storing forecast RVR data (922) to RVR forecast database (923).

6.5.5.2 Illustrative Method for Calculating, Forecasting, and Reporting RVR

Figure 13:
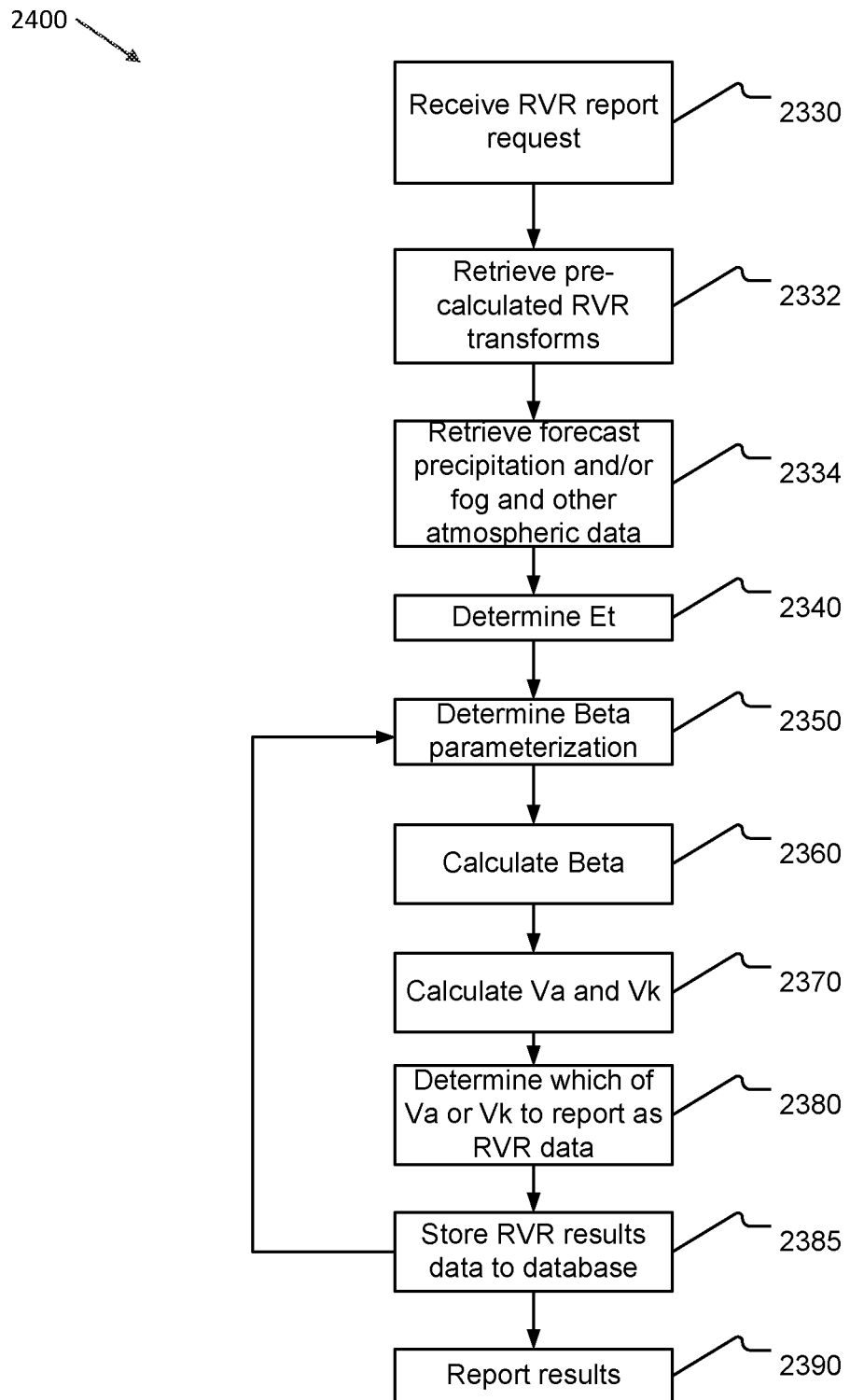
FIG. 13 depicts an illustrative flowchart of an exemplary RVR calculation and forecast report generation method, according to an illustrative embodiment.

Referring to FIG. 13, an illustrative precipitation-to-RVR method (2400) is shown for producing RVR estimates and forecasts. It comprises steps to process precipitation measurements and forecast estimates, to calculate RVR, and to produce RVR forecasts and reports. A method similar to precipitation-to-RVR method can be used to produce RVR products using additional or alternative inputs including, for example, fog and atmospheric LWC estimates. RVR forecasting program (920), operating on modeling and forecasting server (360), performs steps of the precipitation-to-RVR method.

In an embodiment, the RVR forecasting program inputs data including at least one of forecast precipitation data (902), fog forecast data (991) related RVR ancillary data and produces, as output, forecast RVR data (922) for one or more forecast time points and locations. The RVR forecasting program saves forecast RVR data (922) to forecast RVR database (923).

The precipitation-to-RVR method begins at step (2330) with the RVR forecasting program receiving a request, for example from the information distribution and alerting server, for an RVR report, the request including one or more RVR locations of interest (in this case airport (3015) and runway (3012)) and RVR forecast time point(s). Referring to FIG. 16C, at step (2332), the RVR forecasting program retrieves pre-calculated precipitation-to-RVR transforms corresponding to the location of interest from transform and filter database (393). The pre-calculated precipitation-to-RVR transforms include mapping of precipitation tile layers to RVR location tile sets (3220, 3222), precipitation-to-RVR equations, and ancillary RVR data.

At step (2334), the RVR forecasting program retrieves forecast precipitation tile layers (3050a, 3050b, 3050c . . . 3050n) from the precipitation forecast database (325). Additional atmospheric data, which can include temperature (T), relative humidity (RH), dew point temperature ($T_d$), smoke and dust data can also be retrieved from or one or more additional databases such as weather sensor database (323) if not already stored in the RVR location and ancillary data database. The additional atmospheric data can include data collected by one or more weather sensor data sources (346) which can include weather stations located at or near an airport and can include forecast generated data provided by a NWP model data source (341). If necessary data is not available from a data source, the RVR ancillary data collection program can be prompted to perform calculations to determine the missing data and store it to an appropriate database. For example, T, RH, and smoke and dust data can be requested from the airport. $T_d$ can be estimated based on T and RH.

Referring to FIG. 16C, each arrow labeled as precipitation-to-RVR transform (3222a-3222n and 3220a-3220n) represents processing, by the RVR forecasting program, and using the corresponding precipitation-to-RVR equations, precipitation data from precipitation forecast data tiles to generate RVR, data in RVR forecast tiles. Airport precipitation-to-RVR transforms (3220a-3222n) are applied to airport precipitation forecast tile sets (3020a-3020n) to generate airport RVR, forecast tile sets (3120a-3120n). Runway precipitation-to-RVR transforms (3222a-3222n) are applied to runway precipitation forecast tile sets (3022a-3022n) to generate runway RVR forecast tile sets (3122a-3122n). Alternatively, tile layer precipitation-to-RVR transforms can be applied to all tiles of precipitation forecast tile layers (3050a-3050n) to generate RVR forecast at all tiles of RVR forecast tile layers (3150a-3150n). Processing of precipitation data to generate data for RVR forecast tiles can include, at each forecast time interval ($F_0$-$F_n$), repeating process steps (2340-2380) to calculate parameters used in precipitation-to-RVR equations. Alternatively, one or more parameters (e.g. Et, β parameterization) can be determined once, for example when calculating RVR estimates at $M_rF_0$, and can be re-used for subsequent applications of the precipitation-to-RVR equations, i.e. when calculating RVR at $M_rF_{(0+1-n)}$.

The RVR forecasting program determines or estimates threshold illuminance $E_t$ for each RVR location tile set at step (2340). $E_t$ varies with background illumination. The RVR forecasting program can retrieve background illumination (BL) from the RVR location and. ancillary data database (929) and calculate $E_t$ based on measured background light (BL).

In an exemplary method, for example if BL data is not available from an airport or to reduce use of processing resources, instead of calculating Et, the RVR forecasting program uses an estimated value of Et=$1e^{-6}$ for daytime calculations and an estimated value of Et=$1e^{-4}$ is used for nighttime calculations.

At step (2350), the RVR forecasting program determines a parameterization for the atmospheric extinction coefficient β as a function of retrieved forecast precipitation rate and other forecast atmospheric data. The parameterized atmospheric extinction coefficient is used with the Allard and Koschmieder formulas to determine RVR, as will be discussed in more detail below. A different parameterization of β is applicable to each of multiple precipitation types, for example referring to equation 4, atmospheric extinction coefficient for rain $\beta_r$ is applicable for rain. Additional parameterizations $\beta$ include $\beta_s$, which is applicable for snow, $\beta_f$, which is applicable for fog, and additional parameterizations which are applicable for sleet, hail, smoke, dust, and other atmospheric conditions and combinations of atmospheric conditions.

In an exemplary method for determining extinction parameters to use for forecasting RVR, the RVR forecasting program retrieves $M_iF_0$ precipitation intensity and measured $V_k$ corresponding to each RVR location tile set (3020, 3022) and determines a plurality of calculated $V_k$ using the $M_iF_0$ precipitation intensity with each $V_k$ calculated using a set selected from a plurality of sets of well-known extinctions parameters, each set corresponding to a different parameterizations of $\beta$. The RVR forecasting program then compares the plurality of calculated values of $V_k$ and selects, for use in forecasting RVR at each RVR location, the extinction parameter set corresponding to the calculated $V_k$ that most closely matches the measured $V_k$ at the location. Analogous methods for selecting parameterization variables can be used when RVR is determined for precipitation other than rain, for example for fog or snow.

At step (2360), the RVR forecasting program calculates, for each RVR location tile set (3020, 3022), a value for $\beta$ using the parameterized expression and extinction parameters determined for $\beta$ at step (2350).

At step (2370), the RVR forecasting program calculates $V_k$ and $V_a$ for each tile of RVR location tile set (3020, 3022) by solving the Allard and Koschmieder formulas using the value for $\beta$ determined at step (2350) and the value for $E_t$ determined at step (2360). A particular value of $\varepsilon$ (threshold contrast) is assumed, typically ranging from 0.1 to 2.0, when solving the Allard and Koschmieder formulas. In an exemplary embodiment, a is assumed to be 0.05.

At step (2380), the RVR forecasting program selects one or $V_k$ or $V_a$ to report as RVR at each tile of RVR location tile set (3020, 3022). In an embodiment, the visibility ($V_k$ or $V_a$) having the largest value is selected. The RVR forecasting program then stores RVR forecast results as a RVR forecast tile layer corresponding to the current forecast time interval (one of 3150a, 3150b, 3150c . . . 3150n) of forecast stack $M_iF_j$ in forecast RVR database (923) at step (2385). The RVR forecasting program then repeats calculation of RVR for each forecast time interval bounded by the set $M_iF_{(0-n)}$ by repeating steps (2350) through (2380), or alternatively repeating steps (2360) through (2380) if the precipitation type at a time interval is the same as the precipitation type at a previous time interval. RVR can be determined at each time point for which forecasted precipitation tile layers (3050a-3050n) are available in data that was retrieved from precipitation forecast database (325) at step (2330).

At step (2390), the information distributing and alerting server retrieves stored RVR forecasting data from RVR forecast database (923) and prepares a forecast RVR report using the data. The RVR report can include RVR data reported in a format suitable for the customer's needs. For example, RVR can be reported as a single value of RVR at the runway touchdown end for use by pilots whose airplanes are on an approach course to an airport. RVR can be reported at both touchdown and rollout locations of one or more runways at the airport, for example for use by air traffic controller scheduling decisions or for use by a shipping vendor to predict possible shipping delays due to poor visibility.

The RVR forecasting program implements a method substantially similar to that illustrated in FIGS. 16A-C to generate forecast RVR based on fog inference data and fog forecast data corresponding to one or more tiles comprising a RVR location tile set (3020, 3022). In an exemplary embodiment, the RVR forecasting program, at step (2330) queries each of precipitation forecast database (325) and fog forecast data database (990) to determine if tiles corresponding to RVR location tile set (3020, 3022) include forecast precipitation results or forecast fog results. If forecast precipitation tiles corresponding to the RVR location tile set include non-zero values of forecasted precipitation estimates, the RVR forecasting program carries out the precipitation-to-RVR forecasting steps described above in relation to FIGS. 16A-B.

If, however, one or more forecast precipitation tiles corresponding to the RVR location tiles do not include precipitation estimate values, and forecast fog tiles corresponding to the one or more RVR location tiles include an indication of the presence of fog, for example atmospheric LWC with a magnitude indicative of fog (e.g., 0.05 g/m$^3$), the RVR forecasting program retrieves fog-to-RVR transforms, along with any additional atmospheric data specified by the fog-to-RVR transforms, and uses the transforms to estimate RVR due to fog in the one or more RVR location tiles. In an example embodiment, fog-to-RVR transforms include well-known models relating RVR to LWC as a function of LWC and $N_D$, where $N_D$ is number droplet concentration. The RVR forecasting program retrieves LWC from a forecast fog or LWC tile layer and $N_D$ from a numerical weather prediction (NWP) data tile layer. In a further example embodiment, fog-to-RVR transforms include equations for solving for $V_a$ and/or $V_k$ using and extinction coefficient for fog ($\beta_f$), $\beta_f$ is function of prevailing temperature, dew point temperature, and relative humidity. The RVR forecasting program retrieves forecast values of these parameters for corresponding tiles and forecast time points and uses them to estimate forecast RVR. RVR forecast data based on fog forecast data is stored in RVR forecast database (923) from which it can be retrieved by information distributing and alerting server (370) and used to generate an RVR forecasting report. An RVR forecasting report can include RVR forecast data based on precipitation and RVR forecast data based on fog.

FIG. 17 depicts a user interface for RVR running on information and alerting server (370). The user interface displays RVR and other weather parameter data at selected locations of interest (indicated by flag location and polygon).

6.6 Example Uses of the Technology

6.6.1 Transportation

Ground or water transportation customers can receive per-route weather monitoring and forecasting data to help operational planners, drivers, and other transport operators select an optimal route and modify a selected route, while navigating the route, in response to changing or forecast conditions. The improved weather forecasting of the described technology permits more accurate estimation of travel delays due to weather. The disclosed technology can generate notifications based on real-time and forecast generated data including warnings regarding potential icing conditions, low visibility due to fog or snow squalls, snow accumulation on specific roads or in specific locations or areas.

6.6.1.1 Aviation

The disclosed technology can provide accumulated, real time, and forecast weather data that is useful for aviation customers including airports, pilots, and passenger and freight air carriers. The disclosed technology can estimate RVR data and other aviation-related information. Aviation customers can receive additional weather parameter information including historic, predicted, and real time precipitation types, rates, and accumulations.

Aviation customers can configure the information distribution and alerting server (370) with alerts to generate warnings and notifications based on accumulated, real time, and predicted weather data including precipitation estimates. Notifications can warn of current or predicted icing conditions on a runway, which can be determined based on precipitation and temperature data. Notifications can include a report of current precipitation type and precipitation accumulation estimates, such as estimates of snow, rain, or hail accumulation on a runway, as well as a predicted time for surpassing a threshold accumulation amount and can include a warning when accumulation reaches a threshold amount. Alerts can include notifications to warn aviation customers of potentially damaging weather events such as hail or lightning based on forecast generated data.

An exemplary use case of the technology described herein includes determining, using precipitation intensity and other precipitation data derived from one or more computationally complex and/or high frequency data sources, and reporting, to a customer, current runway visual range (RVR) and forecasted. RVR for various points in time in the future. Customers can include an airline carrier, airport, or service provider such as a shipping vendor. Customers can use RVR predictions, and corresponding predictions of runway availability and usage, for making routing and other business decisions.

6.7 Conclusion

It will also be recognized by those skilled in the art that, while the technology has been described above in terms of preferred embodiments, it is not limited thereto. Various features and aspects of the above described technology may be used individually or jointly. Further, although the technology has been described in the context of its implementation in a particular environment, and for particular applications, those skilled in the art will recognize that its usefulness is not limited thereto and that the present technology can be beneficially utilized in any number of environments and implementations where it is desirable to improve the accuracy and timeliness of precipitation forecasts. Accordingly, the claims set forth below should be construed in view of the full breadth and spirit of the technology as disclosed herein.

We claim:

1. A high speed weather forecasting system configured to produce weather phenomena inferences, comprising:
    a data collector that receives data including at least one of (a) signal attenuation-based data, (b) weather data, and (c) high frequency data;
    a weather data calculator that calculates weather data from the received data, and stores in at least one database the calculated weather data as first provided weather data,
    the at least one database comprising previously collected and/or previously calculated weather data; and
    at least one processor being configured to:
        identify a location of interest,
        at least in part based upon the first provided weather data, produce a weather phenomenon inference for the identified location of interest and for a particular point in time organized by a time based cadence, and store the weather phenomenon inference in the at least one database.

2. The system of claim 1, where the system is configured to make the weather phenomenon inferences available for use using a publishing operation.

3. The system of claim 1, where the system is configured to produce the weather phenomenon inference based upon at least one of a) previously collected or previously calculated weather data, and b) the calculated weather data.

4. The system of claim 1 wherein the processor is further configured to:
    produce the weather phenomenon inference for the identified location of interest and for a particular point in time based on second provided weather data for a different point in time than the first provided weather data, and
    use the second provided weather data to confirm or refute the weather phenomenon inference for the location of interest based upon the first provided weather data.

5. The system of claim 4 wherein the processor is configured to:
    load, from a trained model storage, a trained time series machine learning model; and
    use the trained time series machine learning model to confirm or refute the weather phenomenon inference for the location of interest based upon the first provided weather data.

6. The system of claim 4, wherein the processor is further configured to provide weather phenomena prediction data generated by a machine learning weather phenomenon model, and to confirm or refute the weather phenomenon inference for the location of interest based at least in part on the weather phenomenon prediction data.

7. The system of claim 1 where the weather phenomenon comprises fog.

8. A weather forecasting method for producing a weather phenomenon inference comprising:
    collecting data including at least one of (a signal attenuation-based data, (b) weather data, and (c) high frequency data indicative of environmental conditions;
    calculating weather data based on the received data, and storing in at least one database the calculated weather data as first provided weather data,
    calculating one or more time series based on the collected and/or calculated data,
    inferring a weather phenomenon based on the collected and/or calculated data to create a weather phenomenon inference, and
    storing data representing the one or more time series and/or the inferred weather phenomenon in a database in association with a cadence.

9. The method of claim 8 wherein the weather phenomenon inference comprises a fog inference.

10. The method of claim 8 wherein the calculated weather data comprises liquid water content (LWC) data.

11. The method of claim 10 further comprising generating the weather phenomenon inference based at least in part by comparing a value of the LWC data with one or more threshold values.

12. The method of claim 8 further comprising:
    collecting microwave link signal attenuation measurement data; and
    generating signal attenuation-based weather data based at least upon the collected microwave link signal attenuation measurement data.

13. The weather forecasting method of claim 8, further comprising:
   confirming or refuting the weather phenomenon inference based at least on the stored one or more time series representing data;
   calculating weather phenomenon prediction data or retrieving previously calculated weather phenomenon prediction data using a machine learning weather phenomenon prediction model; and
   storing the calculated weather phenomenon prediction data in a database organized by cadence.

14. The weather forecasting method of claim 13, further comprising:
   further confirming the weather phenomenon inference based on the weather phenomenon prediction data generated by the machine learning weather phenomenon prediction model.

15. The method of claim 13 wherein the weather phenomenon prediction data comprises fog prediction data.

16. The method of claim 13 wherein the weather phenomenon prediction data comprises one or more of weather parameter prediction data, weather parameter trend prediction data, and prediction data corresponding to one or more groups of weather parameters.

17. The method of claim 13 further comprising:
   confirming or refuting the weather phenomenon inference based at least on the stored one or more time series;
   upon confirmation of the weather phenomenon inference, calculating weather phenomenon prediction data using a machine learning weather phenomenon prediction model, and storing the calculated weather phenomenon prediction data in a database organized by cadence; and
   wherein confirming the weather phenomenon inference comprises using a trained time series machine learning model to process at least a time series of liquid water content (LWC) measurement data values.

18. The method of claim 13 wherein:
   the weather phenomenon prediction data comprises a value of a probability of an occurrence of the weather phenomenon, and
   wherein confirming the weather phenomenon inference comprises comparing the value of the probability of the occurrence of the weather phenomenon to a threshold value.

19. The method of claim 13 wherein confirming the weather phenomenon inference includes generating a confidence metric associated with the weather phenomenon inference.

20. The method of claim 19 wherein further confirming the weather phenomenon inference includes changing a confidence metric associated with the weather phenomenon inference.

21. A method for inferring the presence of a weather phenomenon comprising:
   collecting microwave link attenuation data corresponding to a particular geographic location and a particular time;
   inferring the presence of a weather phenomenon at the particular geographic location at the particular time based in part on the collected microwave link attenuation data;
   accessing at least one past weather parameter value corresponding to the particular geographic location; and
   one of confirming and refuting the presence of the weather phenomenon at the particular geographic location and at the particular time based on the at least one past weather parameter value corresponding to the particular geographic location.

22. The method of claim 21 wherein the at least one past weather parameter value comprises one or more signal attenuation weather parameter values.

23. The method of claim 21 wherein the at least one past weather parameter value comprise one or more liquid water content values generated using microwave link attenuation measurement values.

24. The method of claim 21 wherein the weather phenomenon comprises a fog event.

25. The method of claim 21 further comprising:
   collecting wind vector forecast data; and
   generating a fog forecast by advecting fog inferred at the particular geographic location to one or more additional locations using the wind vector forecast data.

26. The method of claim 25, further comprising generating a visibility forecast based at least upon the fog forecast.

27. The method of claim 21 further comprising:
   collecting one or more weather parameter data values corresponding to the particular geographic location and the particular time;
   predicting, using a trained weather parameter prediction model and using the one or more weather parameter values, a weather phenomenon at the particular geographic location and at the particular time; and
   one of confirming and refuting the presence of the predicted weather phenomenon at the particular geographic location and at the particular time.

28. The method of claim 21 wherein at least one past weather parameter value includes at least one past microwave link signal attenuation measurement value.

29. The method of claim 21 wherein the collected microwave link attenuation measurement data comprises a particular attenuation measurement for a particular microwave link.

30. The method of claim 21 wherein the collected microwave link attenuation data comprises microwave link attenuation measurements aggregated from plural microwave links at the particular geographical location.

31. The method of claim 21 further comprising inferring a visibility parameter value based at least upon the presence of the weather phenomenon.

* * * * *